United States Patent [19]
Gerry

[11] 3,862,115
[45] Jan. 21, 1975

[54] DISTORTIONLESS MAGNETIC COMPONENTS SUCH AS RECORD AND REPRODUCE HEADS

[76] Inventor: Martin E. Gerry, 13452 Wihthrope St., Santa Ana, Calif. 92705

[22] Filed: July 9, 1973

[21] Appl. No.: 377,581

[52] U.S. Cl. .................. 360/125, 360/119, 360/123, 360/124

[51] Int. Cl. ........ G11b 5/20, G11b 5/44, G11b 5/22

[58] Field of Search ....... 179/100.2 C; 340/174.1 F; 346/74 MC; 360/125, 123, 124, 122, 119; 336/178

[56] References Cited

UNITED STATES PATENTS

| | | | |
|---|---|---|---|
| 2,452,529 | 10/1948 | Snoek | 179/100.2 C |
| 2,933,721 | 4/1960 | Hagopian | 179/100.2 C |
| 3,651,282 | 3/1972 | Gerry | 179/100.2 C |

*Primary Examiner*—Alfred H. Eddleman

[57] ABSTRACT

Method and structures for attenuation of distortion components that are present in magnetic devices, due to intermodulation of carrier and intelligence signals, are disclosed. Under certain conditions, the carrier circuit is provided with reactance components that are at resonance to an applied carrier frequency. Magnetizable core structures are provided with magnetic discontinuities in certain configurations to control the coefficient of coupling between the several inductances. In other configurations, core structures of homogeneous magnetizable material are provided devoid of magnetic discontinuities, particularly applicable to all intelligence except steady-state sinusoidal signals. Tapering of the core structures at transflux locations between cores and external recording surfaces, provides additional desirable results. Application of the principles recited in the specification, to other devices, such as logic elements and computer storage or memory devices, are not limited to the number of logic states conventionally obtainable, and applying the principles of modulated signal recording in a matrix or on a drum or tape provides multifold logic states.

26 Claims, 48 Drawing Figures

DISTORTIONLESS MAGNETIC COMPONENTS SUCH AS RECORD AND REPRODUCE HEADS

BACKGROUND OF THE INVENTION

This invention relates to the field of magnetic components such as record and reproduce heads and in particular elimination of distortion due to intermodulation of intelligence and carrier flux in the core of the magnetic component during the recording process.

Except for the treatment by the same inventive entity in U.S. Pat. No. 3,651,282 of the subject matter of as to the causes and remedies of the distortion problem nothing much in this area has been offered to enable obtaining a reduction of distortion. Therein, relationship between the coefficient of coupling between the several inductances, and consequently mutual inductance, was shown as the principal contributor to distortion and treated accordingly. Other prior art, below, is offered only to show attempts at this problem, pursued without adequate theoretical considerations and consequently not reaching the results arrived at by this invention.

U.S. Pat. No. 2,855,464 discusses a number of configurations of flux responsive heads. All heads utilize many windings in complex arrangements, and attempt to obtain flux responsive characteristic by balanced windings. The heads also utilize means for saturating small portions of the magnetic cores.

U.S. Pat. No. 2,704,789, shows a separate core on which is wound a coil for providing high frequency excitation current for creating a changing flux. The separate core used therefor intersects perpendicularly the core structure of the head. The excitation or separate core is attached to a group of individual cores on which signal coils are wound. The basic principle involved is the establishment of orthogonal relationships between the high frequency flux and the signal flux. This relationship results in permeability change at the point of intersection of the two cores, which alledgedly prevents a voltage resulting from the high frequency excitation current from appearing across each recording gap of the individual cores.

U.S. Pat. No. 2,804,506, which like Pat. No. 2,855,464, has complex windings within the core structure proper, obtained by drilling or stamping out holes in the flat portion of the core for the purpose of winding a coil about a narrow core portion, so that a small area of the core may have its reluctance changed according to the excitation frequency as well as magnetically saturating that small core area.

U.S. Pat. No. 2,165,307 utilizes a magnetic core as an integral part of an electron beam tube. A gap in the magnetic circuit external to the beam tube picks off a signal from a tape which is translated in the gap. The magnetic flux path which acts as deflecting means of the electron beam, terminates at one end of the beam tube within the vicinity of the beam. The voltage output from the tube which is thereby produced is proportional to the flux amplitude of the flux within the gap in which the tape is translated.

U.S. Pat. No. 3,399,393 addressed to a magnetic reading head, is constructed to provide an output signal which is a derivative signal of the space between magnetic flux paths as opposed to the speed of passage of flux transversals past the reading head. The construction includes two outer magnetic core pieces and two inner magnetic probes which provide, at the magnetic tape surface, three non-magnetic gaps, with each of the two probes having a gap between them, and each probe forming a gap with an associated outer pole piece. An excitation current is passed through the magnetic probes, each of which has oppositely wound sense windings, to thereby provide the head with reading ability of magnetic tape in motion or while stationary.

U.S. Pat. No. 3,079,467 for a magnetic head structure comprises a pair of electrically conductive core supports, and a pair of magnetic cores positioned between the core supports. The cores and supports are completely spaced from each other but are disposed in close proximity to each other at certain areas of the head. Each core has a winding and a grounded gap spacer is provided between the cores.

Pat. No. 2,850,582 for a magnetic record and reproduce head has a core with oppositely positioned and gap-separated pole pieces comprising end contact surfaces of a pair of core portions, the end contact surfaces having a chromium layer thereon.

Pat. No. 2,483,123 for a magnetic recording and reproducing head has a core structure with plural number of air gaps and coils wound on the core structure with provisions for adjusting the air gap reluctance to induce voltages in the coils in a manner so as to compensate for stray flux external to the head.

Pat. No. 3,447,140 is for a magnetic memory matrix using a bipolar word pulse during writing operation, and using thin magnetic film areas in the memory locations for storing binary logic. The principles used permit a large current of flux to be rotated to a selected direction along the easy magnetization axes of the film areas.

SUMMARY OF THE INVENTION

It is therefore an object of this invention to show the causes of distortion in magnetic components, and in particular recording components, subject to the various types of intelligence recorded wherein the reactive portions of the carrier circuit of the magnetic component is at resonance to an applied carrier frequency and also when no resonance conditions are present.

Hence, in accordance with the invention a magnetic head to transflux signals with attenuation of distortion components is provided. This head has a magnetizable core structre for conveying magnetic flux and has at least one magnetic discontinuity therein. Coil means, circumjacent a portion of the core structure, and responsive to the electrical signals or the magnetic flux, comprises at least two impedances, the first of these at least two impedances comprises an inductance and capacitance in resonance to a carrier frequency signal for providing a first flux in the core structure. The second of these at least two impedances comprises inductive means responsive to sinusoidal intelligence signals for providing a second flux that interacts with the first flux in the core structure. Both these impedances, of course, also have resistive components. The magnetic discontinuity in the core effects a coefficient of coupling between the inductance and inductive means that has a finite value greater than zero but less than 0.55 for diminishing the distortion components due to intermodulation of the carrier and intelligence signals. In this head, the magnetizable core structure may be used for the dual purpose of a core as well as for acting as an inductive means to which the intelligence signal may be applied. The core structure may also be reduced in cross-sectional area at a predetermined location, preferably where the core tapers to a point, to transflux the signals thereat from the core structure to an external recording means or from the external recording means to the core when the head is acting as a reproduce head.

In another mode of operation, the first of the two impedances is only an inductance with inherent resistance therein for providing the first flux in the core structure. The second of the impedances comprises inductive means responsive to non-sinusoidal intelligence signals for providing the second flux that interacts with the first flux in the core. The magnetic discontinuity here, also effects a coefficient of coupling between the inductance and inductive means that has a value of at least 0.9 but is less than unity. Here too, the core structure may be used as the inductive means as well as for core purposes. A variation of this head, is for the first of the two impedances to be wound with flat tape so as to build-in capacitance of a value that will provide resonance with the inductance to an applied and predetermined carrier frequency for providing the first flux in the core. In either of these variations, the core structure may be reduced in cross-sectional area at the point of transflux of signals from the core when recording and to the core when reproducing.

Another variation of this head is one wherein the magnetizable core structure is of homogenous magnetizable material devoid of magnetic discontinuities therein. This core may also be reduced in cross-sectional area at a location of transflux of the signals from the core when recording, or to the core when reproducing. This configuration also has at least two impedances, the first thereof comprising inductance and capacitance means in resonance to a carrier frequency signal for providing a first flux in the core structure. The second of said at least two impedances comprising inductive means responsive to intelligence signals of any nature, except those that are steady-state sinusoidal, for providing a second flux that interacts with the first flux in the core structure. The homogenous core structure effecting unity coefficient of coupling between the inductance and inductive means for minimizing the distortion components due to intermodulation of the first and second flux and for increasing the magnitude of the magnetic flux. This head may also have the dual function of acting as a logical AND element when the inductive means is at least two coils and where the intelligence signals are pulses applied to each of the two coils for providing fluxes in the core, the sum of the fluxes overcoming the magnetic bias of the core to provide a logical AND flux for transferring same to an external recording medium. The core structure herein may also be configured so that the inductive means thereon constitutes at least two coils, and the intelligence signals are pulses applied to each of the two coils, either of the pulses being sufficient to overcome the magnetic bias of the core to provide a logical OR flux for transferring same to an external recording medium.

When the head acts in the reproduce mode of electrical signals, a magnetizable core structure for conveying magnetic flux is provided. A recorded magnetic flux that is sensed by the head comprises a carrier frequency signal bearing the electrical signals. The core structure is provided with at least one magnetic discontinuity therein. Coil means circumjacent a portion of the core structure comprises inductance and capacitance means in resonance to the carrier frequency signal. The magnetic flux is conveyed in the core structure, said at least one magnetic discontinuity effecting a coefficient of coupling between the inductance and the core structure, which is inductive, of a magnitude greater than zero but less than 0.55. This core structure may also be reduced in cross-sectional area at a predetermined location of transflux of the magnetic flux from the external recording medium to the core.

Another variation of the reproduce head directed for reproduction of non-sinusoidal electrical signals with attenuation of distortion components comprises a magnetizable core structure for conveying the magnetic flux, the magnetic flux comprising a carrier flux bearing the electrical signals. This core structure is provided with at least one magnetic discontinuity therein. Inductive means circumjacent a portion of the core structure is responsive to the carrier flux, the magnetic discontinuity or discontinuities effecting a coefficient of coupling between the inductive means and the core structure of at least 0.9 but less than unity. The core structure may be reduced in crosssectional area at a predetermined location of transflux of the magnetic flux, from external means on which the carrier bearing the initelligence had been previously recorded.

Another variation of the reproduce head configuration for reproducing electrical signals with attenuation of distortion components comprises a magnetizable core structure for conveying magnetic flux which is made of homogenous magnetizable material devoid of magnetic discontinuties therein. The magnetic flux conveyed comprises a carrier frequency signal bearing the electrical signals. Coils means, circumjacent a portion of the core structure comprises inductance and capacitance means in resonance to the carrier frequency signal. The magnetic flux is conveyed in the core structure, and the coil means and core structure effect unity coefficient of coupling therebetween for minimizing the distortion components residual in the magnetic flux. The core structure may be tapered or reduced in cross-sectional area at a predetermined location of transflux of the magnetic flux from an external recording medium to the core.

In any of the aforesaid coils or coil means, the use of a photo chemical process may be resorted to in order to form such coils by known printed circuit techniques directly on the magnetizable core structure, thereby making such coils or coil means integral with the core structure.

An application of the principles of the magnetic recording using cores devoid of magnetic discontinuities, makes possible logic elements that can provide a relatively infinite number of logic states, among such elements being magnetic logic gates, magnetic memory matrices comprising thin film storage areas for storing characters, each identified by a different state of logic, and for non-destructively retrieving such characters from other thin film areas provided in these matrices. Such devices significantly broadens the capabilities of processing equipment, by increasing the speed of handling data, improving the quality and amount of data capable of being stored in given area, and making possible high speed retrieval of data many million fold over present systems, accompanied by overall decrease in ciruit quantity and system complexity.

In providing the various coefficients of coupling for the various conditions of operability, it does not matter what method is used to achieve the desired coefficients of coupling. One method is to use magnetic discontinuities in the core structure sufficient to obtain a coefficient of coupling that is less than unity, but using an endless core obtains substantially unity coefficient of coupling. Other methods of achieving coefficients of coupling of less than unity is to make a core of a plurality of segments attaching the several segments to each other or skewing such segments with respect to each other. Still other methods to achieve loss than unity coefficient of coupling is to position the coils with respect to each other on the core so as to provide less than substantially total flux transfer between such coils.

DETAILED DESCRIPTION

Figure 1:
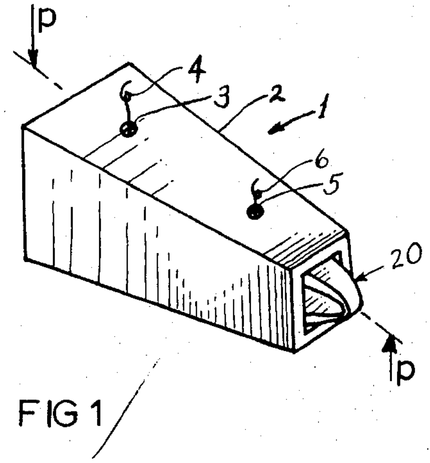
FIG. 1 is a perspective view of an electromagnetic head in a shielded enclosure in accordance with this invention.

General Considerations of Distortionless Magnetic Components Applicable to All Configurations Reference is made to FIGS. 1 through 6 with respect to the treatment of sinusoidal or non-sinusoidal carrier-modulated intelligence when the effective reactances of the carrier components are not at resonance to the applied carrier frequency, and also under no resonance conditions.

FIGS. 1, 2, 3, 4 and 5, show the structure of either a recording or reproduce head at 1, wherein a generally metallic shield 2 preferably of iron or other magnetic material encloses the head structure, with exception of the tip 12 of the magnetizable core therein. The magnetizable core is shown at 20 having its tip 12 extending from the shield. The purpose of the shield is to compress the magnetic fields produced by the head, direct such fields outward toward the tip 12 of core 20, and provide means for excluding interference between the fields created by the head and external fields. Shield 2 has apertures 3, 5, 7 and 9 through which insulated wires 4, 6, 8 and 10 extend respectively. The head structure at 30 shows wires 4 and 6 being used to make electrical connection to winding 42 of coil means 40 integral with core portion 16, whereas wires 8 and 10 are used to make electrical connection to a similar winding 42 of a similar coil structure 40 integral with core portion 18. Each of coils 40 are integral with core 20 and are either wound thereon or deposited upon electrical insulation means 41 through use of photoresist materials by a process such as used for making integrated circuits, wherein chemical development of the photoresist material to form the coil portion on the core is achieved through optical or infra-red radiation methods that provide reaction with all exposed parts in the photoresist layer, enabling the coil to be formed thereby on insulating material 41. Such processes are known in the art and need not be recited. Such coils which are formed on the core are said to be integral with the core, whether the coils are wound or made by photoresist chemical process, their ends being attached to leads 4, 6, 8 and 10. But it should be noted that it is possible to obtain such leads as natural extensions of coils 40 without the necessity of making separate wire connections to coils 40, whether made by a chemical process or merely wound on the core. Another electrically insulating layer 43 may be wrapped around the coils to provide additional strength to the coils and to prevent electrical contact with the shield. Shield 2 may have non-magnetic inserts or spacers as shown at 19 to prevent the core from making electrical contact with the shield, and the shield may grounded as at 35 to provide minimal interference from external magnetic fields.

Although in FIGS. 1 and 2, tip 12 of core 20 was shown as made of homogeneous magnetic material without any discontinuity therein, used in connection with non-sinusoidal modulation discussed hereinbelow, it should be carefully noted that in this structure the core tip may have a magnetic discontinuity as at 13. Such discontinuity may be a non-magnetic metallic or plastic insert attached to the core material or may simply be an air gap. In other applications to be discussed, core portion 14 of core 20 will necessitate another magnetic discontinuity, as at 15, whereas in still other applications core portion 14 will not have any such discontinuities. Where a magnetic discontinuity as at 15 is provided, it necessarily will be of non-magnetic material, such as a plastic or a copper insert, not having magnetizable properties. The presence or absence of the additional magnetic discontinuity at 15 will depend upon the coefficient of coupling desired between the two coils of the head, the larger the coefficient of coupling desired, the smaller or even complete absence of such discontinuity will prevail in core portion 14.

Figure 3:
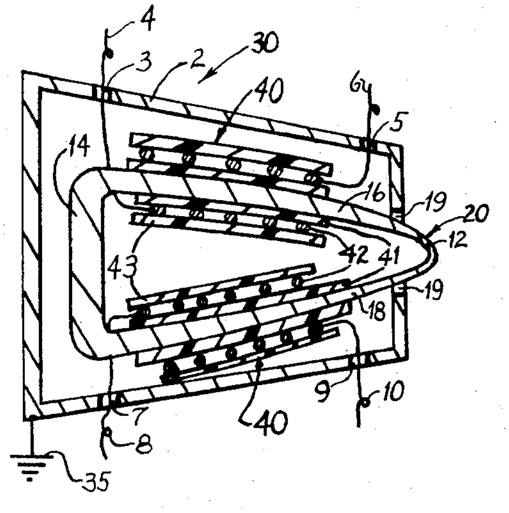
FIG. 3 is a cross-sectional view taken at plane *p—p* of FIG. 1 that shows a head configuration when no resonant condition to an applied carrier frequency is involved in the carrier circuit portion of the head.
Figure 6:
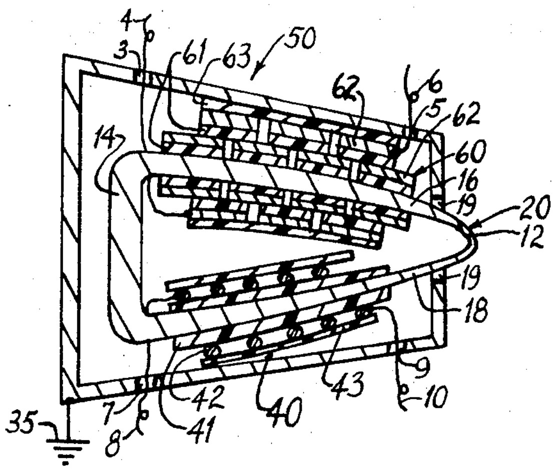
FIG. 6 is a cross-sectional view taken at plane *p—p* of FIG. 1 showing a head configuration usable when the efffective reactances of the carrier circuit and at resonance to an applied carrier frequency.

Referring to FIG. 6, this structure at 50 is similar to that of FIG. 3 except that coil means 40 on core portion 16 is replaced by coil means 60. Coil means 60 comprises a generally flat tape having a metallic layer 62 attached to an insulating adhesively-coated layer 61. The combined layer 61–62 is wound on core portion 16 so that the adhesively-coated side attaches to the core material, and is spirally wound in as many layers as are required to obtain the desired value of effective inductance. It is noted herein that flat tape was chosen as a means of obtaining not only the desired inductance but also distributed capacitance, as show by coil means 60, so that an effective capacitance $C_o$ is provided, thereby resulting in an inductively reactive component and a capacitively reactive component whose reactances are equal and opposite to each other, to obtain a resonance condition at the carrier frequency to be used, for reasons which will hereinafter become apparent. There is of course nothing to prevent use of external capacitance either in series or parallel with coil means 60 to obtain resonance. It should be noted that the coils as are wound on core portions 16, or on their equivalent core portions in other structures, differently numbered, when the coil means or winding is denoted by $L_w$ without any capacitance $C_o$ being shown in the circuits, it means that the configuration as shown in FIG. 3 for coil means 40 on core portion 16 is used. But when coil means or winding is denoted by $L_w$ with capacitance $C_o$ shown in the circuit, it means that the configuration as shown in FIG. 6 for the coil means 60 as wound on core portion 16 is used. It should also be noted that the equivalent of coil means 60 may be formed by the chemical process referred to above, but in this instance each insulating layer, and each layer of conductive strips forming the coil means, will be made by separate steps. If more than one layer of conducting spiral flat strips are required, then the layers will be made separately in alteration with an insulating layer, and the individual coils thus resulting will be interconnected in series with each other by suitable wires to result in coil means 60. On completion of either winding coil 60 or forming it chemically, an insulation material 63 is wrapped around or formed chemically about coil 60. As in the case of coil 40, wires 4 and 6 will be attached to the ends of coil 60 affixed to the metallic portions 61 thereof. In this configuration, as in the configuration of FIG. 3, another coil 40 will be wound or formed on core portion 18, and wires 8 and 9 formed or attached to the ends of this coil. Coil 40 wound or formed on core portion 18 or its equivalent portion in other configurations, is generally used when the head functions in the record mode and will be symbolically referred to hereinafter as coil means $L_z$.

It should be understood that the discussion under this caption is germane to all applications of distortionless magnetic components which will be hereinafter structurally discussed in terms of schematics comprised of the several cores and windings integral therewith.

Figure 4:
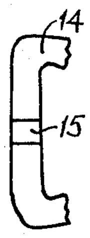
FIG. 4 is a partial elevation view of the non recording or reproducing portion of one of the magnetizabe core configurations used in the head.
Figure 5:
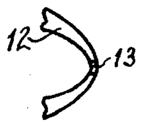
FIG. 5 is a partial elevation view of the recording or reproducing portion of one of the magnetizable core configurations used in the head.
Figure 14:
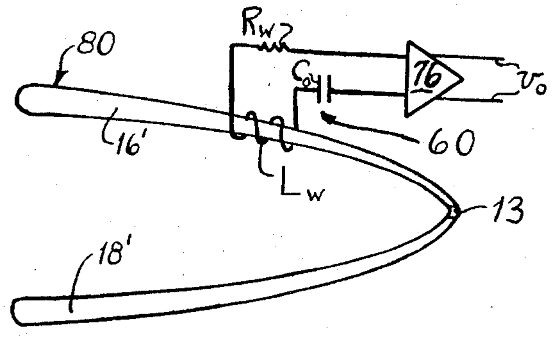
FIG. 14 is a schematic view of a reproduce head wherein the effective reactances are at resonance to a previously recorded carrier frequency, and may be generally the counterpart reproduce configuration to the record head of FIG. 13, but may also be used as a record head wherein the magnetizable core structure also is used as an inductance to which may be applied an intelligence signal across the free or unjoined ends of the core structure.
Figure 15:
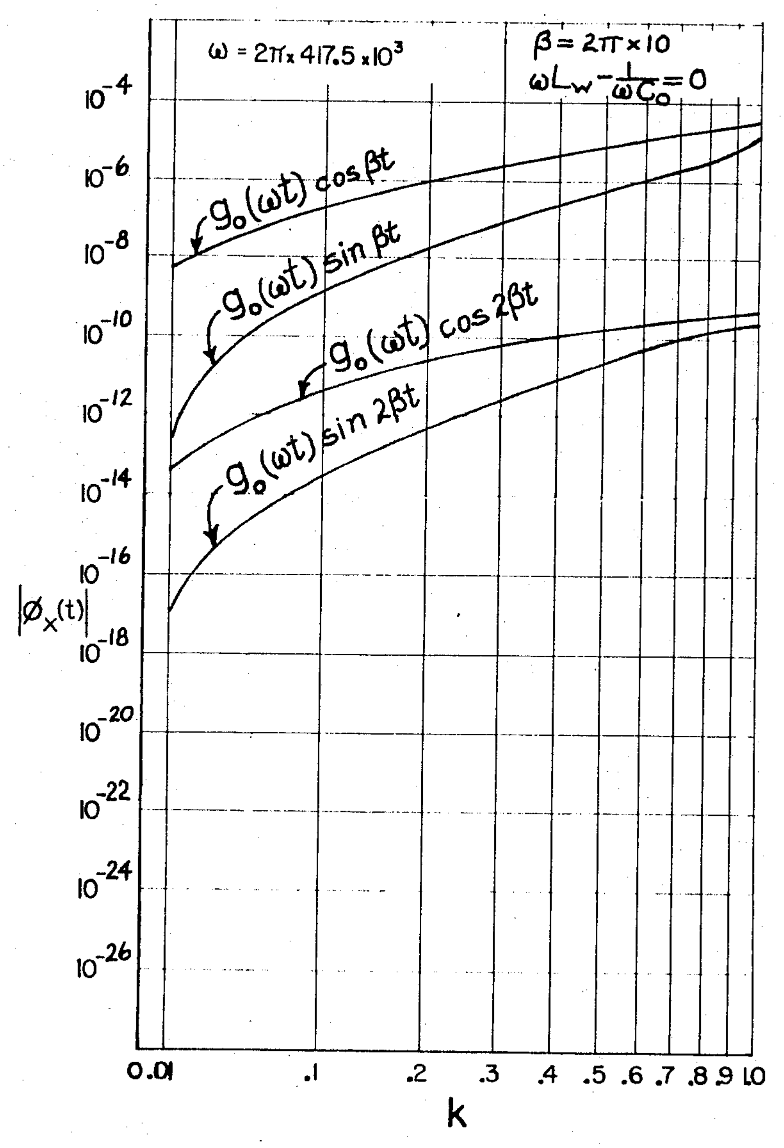
FIG. 15 shows the response characteristics of the absolute value of the flux of the head of FIG. 13 as a function of the coefficient of coupling between the several inductances of the head, showing the desired and several distortion components when the intelligence signal is a low frequency steady state sinusoid, and where the effective reactances of the carrier circuit are at resonance to the fundamental component of the carrier frequency.
Figure 16:
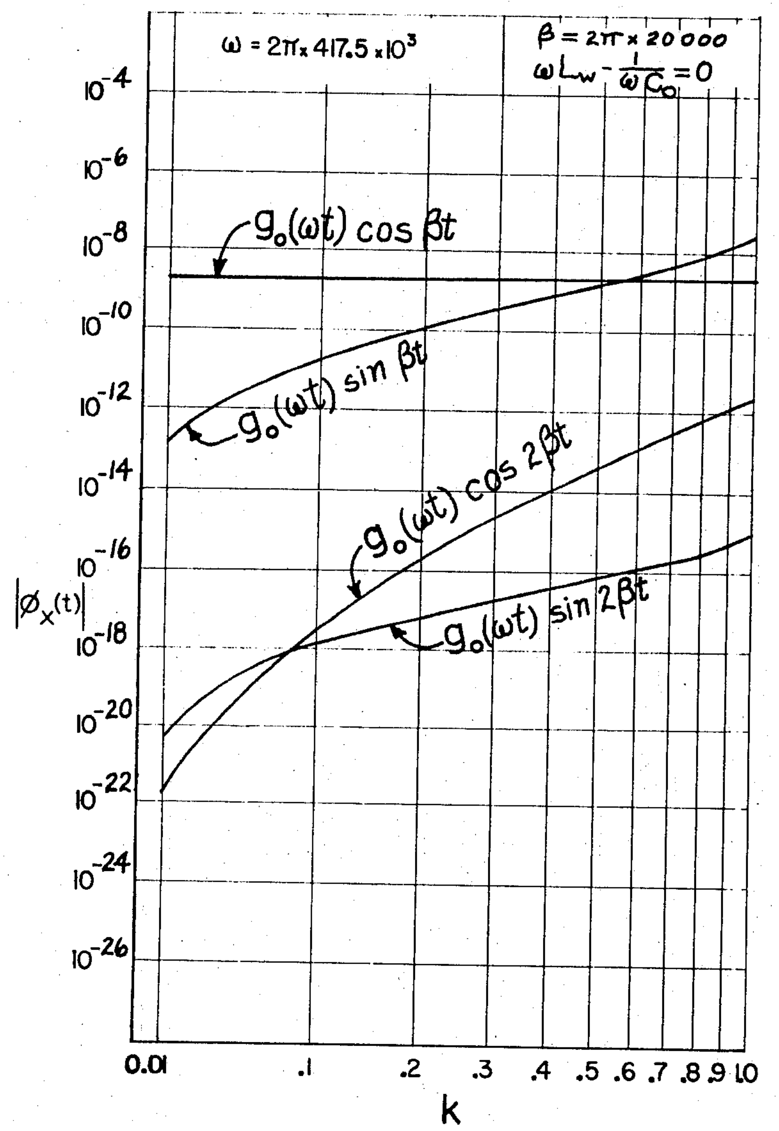
FIG. 16 shows the response characteristics of the absolute value of the flux of the head of FIG. 13 as a function of the coefficient of coupling between the several inductances of the head, showing the desired and several distortion components when the intelligence signal is a high frequency steady state sinusoid, and where the effective reactances of the carrier circuit are at resonance to the fundamental component of the carrier frequency.

Referring to either FIGS. 3 or 6, or with modifications of core structure 20, in accordance with FIG. 4 and/or FIG. 5, wherein the magnetic discontinuitites are provided, or with modifications eliminating core portion 14 entirely, as depicted schematically by FIG. 14, any of these structures are usable as a magnetic record head, as a magnetic reproduce head, as a transformer, as an inductor, and as a magnetic logic element that also can act as a recording device, to be subsequently described in more detail.

It should be noted that in the several configurations of the head, coil 40 is the symbolic notation reserved for inductance $L_w$ and its inherent resistance $R_w$, and that resistance $R_w$ is intended to also include the effective resistance of the amplifier at the connection points to inductance $L_w$.

It should also be noted that in the several configurations of the head, coil 60 is the symbolic notation for the effective inductance $L_w$ and its inherent resistance $R_w$ and includes an effective distributed capacitance $C_o$, shown in series with effective inductance $L_w$. Resistance $R_w$ is also intended to include the effective resistance of the amplifier at the connection points to the combined reactances of coil 60. Capacitance $C_o$, although intentionally created by the type of winding used defining coil 60, may also have some external capacitance either connected across coil 60 or in series therewith, in order to achieve resonance conditions, wherein, $\omega L_w - 1/\omega C_o = 0$. It is possible to select a value of $C_o$ wherein off-resonance conditions will prevail, that is where the reactive components of the carrier circuit will operate on the skirt of a typical universal resonance curve. Under these conditions $\omega L_w - 1/\omega C_o \neq 0$. It may be possible to obtain some desirable results in the off-resonance condition of the carrier circuit over the completely non-resonant condition, under certain limited constraints.

Figure 2:
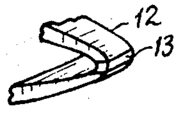
FIG. 2 is a partial view in perspective of the magnetizable core portion of the inventive head.

It cannot be too strongly emphasized that metallic enclosure 2 as depicted by FIG. 1 is optional for any of the configurations stated in this specification. With a well designed electromagnetic head and particularly the magnetizable core thereof, such shield is not really necessary as will become evident from further discussion of gapless electromagnetic devices. It should be also emphasized that as long as gaps or magnetic discontinuities are present in the core of the electromagnetic head for recording or reproducing steady-state sinusoidal intelligence, generally the coefficients of coupling between the several coils of the head will be less than unity.

Reference is further made to the various figures showing the structural and schematic configurations of the heads for obtaining distortionless magnetic components subject to either sinusoidal carrier-modulated intelligence or non-sinusoidal carrier-modulated intelligence. Non-sinusoidal carrier-modulated intelligence is herein defined as any type of intelligence signal modulating a carrier signal, which intelligence signal whose function has an argument that is not a pure sine or cosine function. As such, non-sinusoidal intelligence would include speech, music, pulse type signals, and other signals generally termed as transient signals.

Particular attention is directed to the core structures in these figures, and it should be noted that these core structures, to be hereinafter in other sections of this specification, described in detail in conjunction with the particular configuration treated, are substantially of homogeneous magnetizable material, or differently stated, have no magnetic discontinuities therein. A magnetic recording or reproduce head is contemplated with core structures thereof devoid of conventional air gaps or magnetic discontinuities of any kind, even at the transflux location of the core for conveying intelligence. It should be noted that these cores are tapered, with narrowing at the tips or reduced cross-sectional area thereof, at which point transfer of the recorded or reproduced modulated flux between an external recording medium and the core occurs. Although a tapered portion is used to obtain concentration of the flux components circulating within the core at such tip, and hence more efficient transfer of flux between the external recording medium and the core, such tapered tip is not absolutely necessary. As will be stated shortly, transfer of flux between the core and the external recording medium such as a magnetic tape, can occur at any location of the core, but of course at lesser efficiency than at a tapered portion, since at a tapered portion a greater amount of flux per unit area will be available for such transfer.

To understand this phenomena, appreciation must be entertained of the voids existing in electromagnetic theory as published by most authors of this subject. Almost 75 years ago, the mathematical and electromagnetic genius of Oliver Heaviside recognized these voids and published a lengthy treatise. This treatise was republished is abridged form, the particular area of applicability to the subject matter of this specification being given as follows:

In the treatise on Electromagnetic Theory by Oliver Heaviside, abridged version of Volumes I, II and III of the complete treatise, published in 1950 by Dover Publications Incorporated of New York, N.Y., this renowned mathematician and scientist points out several incomplete aspects in the works of James Clerk Maxwell. Chapter II, pages 6–32 of the abridged treatise is of special significance in comprehending the theoretical behavior of electromagnetic fluxes and fields, and currents that produce them. Heaviside points out that in considering electromagnetic phenomena, Maxwell considered conductive and displacement currents and fields but stopped short at that point. Hence, it is proven, that Maxwell's equations are incomplete in that they fail to account for continuity of energy in space as well as in time. Of specific interest is Heaviside's treatment of a moving charge, accounting for displacement current, conduction current and electrification of the surface of the body support such currents. The electrification occurs by the charges continuing to move through the body, spreading out on the outer surface of the body, as well as the energy due to the moving charges continuing outward away from the outer surface, which outwardly moving energy he calls convection currents or fluxes. Heaviside also points out that the convection current is the missing component of flux or field accounting for the transfer of energy in space. In similar manner Heaviside emphasizes the importance of electromagnetic convection fluxes and relates them to the conduction and displacement currents in the metallic bodies which support them, and which bodies are electrified.

Consideration is given to the conveyance of the energy flux from the electrified body and the electromagnetic forces or fields thereby created, with consideration also given to the effects of a moving medium.

The relevence of this treatise to the instant specification is that it renders support to the concept expounded herein that in order to transfer electromagnetic energy created in a magnetic device to an external magnetic medium such as a magnetic tape, it is not necessary to have a magnetic discontinuity or gap in the core of such device. The fluxes created by the energy in the coils on the magnetizable core, are transferred to the magnetizable core wherein a flux is conducted, displaced to the surfaces of the core, the surfaces becoming electrified, and convection flux energy transferred outwardly from the core. It will therefore be possible to obtain good recording of such flux from any part of the core, but since a given amount of energy is spread over the entire surface area of the core and moving thereover, a greater concentration of the convected or conveyed energy will occur in terms of flux per unit area or volume, at a narrowed portion of the core. With this in mind, the advantage of narrowing the core at its recording tip will be realized in terms of the concentrated amount of flux available at such tip, or conversely for reproducing same from energy already recorded on external magnetic tapes.

Other advantages of non-discontinuous or gapless cores with respect to reduction in distortion of the non-sinusoidal intelligence and the magnitude of certain types of non-sinusoidal intelligence, will become evident in further discussion in other sections of this specification.

magnetic discontinuities wherever provided in the magnetic core are for the purpose of lowering the mutual inductance and hence the coefficient of coupling between coils wound on the core to a value less than unity. But use of magnetic discontinuities is not the only way of accomplishing reduction in coefficient of coupling; shaping the core so that the axes of the coils are neither aligned or parallel to each other, or such shaping in combination with providing discontinuities will accomplish similar results.

Figure 7:
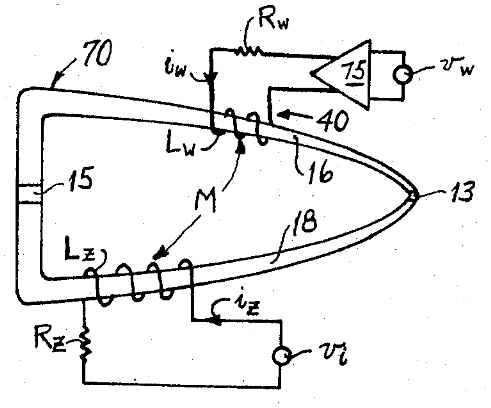
FIG. 7 is a schematic view of a recording head when no resonant condition to an applied carrier frequency is involved on the carrier circuit portion of the head, and where generally a plurality of magnetic discontinuities on the magnetizable core structure are preset for running sinusoidal steady state intelligence.
Figure 8:
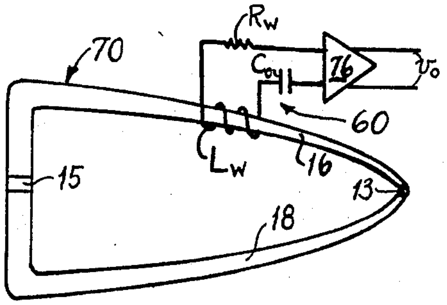
FIG. 8 is a schematic view of a reproduce head when the effective reactances of the carrier circuit of the head are at resonance to a previously recorded carrier frequency .

Response to Carrier-Modulated Sinusoidal Intelligence When Carrier Reactive Components are not at Resonance With respect to the treatment of carrier-modulated sinusoidal intelligence when the carrier reactances are not at resonance, reference is made to FIGS. 9, 10, 11 and 12. FIG. 7 is addressed to the record type configuration of the head, and FIG. 8 is addressed to the reproduce type configuration of the head.

Referring to FIG. 7, a record head is schematically depicted comprising magnetizable core 70. The core is comprised of core portions designated as 16 and 18, and having magnetic discontinuities 13 and 15 therein. Preferably, discontinuity 13 may be either an air gap or a non-magnetic metal or a plastic material, whereas discontinuity 15 may be a non-magnetic metal or plastic material to provide structural support for the core. Coil 40 comprises inductance $L_w$ and the effective resistance $R_w$ of such inductance. Numeral 40 is designated to indicate that the inductance $L_w$ is the effective inductance and that $R_w$ is the effective resistance, and that there is no substantial capacitance to cause a resonant current to flow in the coil. $L_w$ is wound on core portion 16 or may be formed thereon by chemical process referred-to above. A carrier signal $v_w$ is applied to the input of amplifier 75. The output of amplifier 75 is connected to inductance $L_w$. The effective resistance $R_w$ includes the output resistance of amplifier 75. As a result of application of signal $v_w$, an alternating current $i_w$ is produced in inductance $L_w$ which produces an alternating magnetic flux in core portion 16 and hence in core 70. Inductance $L_z$ is wound or formed by a similar chemical process on core portion 18. This inductance has an effective resistance $R_z$ which also includes the effective resistance of the source providing input voltage $v_i$ to inductance $L_z$. Due to current $i_z$, inductance $L_z$ will provide an alternating magnetic flux in core portion 18 and hence in core 70. There will be present two main fluxes circulating in core 70, one produced by inductance $L_w$ and the other produced by inductance $L_z$. Mutual inductance M between the inductances will cause a mutual flux to be induced in inductance $L_w$ due to the flux produced by inductance $L_z$. Another mutual flux will result in inductance $L_z$ due to the flux produced by inductance $L_w$. These several fluxes and their creation were theoretically discussed in Pat. No. 3,651,282 as expression (23) therein. Pat. 3,651,282 also shows that the resultant magnetic flux, comprising the various flux components due to the steady state transcendental intelligence signal modulating the sinusoidal carrier signal, is obtained by an infinite series expression of the sum of the several fluxes discussed, wherein each of these fluxes has a parameter defined as A, B, C and D modifying or operating upon the several fluxes. The definition of these parameters, in themselves variables, are stated in expression (30) of Pat. 3,651,282 and constitute the starting point for the technical considerations of magnetic recording, where non-sinusoidal intelligence is applied to the particular magnetic head. Such parameters are defined as follows:

$$A = L_w V_1 / N_w Z(\omega)$$
$$B = L_z V_2 / N_z Z(\beta)$$
$$C = k^2 \beta \; L_w L_z V_2 / N_w Z(\omega) Z(\beta)$$
$$D = k^2 \; L_w L_z V_1 / N_z Z(\omega) Z(\beta) \quad (1)$$

In the computations that follow under this subsection, reasonable values of the various variables comprising parameters A, B, C and D have been assumed, so that these parameters can ultimately be evaluated in terms of specific values of coefficient of coupling $k$, between any two inductances of the magnetic head, which inductances are integral with the core structure of the head. Such assumed values of the variables of course set the parameters equal to constants for a particular coefficient of coupling and permit the absolute values of the resultant modulation flux due to interaction of carrier and intelligence to be plotted as a function of coefficient of coupling.

The values for the several variables, used are assumed as follows:

$$V_1 = V_2 = 1 \text{ volt}$$
$$L_w = L_z = L = 0.5 \text{ hours}$$
$$N_w = N_z = N = 100 \text{ turns}$$
$$R_w = 100 \text{ ohms}$$
$$R_z = 50 \text{ ohms}$$
$$\beta|_{at\ 10\ Hz} = 62.8 \text{ radians per second}$$
$$Z_{(\beta)}|_{at\ 10\ Hz} = 59 \text{ radians per second}$$
$$\beta|_{at\ 20{,}000\ Hz} = 1.256 \times 10^5 \text{ radians per second}$$
$$Z_{(\beta)}|_{at\ 20{,}000\ Hz} = 6.28 \times 10^4 \text{ ohms}$$
$$\omega|_{at\ 417.5 \times 10^3\ Hz} = 2.62 \times 10^6 \text{ radians per second}$$
$$Z_{(\omega)}|_{at\ 417.5 \times 10^3\ Hz} = 1.31 \times 10^6 \text{ ohms} \qquad (2)$$

The parameters $A$, $B$, $C$, and $D$ may now be defined in terms of the coefficient of coupling, $k$, using the values of (1) and (2), as follows:

| Parameter | $\beta = 2\pi \times 10$ | $\beta = 2\pi \times 20\,000$ |
|---|---|---|
| A | $3.82 \times 10^{-9}$ | $3.82 \times 10^{-9}$ |
| B | $8.48 \times 10^{-5}$ | $7.96 \times 10^{-8}$ |
| C | $2.03 \times 10^{-9}\ k^2$ | $3.82 \times 10^{-9}\ k^2$ |
| D | $8.48 \times 10^{-5}\ k^2$ | $7.96 \times 10^{-8}\ k^2$ |

(3)

Substituting specific values of $k$, the values of the parameters may be specifically defined in terms of the several values of coefficient of coupling for $\beta = 2\pi \times 10$ radians per second and for $\beta = 2\pi \times 20{,}000$ radians per second.

Pat. No. 3,651,282 shows that when two frequencies such as a carrier frequency $\omega$ and an intelligence frequency $\beta$, defined respectively as cos $\omega t$ and cos $\beta t$, and the two functions sin $\omega t$, and sin $\beta t$ due to presence of mutual inductance, are applied to a nonlinear device such as a magnetic head, the resultant flux in the core may be expressed by an infinite series containing the parameters $A$, $B$, $C$ and $D$, and their sinusoidal arguments. Such infinite series carried out to four terms of expansion is:

$$\begin{aligned}\phi_x(t) = {} & \left[A\cos\omega t + B\cos\beta t + C\sin\beta t + D\sin\omega t\right] \\ & + \frac{1}{2!}\left[A\cos\omega t + B\cos\beta t + C\sin\beta t + D\sin\omega t\right]^2 \\ & + \frac{1}{3!}\left[A\cos\omega t + B\cos\beta t + C\sin\beta t + D\sin\omega t\right]^3 \\ & + \frac{1}{4!}\left[A\cos\omega t + B\cos\beta t + C\sin\beta t + D\sin\omega t\right]^4 + \ldots\end{aligned} \qquad (6)$$

where the parameters $A$, $B$, and $D$ are defined by the values shown in for the low and high end of the frequency spectrum of intelligence over a range of k= 0.01, 0.1, 0.2 . . . 0.9, 1.0.

Expansion of equation (6) and arrangement of terms results in the expression at (10).

Only such terms that contain both $\omega$ and $\beta$ terms in the same argument are extracted since it is only of interest to analyze such terms that have both the carrier and intelligence components. Since evaluation of the several components will be made by numerical substitution for a variety of values of the A, B, C and D parameters, trivial groups of these parameter combinations are deleted, as they do not affect the solutions desired, since they are swanped out by other larger parameter groups.

It is noted that such terms comprising $(\omega \pm 3\beta)t$ will be swamped out by dropping them from further consideration as justified. Third harmonic terms $(3\omega \pm \beta)t$ are also not considered as they will be trivial compared to certain second harmonics.

The terms, in the form shown in expression (8) are not capable of being quantitively analyzed, except for mere approximations. However, by transforming such expressions into their trigonometric equivalents all components having similar intelligence terms may be alegebraically summed, and the results thereof evaluated. Such transformations are shown simplified as expression (10).

Expression (10) therefore simply defines the fundamental and the several dominant distortion components in terms (10.1), (10.2), (10.3) and (10.4), and also defines the second harmonics and its dominant distortion components in terms (10.5), (10.6), (10.7) and (10.8). It is the moduli of these terms as modified by the carrier arguments, chosen so that both the fundamental and second harmonic components thereof will be in the first quadrant, that are evaluated and the results thereof plotted in FIGS. 9, 10, 11 and 12 respectively in absolute form, since the momentary sinusoidal variations of the carrier and hence the carrier sense is of no interest in determining the magnitude of the carrier flux components as they operate on or effect each of the intelligence arguments.

Response characteristics which are subsequently computed will necessitate evaluation of the flux components as stated in flux expression $\phi_x(t)$ given by equation (10), below. These terms contain sine and cosine terms of the fundamental and second harmonic carrier frequencies as well as their distortion components. To obtain correlation of the fundamental and second harmonic terms, calculations made using equation (10) will necessarily have to be made for the same time period. Hence, to maintain the same time periods for the fundamental and second harmonic components and maintain these calculations in the first quadrant of radian measure, evaluation will be made of all fundamental components when $\omega t\ \pi/8$, and for all second harmonic components when $2\omega t = \pi/4$; in both instances therefore, $t = \pi/8\omega$.

Component Expression $$\phi_x(t) = \left[\left(AB\right)\cos\omega t + \left(BD\right)\sin\omega t\right]\cos\beta t + \left[\left(AC\right)\cos\omega t + \left(CD\right)\sin\omega t\right]\sin\beta t$$

$$- \left[\left(\frac{AC^2}{4}\right)\cos\omega t - \left(\frac{B^2D}{4} - \frac{C^2D}{4}\right)\sin\omega t\right]\cos 2\beta t$$

$$+ \left[\left(\frac{ABC}{2}\right)\cos\omega t + \left(\frac{BCD}{2}\right)\sin\omega t\right]\sin 2\beta t$$

$$+ \left[\left(\frac{A^2B}{4} - \frac{BD^2}{4}\right)\cos 2\omega t + \left(\frac{ABD}{2}\right)\sin 2\omega t\right]\cos\beta t$$

$$+ \left[\left(\frac{A^2C}{4} - \frac{CD^2}{4}\right)\cos 2\omega t + \left(\frac{ACD}{2}\right)\sin 2\omega t\right]\sin\beta t$$

$$+ \left[\left(\frac{C^2D^2}{16} - \frac{A^2B^2}{16} - \frac{B^2D^2}{16}\right)\cos 2\omega t + \left(\frac{ABD^2}{8} - \frac{A^2C^2}{16} - \frac{AC^2D}{8}\right)\sin 2\omega t\right]\cos 2\beta t$$

$$+ \left[\left(\frac{A^2BC}{8} - \frac{BCD^2}{8}\right)\cos 2\omega t + \left(\frac{ABCD}{4}\right)\sin 2\omega t\right]\sin 2\beta t$$

Figure 9:
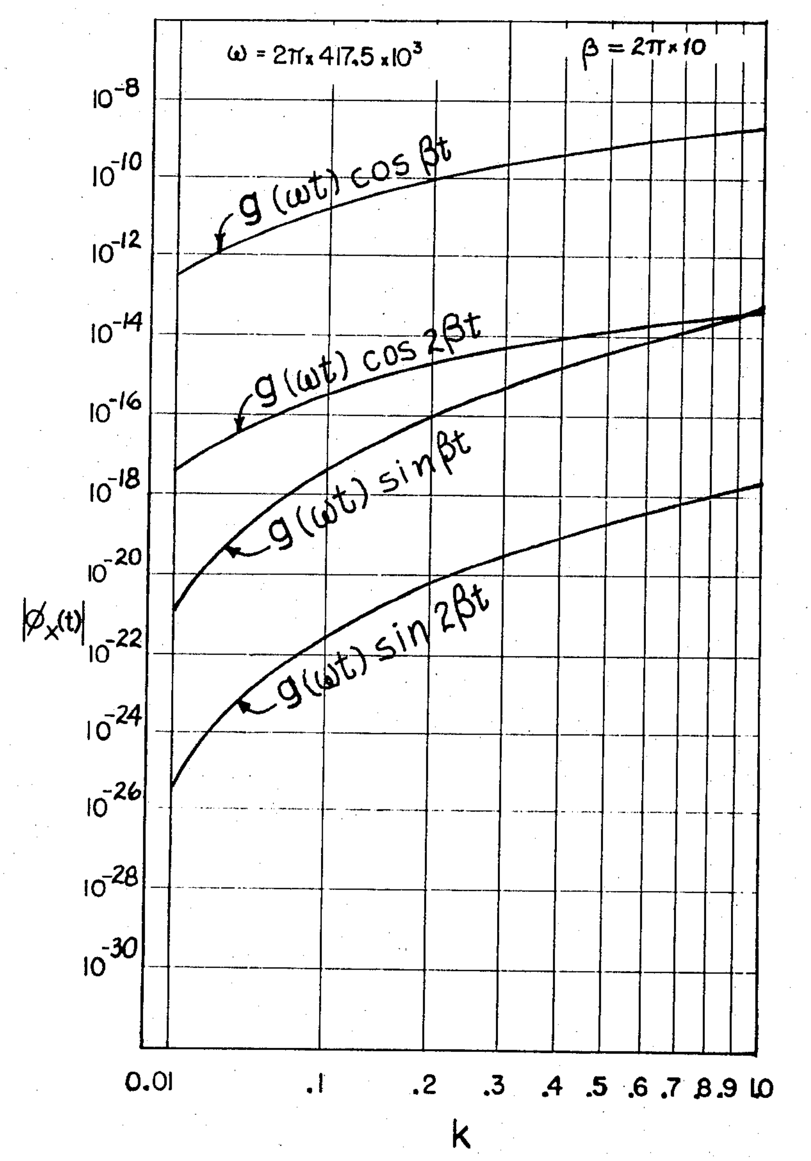
FIG. 9 shows the response characteristics of the absolute value of flux of head of FIG. 7 as a function of the coefficient of coupliong between the several inductances of the head, showing the desired and the several distortion components when the intelligence signal is a low frequency steady state sinusoid, and where the fundamental component of the carrier frequency is utilized.
Figure 10:
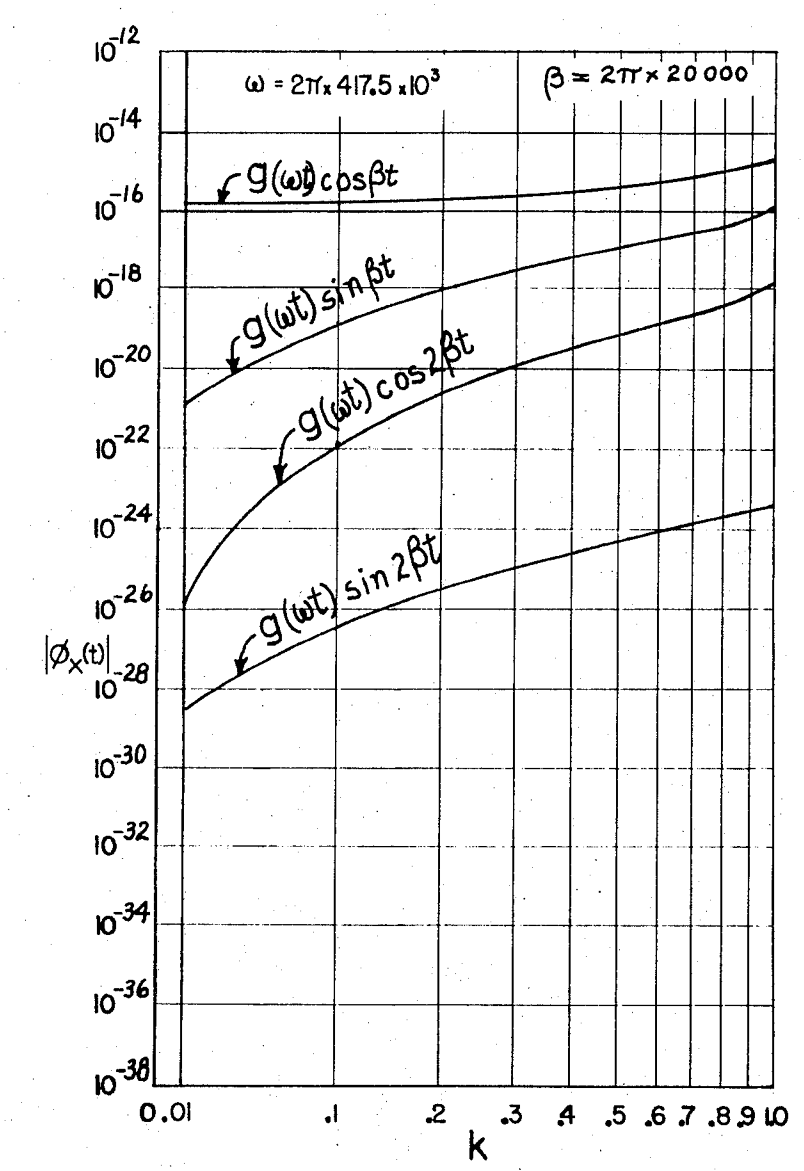
FIG. 10 shows the response characteristics of the absolute value of flux of the head of FIG. 7 as a function of the coefficient of coupling between the several inductances of the head, showing the desired and several distortion components when the intelligence signal is a high frequency steady state sinusoid, and where the fundamental component of the carrier frequency is used.

The various components of the fundamental carrier in expression (10) are computed, the results of such computations as a function of the coefficient of coupling, $k$, are plotted in several figures. FIG. 9 gives the computation results for $\beta = 2\pi \times 10$ radians per second, and FIG. 10 gives the computation results for $B = 2\pi \times 20{,}000$ radians per second, for fundamental and the several distortion components.

Figure 11:
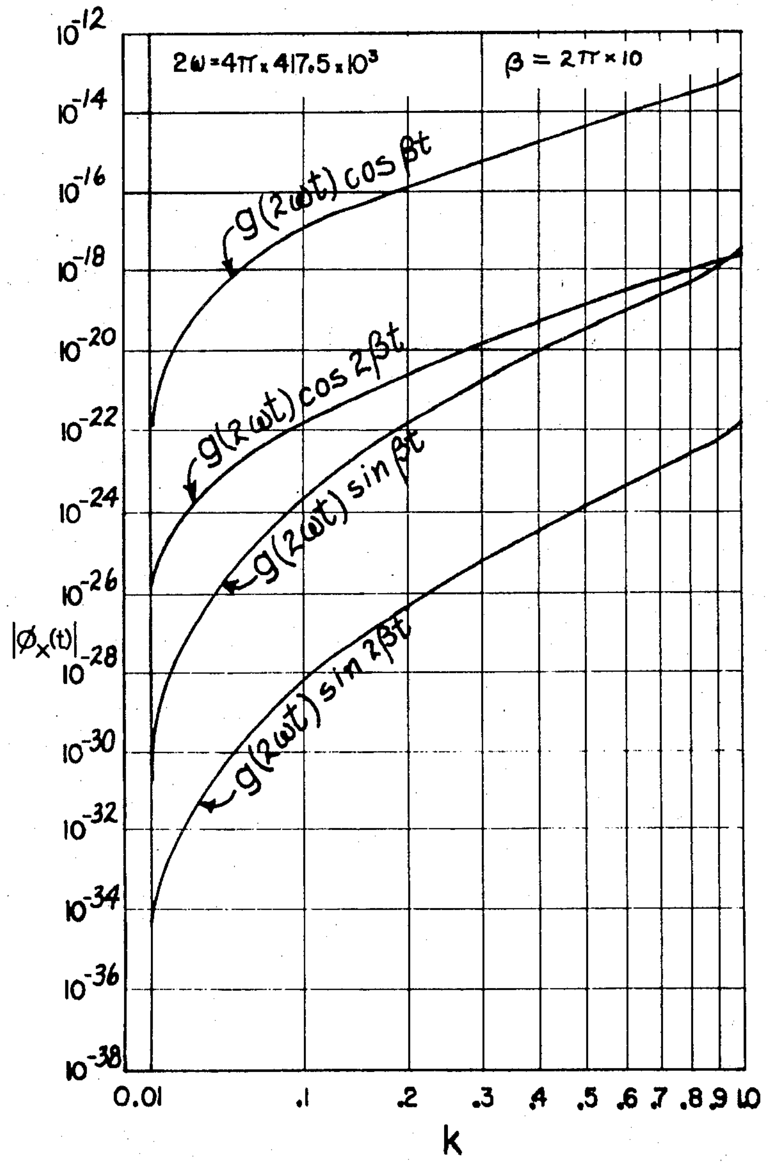
FIG. 11 shows the response characteristics of the absolute value of the flux of the head of FIG. 7 as a function of the coefficient of coupling between the several inductances of the head, showing the desired and several distortion components when the intelligence signal is a low frequency steady state sinusoid, and where the second harmonic component of the carrier frequency is used.
Figure 12:
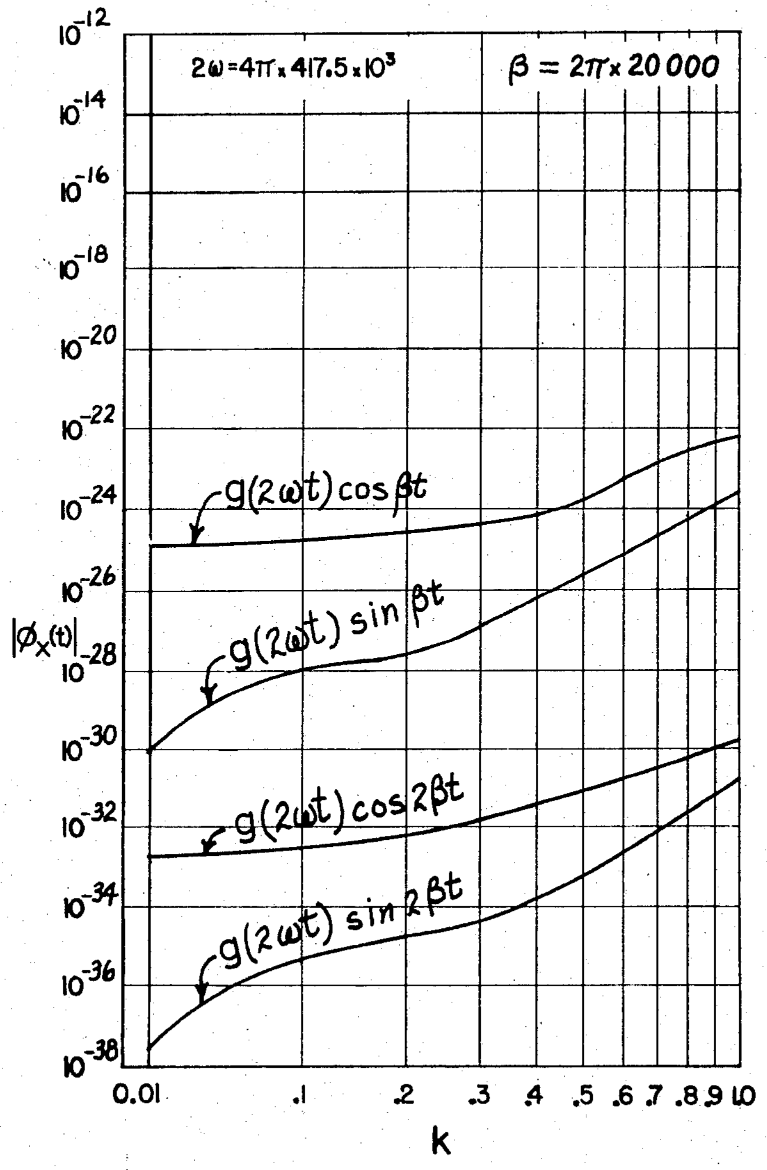
FIG. 12 shows the response characteristics of the absolute value of the flux of the head of FIG. 7 as a function of the coefficient of coupling between the several inductances of the head, showing the desired and several distortion components when the intelligence signal is a high frequency steady state sinusoid, and where the second harmonic component of the carrier frequency is used.

FIG. 11 gives the computation results for $\alpha = 2\pi \times 10$ Hz, and FIG. 12 gives the computation results for $\beta = 2\pi \times 20{,}000$, for the second harmonic and the several distortion components.

It should be noted that although the above computations may show plus or minus values of the several flux components as they vary with the coefficient of coupling, $k$, the plots comprising FIGS. 9 through 12 show absolute values of flux $|\phi_x(t)|$. This is because we are not interested in the sense of the carrier component as it varies rapidly between $\pm 1$ but rather in its absolute value as it relates to the coefficient of coupling. The only purpose in initially using the sense of the component is in actual computation of the moduli of in each of the term groups of equation (10). Once each of these term groups are evaluated and the several moduli of any one component are added or subtracted from each other as called for by the mathematics, the sense of all resultant terms as computed are of no significance, and hence the absolute value thereof are consequently plotted.

It should be noted in the group of modulation components of FIGS. 9 through 12 each component term is identified by name as well as by characterization. For instance, in FIG. 9, the fundamental component is labled $g(\omega t)\cos\beta t$.

Examination of FIG. 9 shows that when the fundamental carrier frequency $\omega$ is used for recording the low end of the intelligence spectrum when $\beta = 2\pi \times 10$ radians per second, there is no particular advantage gained by utilizing different values of coefficient of coupling since all distortion components are substantially attenuated.

Examination of FIG. 10 shows that when the fundamental carrier frequency $\omega$ is used for recording purpose of the intelligence spectrum when $\beta\ 2\pi \times 20{,}000$ radians per second, that operation at the high values of coefficient of coupling, say between $k = 0.9$ and $1.0$ is disadvantageous, since the phase distortion component and other distortion components are insufficiently attenuated as compared to the situation where low coefficients of couplings are employed. The attenuation of the several distortion components is shown to become progressively higher with respect to the fundamental as the coefficient of coupling is reduced, and the amount of coupling becomes rather determinative in relation to amount of distortion that can be tolerated in the particular case.

Therefore, considering use of the fundamental carrier, it would appear that a coefficient of coupling greater than zero but less than 0.9 would be desirable for recording intelligence using the fundamental carrier frequency, where the effective reactances of the carrier circuit are not zero and hence where no resonant current flows in said effective reactances.

Examination of FIG. 11 shows no substantial advantage at the low end of the intelligence spectrum when the carrier is the second harmonics of the applied fundamental frequency.

Examination of FIG. 12 shows some advantage of operating at the lower coefficient of coupling values, but the spread between the second harmonic and its lowest distortion component is not as great for lower values of coefficient of coupling as in the case where the fundamental carrier frequency is used.

Hence, it may be concluded that in non-resonant carrier circuit recording the fundamental carrier is preferred over the second harmonic, and the coefficient of coupling should be in the range greater than the zero and less then 0.9. In order to achieve these desired values of coefficient of coupling between $L_w$ and $L_z$, magnetic discontinuities 13 and 15 are adjusted in size and spacing, a larger sized spacer 15 being provided for introduction of a lowe coefficient of coupling, is made available by the discontinuity or gap 13. Since the core 70 is tapered, the flux density at 13 is greater than at 15, and recording of the flux components of $\phi_x(t)$ on a recording medium, such a magnetic tape, contiguous to the discontinuity at 13 is accomplished.

Referring to FIG. 8, the same core structure is used for reproducing purpose, only with $L_z$ inductance removed, as was used in the recording case. Coil means 60 comprising effective inductance $L_w$ and effective capacitance $C_o$ in accordance with the physical structure are shown in FIG. 6. Coil 60 is wound or otherwise formed by chemical process on portion 16 of core 70, with $R_w$ being symbolically shown to be the effective resistance on inductance $L_w$ as well as the input circuit resistance of amplifier 76 to which coil 60 is connected. The output of coil 60 is therefore connected to the input of amplifier 76, and the output voltage $v_o$ of amplifier 76 will be the recorded signal representation. If $L_w$ and $C_o$ are at resonance, there will be a higher output signal at $v_o$ than if $l_w$ and $C_o$ were not at resonance. Also, at resonance to the fundamental carrier frequency, coil means 60 will act as a filler, only receiving such recorded signals as have fundamental carrier components, and rejecting second and higher order harmonics.

It should of course be pointed out that in all the structures described in this section, as well as in this specification, for such structures as are stated hereinbelow, the several amplifiers shown externally to the particular structure, can be, by integrated and solid state circuit techniques, well known in the art, formed directly on the core material per se. This also applies to such input signal means for the carrier or intelligence source, which are symbolically shown in several structural drawings and schematics. They too may be integrated with the core, by forming such source means directly on each core in question.

It will be subsequently evident that particularly where resonant circuits are involved, that making the various electronics, such as amplifiers and the like, in fixed position on the core will result in controlled distributed capacitance and inductance, so necessary to maintain resonance in such circuit wherein the carrier reactances are at resonance to the applied carrier frequency.

Figure 13:
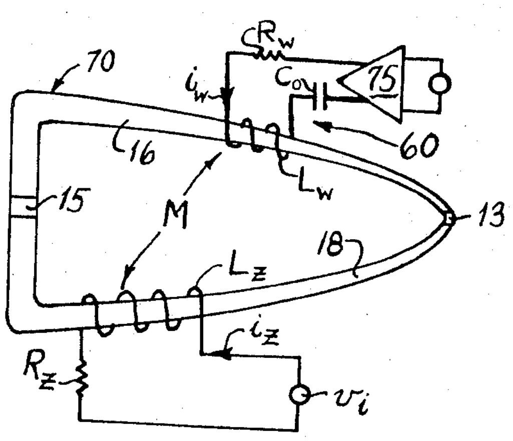
FIG. 13 is a schematic view of a recording head, wherein the effective reactances of the carrier circuit of the head are at resonance to an applied carrier frequency, and where at least one magnetic discontinuity in the magnetizable core structure is present, for recording steady state sinusoidal intelligence.

Response to Carrier-Modulated Sinusoidal Inntelligence When Carrier Reactances Components Are at Resonance With respect to the treatment of carrier-modulated sinusoidal intelligence when the carrier reactance components are at resonance, reference is made to FIGS. 13 and 14. The performance of the recorded results are plotted in FIGS. 15, 16, 17 and 18. FIG. 7 is addressed to the record made configuration of the head, and FIG. 8 is addressed to the reproduce mode configuration of the head.

Referring to FIG. 13, the record head shown therein is similar to the record head of FIG. 7, except that coil 60 is wound on or by chemical process deposited on core portion portion 16. Input signals $v_w$ and $v_i$ are the same as those in FIG. 7. However, the values of the flux components $\phi_x(t)$ available for transfer at discontinuity 13 is materially different in magnitude and in performance when comparing the fundamental performance depicted by FIGS. 16 and 17, and the second harmonic performance depicted by FIGS. 18 and 19.

The principle reason for such differences, is that coil 60 is the flat-tape-wound coil shown in FIG. 6, which is characterized by its effective inductance $L_w$ and its effective distributive capacitance $C_o$. Coil 60 also inherently has an effective resistance $R_w$ which reactance is lumped with the resistance of amplifier 75 at the points where coil 60 is connected to amplifier 75.

Hence, the effective series reactances of the inductance $L_w$ and the capacitance $C_o$ are equal to each other and cancel out at the carrier frequency of 417.5 kilohertz used herein ($\omega = 2\pi \times 417.5 \times 10^3$ radians per second), thereby resulting in a large carrier current limited in magnitude only by the effective resistance $R_w$. Such large carrier current produces a large carrier flux which combines with the flux due to the intelligence as created by $L_z$. These fluxes and the effects due to the mutual inductance M have been heretofore developed in term of equations (6) and (10), and except for the different magnitudes involved, and behavior due to resonance, these formulae apply equally to this section of the specification.

However, the values of the A, C and d parameters used hereinabove, are different since wherever the impedance of the carrier circuit $Z(\omega)$ is expressed in the definition of such parameters, such impedance will become merely $R_w$ since the reactive components then have become zero at resonance. The B parameter being the only parameter which is not a function of carrier circuit impedance will not be affected.

Hence, the parameters are redefined so as to enable combination of new sets of tables which modify tables (4) and (5) to the extent of replacing the $Z(\omega)$.

To accomplish this, the new parameters A', B', C' and D' will be modified by the conversion factors, as follows:

$$A' = A\ Z(\omega)/R_w = 1.31 \times 10^4\ A$$

$$B' = B$$

$$C' = C\ Z(\omega)/R_w = 1.31 \times 10^4\ C$$

$$D' = D\ Z(\ \omega\ )\ /R_w = 1.31 \times 10^4\ D$$

Applying conversion factors (15) the values of the parameters at resonance as a function of the coefficient of coupling for $\beta = 2\pi \times 10$ radians per second and the values of the parameters at resonance as a function of the coefficient of coupling $\beta$ $2\pi \times 20,000$ radians per second provide computations of the modified parameters as a function of the coefficient of coupling.

Equation (10) will be reused to compute the various components of the fundamental and second harmonic except that representing the modified parameters, different results will be obtained under resonant conditions of the carrier reactances. As in the case for non-resonance and for similar reasons stated therein, the absolute values of the flux $|\phi_x(t)|$,available at discontinuity 13 for recording on an external magnetic recording medium, are plotted in FIGS. 15 and 16 for the fundamental carrier components when $\beta = 2\pi \times 10$ radians per second and $\beta = 2\pi \times 20,000$ radians per second, respectively. The absolute values of the flux $|\phi_x(t)|$, available at discontinuity 13 for recording on an external magnetic recording medium, are plotted in FIGS. 17 and 18 for the second harmonic components when $\beta = 2\pi \times 10$ radians per second and $\beta = 2\pi \times 20,000$ radians per second respectively.

Comparison of FIGS. 15 through 18 for the resonant case, with their respective counterpart FIGS. 9 through 12 for the non-resonant case, will show an increase in magnitude at about a factor of $10^4$ in the resonant case over the non-resonant case for the desired fundamental component within the range operation desired, where the coefficient of coupling, $k$, is greater than zero and less than 0.55. It will be noticed that there is substantial attenuation of the various distortion components with respect to the fundamental within this range of coefficient of coupling at the low end of the intelligence spectrum when $\beta = 2\pi \times 10$ radians per second, but at the high end when $\beta = 2\pi \times 20,000$ radians per second, the phase distortion component, $g_o(\omega\ t)\ \sin\ \beta t$ begins to cross-over and become larger than the fundamental component $g_o(\omega\ t)\ \cos\ \beta t$ for values of coefficient of coupling greater than 0.55.

Figure 17:
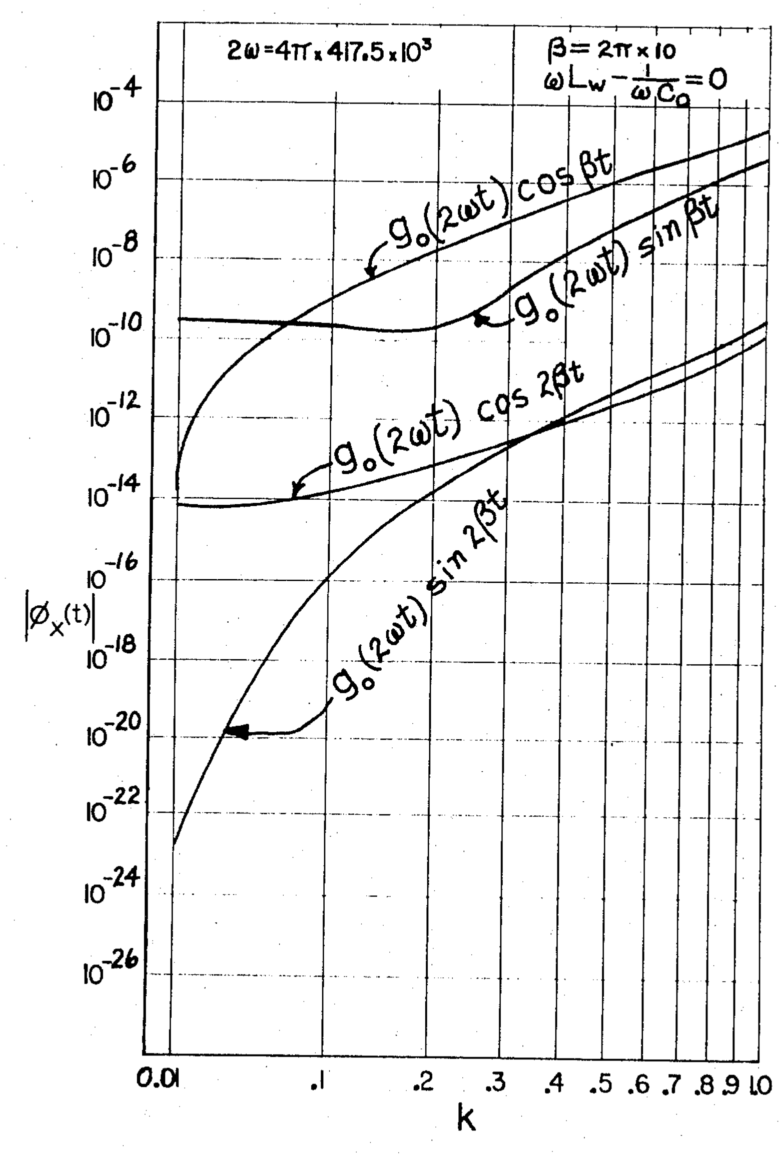
FIG. 17 shows the response characteristics of the absolute value of the flux of the head of FIG. 13 as a function of the coefficient of coupling between the several inductances of the head, showing the desired and several distortion components when the intelligence signal is a low frequency steady state sinusoid, and where the effective reactances of the carrier circuit are at resonance to the second harmonic component of the carrier frequency.
Figure 18:
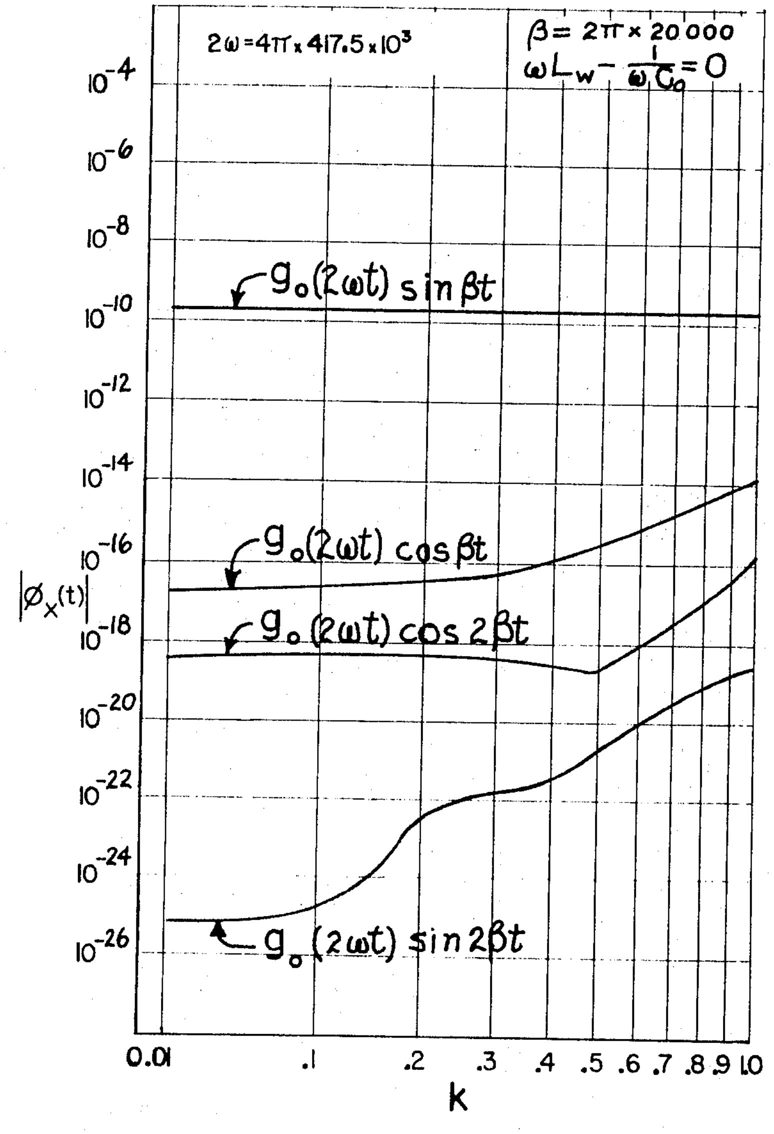
FIG. 18 shows the response characteristics of the absolute value of the flux of the head of FIG. 13 as a function of the coefficient of coupling between the several inductances of the head, showing the desired and several distortion components when the intelligence signal is a high frequency steady state sinusoid, and where the effective reactances of the carrier circuit are at resonance to the second harmonic of the carrier frequency.

Examining the second harmonic responses plotted in FIGS. 17 and 18, we found the second harmonic thoroughly unusable in that the phase distortion component at the low end of the intelligence spectrum is larger than the second harmonic itself for low values of coefficient of coupling, and at the high end of the intelligence spectrum the phase distortion for all values of coefficient of coupling swamps out the second harmonic proper.

The obvious conclusion from these computations is that for the resonant condition of the carrier reactances, the second harmonic is unusable, but adequate attenuation of unwanted distortion components are obtainable for values of coefficient of coupling greater than zero but less than 0.55, for fundamental distortion components, and hence the fundamental carrier is quite usable for the resonant condition within this range of coefficient of coupling.

Referring to FIG. 14, inasmuch as it has been shown for the recording mode that low coefficients of coupling are desirable for the resonant condition, one method of obtaining low coefficients of coupling is to enlarge the magnetic discontinuity of the core structure by removal of a substantial portion thereof as depicted by core 80 having core portions 16' and 18' which are interconnected at 13. Portion 13 is also magnetically discontinuous, but to provide structural strength in core 80 it will be necessary to have a metallic or plastic non-magnetizable material at 13. Coil 60 which is the same as coil 60 described in connection with FIG. 13, is integral with core portion 16' and is connected to input of amplifier 76 from which an output of the intelligence-modulated signal $v_o$ is obtained. It should be noted that since the reactive members of coil 60 are here at resonance to the fundamental carrier frequency that the head in sensing the recorded flux $\phi_x(t)$ will discriminate against all but the fundamental components. As in the recording mode head, if the coefficient of coupling is structured at values greater than zero but less than 0.55, the distortion components will be attenuated to a degree dependent upon the value of the coefficient of coupling chosen within this range.

It should also be noted that the core structure 80 is usable as a core structure in the FIG. 13 configuration, and the core structure 70 may be usable in the FIG. 14 configuration dependent upon the size of magnetic discontinuity 15 therein.

Additionally, it is obvious that core structure 80 whether used as a member of the record head or reproduce head may be also be used as a coil equivalent to coil 40 for connecting the intelligence signal across the free ends of core portions 16' and 18'. When used in the recordmode, core 80 itself may be either the intelligence conducting inductance at the same time serving as a core, with a coil such a coil 60 wound on one of its legs such as shown in FIG. 14, to act as either the carrier frequency reactance or the intelligence-conveying coil, whichever function had not already been assigned to core 80, or visa versa.

Response to Carrier-Modulated Non-Sinusodial Intelligence When Carrier Reactance Components Are Not at Resonance Reference is made to FIGS. 19 through 29 which are exemplary of the head structures and their behavior described in this section, wherein the intelligence signals applied to the head structures herein are non-sinusoidal in character. Any non-sinusoidal signal is basically dependent upon transient techniques for its solution, and a rectangular pulse is only one specific example of non-sinusoidal intelligence. Other types of non-sinusoidal intellignece are complex waveforms of speech or music. In the limit, that is when a portion of a complex waveform is shrunk so that its time base approaches zero, we may consider that small incremental portion of the complex wave as a pulse or impulse function. In analysis of complex waveform of its frequency content, the Fourier approach, for instance, recognizes a rectangular pulse as being comprized of an extremely large or perhaps even an infinite number of frequencies. It is therefore considered in all the examples that follow both in this and in subsequent sections, wherein the rectangular pulse is used in representing the non-sinusoidal intelligence signal, that such representation is the best choice that could be made for such characterization, and that such rectangular pulse will be representative of all waveforms except sinusiodal, the sinusoidal waveforms which were treated above, in fact being a steady-state condition as opposed to the non-sinusoidal waveform condition, which is a transient condition.

In connection with the figures used in this section, the various parameters and variables, as well as values that are assigned thereto, and defined as follows:

$L = L_w = L_z = 0.5$ henries
$M = k\sqrt{L_wL_z} = kL = 0.5k$ henries
$N = N_w = N_z = 100$ turns of coils $L_w$ or $L_z$
$R_w = 100$ ohms
$R_z = 50$ ohms
$C_o = 0.291 \times 10^{-12}$ farads (when at resonance with $L_w$)
$\omega = 2\pi \times 417.5 \times 10^3$ radians per second, or $2.62 \times 10^6$ radians per second
$v_i$ (intelligence signal voltage input) $= V_z\,[u(t) - u(t-T)]$
a rectangular pulse starting at $t = 0$ and having a duration of $T$ seconds
The Laplace transform of $v_i = V_z[(1 - e^{-Ts})/s]$
$v_w$(carrier signal voltage input) $= V_w \cos\omega t$
The Laplace transform of $v_w = V_w[s/(s^2 + \omega^2)]$
$V_w = V_z = 1$ $$\theta_x(t) = \theta_w(t) + \theta_z(t) = L/N\,(i_w + i_z) = (L/N)\,i_x(t) = 5 \times 10^{-3}\,i_x(t)$$

Note that $\theta_x(t)$ is the computed transient response to the applied carrier and intelligence signals and that the relationship between $\theta_x(t)$ and current is derived from Faraday's law of induction. $\theta_x(t)$ will have to be expanded in an infinite series to obtain the intermodulation flux products, in accordance with expression (23), below.

The Laplace transform of $\theta_x(t) = \theta_x(s) =$ $$\int_0^{\infty} \theta_x(t)\, e^{st}\, dt$$

The Inverse Laplace transform of $\theta_x(s) = \theta_x(t)$ $$= \frac{1}{2\pi j}\int_{-j\infty}^{+j\infty} \theta_x(s)\, e^{ts}\, ds =$$

Residues at the poles of $\theta_x 9s)\, e^{ts}$ (22)

The electromagnetic flux developed, due to the non-linear characteristic of the magnetic core, may be expressed in an infinite series, giving rise to cross-modulation products of carrier and intelligence signals, which can be stated as:

simplicity, we shall refer to and use $\phi_x(t)$ in the ensuing discussions.

Figure 19:
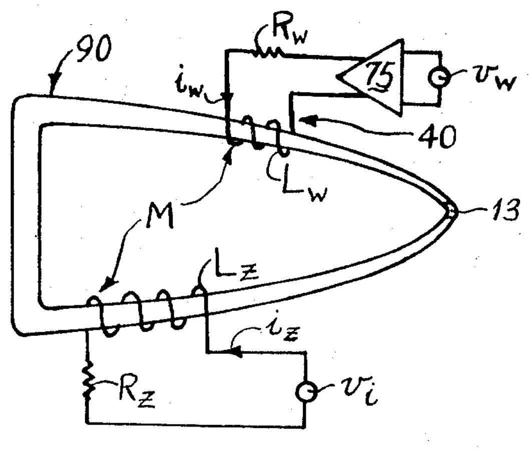
FIG. 19 is a schematic view of a recording head when no resonant condition to an applied carrier frequency is involved in the carrier circuit portion of the head, and where an intelligence signal comprising non-sinusoidal intelligence is applied to one of the inductances of the head, and where the magnetizable core structure has at least one magnetic discontinuity therein.
Figure 20:
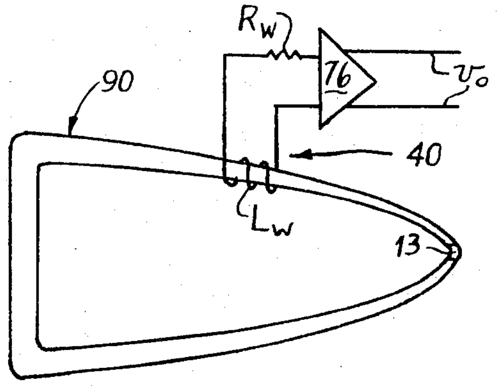
FIG. 20 is a schematic view of a reproduce head where there is no resonance in the carrier circuit to an applied carrier signal, and generally the reproduce counterpart to the record head of FIG. 19.

Hence, since certain of the coils are wound, as for example in FIG. 3, and represented schematically by FIGS. 7, 19 and 20, no capacitance $C_o$ is considered. The cores in such structures use coils 40, which are considered effectively as being inductive in nature and having inherent resistance. But wherein the structure follows that shown in FIG. 6 and represented schematically by FIGS. 8, 13, 14, 30, 31, 33, 34, 39, 40 or 41, one of the coils of the type designated by 60, which is intentionally structured to provide both inductive and distributed capacitance characteristics, enable the resonating of the effective inductance with the distributed capacitance at the carrier frequency $\omega$. It is noted that a rather substantial number of combinations of inductance and capacitance are possible to achieve resonance at any particular carrier frequency selected, and no importance should be attached to the fact that some of the values if used in the examples are at the outer limits of value possible of physical achievement, as in these examples the value of the distributed capacitance is quite small. We are not restricted to these combinations of inductance and capacitance, as other combinations of lower inductance and higher capacitance values could be used with the same effect as described herein.

The non-resonant condition is first treated, and therefore FIGS. 1, 2, 3, 4, 5, 7, and 19 are specifically referred to for recording the non-sinusoidal modulated intelligence in the presence of a carrier frequency on a magnetically susceptible material external to the head configurations described.

With respect to the characterized behavior of the recording head depicted by the schematic of FIG. 7 having already been described above, it is found that the only substantial difference between FIGS. 7 and 19 is that FIG. 19 has only one discontinuity 13 at the recording point of its core 90, not having the other discontinuity in the core, and since for the most part the large coefficient of coupling values will be favored in this section, FIG. 19 would in most instances be preferable to FIG. 7 to obtain the desired results.

Insofar as reproducing the recorded flux under non-resonant conditions, FIG. 20 having magnetizable core 90 would have coil 40 wound thereon, which could be a simple inductance $L_w$ with inherent sensitive $R_w$. An amplifier 76 would be connected to coil 40. $R_w$ is considered as inclusive of the coil resistance as well as the input resistance to amplifier 76 to which coil 40 is connected. The reproduced signals are as denoted at $v_o$. However, in some instance the reproduce head depicted by FIG. 8, discussed above, would be preferred in view of the resonant condition obtainable by the in- $$\phi_x(t) = \theta_x(t) + \frac{1}{2!}\left[\theta_x(t)\right]^2 + \frac{1}{3!}\left[\theta_x(t)\right]^3 + \frac{1}{4!}\left[\theta_x(t)\right]^4 + \ldots \quad (23)$$

It should be noted that the flux $\phi_x(t)$ is the total flux which has displacement, conductive, and convective components as briefly discussed in the brief summary of Oliver Heaviside's Electromagnetic Theory treatise, and that the convective portion having the same formulation as the total flux $\phi_x(t)$, except for its magnitude, is the actual portion recorded and subsequently reproduced. But for convenience, and to maintain relative herent resonance of coil $L_w$ with capacitance $C_o$. Aside from resonance obtained utilizing coil 60, the configuration of FIG. 8 can be interchanged with that of FIG. 20 for reproducing purposes. The operation of the reproduce head of FIG. 8 will be substantially similar using core 70 or core 90, except that when core 70 is used discontinuities at 15 and 13 therein would have to be no larger than discontinuity 13 in core 90.

No matter which of the recording structures herein referred to are used, the results obtained by these recording structures for the several intelligence pulse signals used, provide response characteristics of $\phi_x(t)$ The non-resonant condition is first treated, and therefore FIGS. 1, 2, 3, 4, 5, 7, and 19 are specifically referred to for recording the non-sinusoidal intelligence in the presence of a carrier frequency on a magnetically susceptible material external to the head configurations described.

With respect to the characterized behavior of the recording head depicted by the schematic of FIG. 19, FIG. 7 having already been described above, it is found that the only substantial difference between FIGS. 7 and 19 is that FIG. 19 has only one discontinuity 13 at the recording point of its core 90, not having the other discontinuity in the core, and since for the most part the large coefficient of coupling values will be favored in this section, FIG. 19 would in most instances be preferable to FIG. 7 to obtain the desired results.

Insofar as reproducing the recorded flux under non-resonant conditions, FIG. 20 having magnetizable core 90 would have coil 40 wound thereon, which could be a simple inductance $L_w$ with inherent sensitive $R_w$. An amplifier 76 would be connected to coil 40. $R_w$ is considered as inclusive of the coil resistance as well as the input resistance to amplifier 76 to which coil 40 is connected. The reproduced signals are as denoted at $v_o$. However, in some instance the reproduce head depicted by FIG. 8, discussed above, would be preferred in view of the resonant condition obtainable by the inherent resonance of coil $L_w$ with capacitance $C_o$. Aside from resonance obtained utilizing coil 60, the configuration of FIG. 8 can be interchanged with that of FIG. 20 for reproducing purposes. The operation of the reproduce head of FIG. 8 will be substantially similar using core 70 or core 90, except that when core 70 is used discontinuities at 15 and 13 therein would have to be no larger than discontinuity 13 in core 90.

Figure 21:
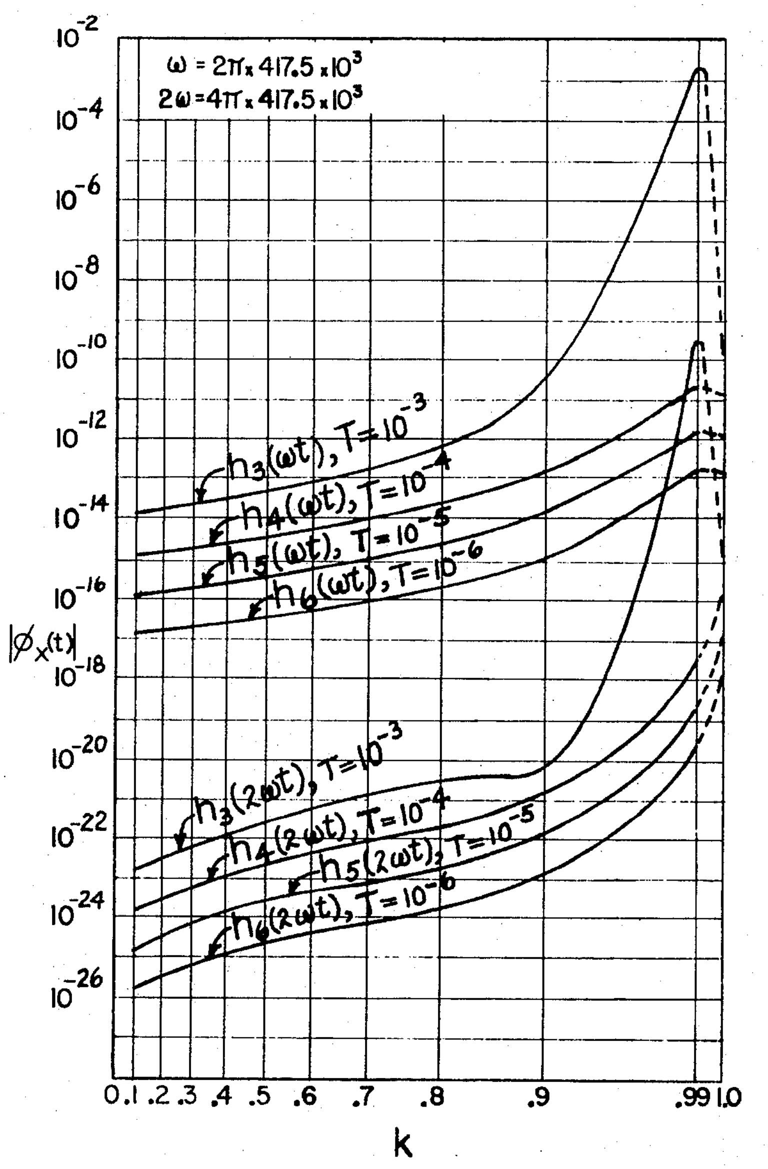
FIG. 21 shows the response characteristics of the absolute value of the flux of the head of FIG. 19 as a function of coefficient coupling between the several inductances of the head, showing the desired and several distortion components when the intelligence signals comprise rectangular pulses of varied pulse widths, under conditions of fundamental and second harmonic carrier frequency components modulated by the several pulses.

No matter which of the recording structures herein referred to are used, the results obtained by these recording structures for the several intelligence pulse signals used, provide response characteristics of $\phi_x(t)$ as a function of the coefficient of coupling k, depicted in FIG. 21 wherein the absolute value of $|\phi_x(t)|$ is plotted with respect to the coefficient of coupling, since momentary excursions of the carrier frequency, changing its sense from positive to negative and visa versa is of no significance. The plotted results in FIG. 21 have been derived by expansion of $\theta_x(t)$ into an infinite series as defined by expression (23) which is evaluated and plotted below.

Therefore, referring to FIG. 19 in order to obtain an electrical transient solution of the $\theta_x(t)$ flux, which can then be expanded into an infinite series to obtain the magnetic total flux expression containing intermodulation components of the carrier frequency and an intelligence rectangular pulse, the equations resulting may be stated more conveniently in Laplace transform format, resulting in:

$$s/s^2+\omega^2 = (sL_w + R_w)I_w - MsI_z$$
$$l-e^{-Ts}/s = -MsI_w + (sL_z + R_z)I_z \qquad (24)$$

Since $L_w = L_z = L$, from (22), the solution for the currents in the complex plane are:

$$I_w = \frac{(L+M - Me^{-Ts})s^3 + R_z s^2 + \omega^2 M(1-e^{-Ts})s/s(s^2+\omega^2)}{[(L^2-M^2)s^2 + L(R_w+R_z)s + R_wR_z]}$$

$$I_z = \frac{(L+M-Le^{-Ts})s^3 + R_w(1-e^{-Ts})s^2 + \omega^2 L(1-e^{-Ts})s + \omega^2 R_w(1-e^{-Ts})}{s(s^2+\omega^2)\left[(L^2-M^2)s^2 + L(R_w+R_z)s + R_wR_z\right]} \qquad (26)$$

$$I_x = I_w + I_z = \frac{\left[(2L+2M)-(L+M)e^{-Ts}\right]s^3 + \left[(R_w+R_z) - R_we^{-Ts}\right]s^2 + \left[\omega^2(L+M) - \omega^2(L+Me^{-Ts})\right]s + \left[\omega^2R_w(1-e^{-Ts})\right]}{s(s+j\omega)(s-j\omega)\left[(L^2-M^2)s^2 + L(R_w+R_z)s + R_wR_z\right]} \qquad (27)$$

$$\theta_x(s) = \frac{\frac{L}{N}\left\{[2L(1+k) - L(1+k)e^{-Ts}]s^3 + [(R_w+R_z) - R_we^{-Ts}]s^2 + [L(1+k)\omega^2 - L(1+k)\omega^2e^{-Ts}]s + [\omega^2R_w - \omega^2R_we^{-Ts}]\right\}}{s(s+j\omega)(s-j\omega)[L^2(1-k^2)s^2 + L(R_w+R_z) + R_wR_z]} \qquad (28)$$

$\theta_x(t)$ is obtained by computing the inverse Laplace transform of $\theta_x(s)$, the formula being:

$$\theta_x(t) = L^{-1}\theta_x(s) = \Sigma\text{Residues at poles of } \theta_x(s)e^{ts} \quad (29)$$

Therefore, using the values of the parameters of (22), we obtain:

$$\theta_x(s)e^{st} = \frac{5\times10^{-3}\left\{[(1+k)e^{st} - 0.5(1+k)e^{s(t-T)}]s^3 + [150e^{st} - 100e^{s(t-T)}]s^2 + [0.5(1+k)\omega^2 e^{st} - 0.5(1+\ )\omega^2 e^{s(t-T)}]s + [100\omega^2 e^{st} - 100\omega^2 e^{s(t-T)}]\right\}}{s(s+j\omega)(s-j\omega)[0.25(1-k^2)s^2 + 75s + 5000]}$$

$$= \frac{G_1}{s} + \frac{G_2}{(s+j\omega)} + \frac{G_3}{(s-j\omega)} + \frac{G_4}{(s+\alpha_1)} + \frac{G_5}{(s+\alpha_2)} \quad (30)$$

The solution of the quadratic expression of the denominator of (30) providing the roots $\alpha_1$ and $\alpha_2$ which represent two of the poles, the remaining poles being a pair of complex conjugate poles at $\pm\omega$, and a pole at zero. The residues of the poles will be obtained by solving for $G_1$ through $G_5$ of the partial fractions in (30), and summing the residues at these poles to obtain $\theta_x(t)$. $\theta_x(t)$ is solved in terms of $\omega$ in its modulus, and also solved specifically for $\omega = 2\pi \times 417.5 \times 10^3$ radians per second, in both instances as a function of the coefficient of coupling, $k$.

The total flux created in the core $\phi_x(t)$ resulting after expansion of $\theta_x(t)$ in the infinite series, will have terms containing combinations of sinusiodal and exponential expressions, as well as terms containing only sinusoidal and only exponential arguments. Since there is no interest in such latter terms, only such terms as have both simusoidal and exponential expressions are extracted from the infinite series expansion, since this will confine attention to the modulation products bearing intelligence. Also dropping terms of higher order than the fundamental and second harmonic groups of the carrier signal as trivial terms, which are swamped by the magnitudes of the fundamental and second harmonic, useful expressions of $\phi_x(t)$ is obtained.

It should be noted that in the following solutions for the total flux, that the fundamental components of the carrier frequency have $\omega t$ in their sinusoidal arguments, whereas the second harmonic components of the carrier frequency will have $2\omega t$ in their sinusoidal arguments.

The solution of the total magnetic flux produced by a core which is magnetized as a function of time $t$, pulse width T, and coefficient of coupling $k$.

In order to maintain the same time reference throughout the computations for both the fundamental and second harmonic components, particular time units are selected that place the fundamental and second harmonic components in the first quadrant of radian measure of $\omega$ and $2\omega$, thereby enabling the evaluation of the various flux components which represent the dominant terms.

When the frequency of the carrier is $417.5 \times 10^3$ Hz, the fundamental carrier $\omega = 2\pi \times 417.5 \times 10^3 = 0.835\pi \times 106$ radians per second, and the second harmonic of such carrier $2\omega = 4\pi \times 417.5 \times 10^3 = 1.67\pi \times 10^6$ radians per second.

Under these conditions, table 34 is constructed and utilized to evaluate $\phi_x(t)$ for various values of $k$. The solution of $\phi_x(t)$ as a function of $k$ when $t = 0.15 \times 10^{-6}$ seconds in terms of pulse widths of $T = 10^{-3}, 10^{-4}, 10^{-5}$ and $10^{-6}$ for fundamental and second harmonic carrier are plotted in FIG. 21.

| $t$ seconds | $\omega t$ radians | $\cos \omega t$ | $\sin \omega t$ | $2\omega t$ radians | $\cos 2\omega t$ | $\sin 2\omega t$ | |
|---|---|---|---|---|---|---|---|
| 0 | 0 | +1.0 | 0 | 0 | +1.0 | 0 | |
| $0.15 \times 10^{-6}$ | 0.125 | +0.924 | +0.383 | 0.25 | +0.707 | +0.707 | |
| $0.973 \times 10^{-5}$ | 8.125 | +0.924 | +0.383 | 16.25 | +0.707 | +0.707 | |
| $0.983 \times 10^{-4}$ | 82.125 | +0.924 | +0.383 | 164.25 | +0.707 | +0.707 | (34) |
| $0.999 \times 10^{-3}$ | 834.125 | +0.924 | +0.383 | 1668.25 | +0.707 | +0.707 | |
| $0.9997 \times 10^{-2}$ | 8348.125 | +0.924 | +0.383 | 16696.25 | +0.707 | +0.707 | |
| $0.99983 \times 10^{-1}$ | 83488.125 | +0.924 | +0.383 | 166976.25 | +0.707 | +0.707 | |

Observation of FIG. 21 shows that the best operating conditions of the head which is responsive to non-sinusoidal intelligence and which has magnetic discontinuities in its core is between $k$=0.9 and $k$=1.0, with maximum values somewhere close to $k$=1.0. To obtain a high order of magnitude of flux response it is necessary to have at least one root in the quadratic of the denominator of equation (30) be large resulting in a large residue at that pole, and yielding a large value of $\phi_x(t)$. This may be achieved by selecting the proper values of inductance and resistance for the coils used in the head. But, it is to be remembered that this special condition is due to the fact that the carrier reactances are not at resonance, and moreover that there are some discontinuities in the magnetizable core. As in the former case, only the absolute values of $|\phi_x(t)|$ is of interest, the momentary positive and negative excursions of the carrier signal being unimportant for plotting the response characteristics in FIG. 21.

Referring to FIGS. 22 through 29, from the results plotted in these figures, one half of the carrier-modulated intelligence pulse is shown in each of these figures for pulse widths ranging from $10^{-3}$ to $10^{-6}$ seconds, for both the fundamental and second harmonic components of the carrier signal as provided by the record head of FIG. 19, the recording flux being made available at discontinuity 13.

The carrier input signal $v_w$ applied to amplifier 75 and into coil 40, designated by inductance $L_w$, provides a current $i_w$ in the inductance and creates a flux in core 90. The intelligence pulse input signal $v_i$ is applied to inductance $L_z$ producing a current $i_z$ that causes inductance $L_z$ to produce a flux in core 90 that combines and interacts with the flux produced by inductance $L_w$. The interaction of these fluxes provide the various flux components which we call the total flux $\phi_x$.

It should be noted that in obtaining these results, the mutual inductance as shown designated by M in FIG. 19, is of considerable importance, in that it bears upon the value of the coefficient of coupling.

It should also be noted that although FIGS. 22 through 29 are shown plotted in only the positive sense, due to the carrier signal excursions occurring many times during any one pulse duration there will be a mirror-image characteristic curve in addition to the characteristic curves shown in these figures, but for simplicity of illustration, the mirror image curves are not shown.

Thus FIGS. 22 through 29 are representative of half the several modulation envelopes illustrated for each of three conditions of coefficient of coupling, and since we have determined from the results plotted in FIG. 21, that our interest in this head configuration lies for coefficients of coupling within the range of 0.9 to 1.0, for various values of pulse width $T = 10^{-3}$, $10^{-4}$, $10^{-5}$ and $10^{-6}$, evaluation for coefficients of coupling of $k = 0.9$, 0.99 and 1.0 as a function of time, in order to determine the pulse fidelity under these conditions for both the fundamental carrier modulation and the second harmonic carrier modulation is of interest.

Generally it can be seen that at $k = 0.9$ or 1.0, the pulse maintains itself substantially at the same level far beyond the time where it is supposed to have been greatly attenuated, with the most desirable characteristics achieved for a coefficient of coupling close to unity.

Ever since magnetic recording came into being, it had been thought that discontinuities or air gaps are dire necessities in a head at the point of recording or reproducing. Therefore, in this configuration, which considers a head with discontinuities in the magnetic material of the core, it would appear to be desirable to limit the coefficient of coupling to values greater than 0.9 but less than 1.0.

With respect to the reproduce head, the same criteria is applicable as in the record head for similar configurations. Therefore, in FIG. 20, core 90 should have its discontinuity 13 adjusted to a small enough value in order to achieve near unity coefficient of coupling. It is the point of discontinuity 13 at which introduction from the external recording medium, such as a magnetic tape, provides the flux that circulates in core 90. The core may also act as an inductive pick up loop, avoiding the necessity of winding a coil thereon. In the configuration of FIG. 20, the coefficient of coupling we are referring to is that which exists between core 90 and coil 40, designated as inductance $L_w$. Amplifier 76 action to produce $v_o$ output, is the same as heretofore discussed in other configurations having the same amplifier designation. Here too, it is possible and even advantageous to use coil 60 instead of coil 40, with its inherent capacitance $C_o$ which may also be partially provided by an actual capacitor, in order to resonate $L_w$ with such capacitance, and thereby provide higher sensitivity and larger signal pick-up from the externally recorded medium.

The solutions plotted in FIGS. 22 through 29 are for the non-resonant case.

Figure 22:
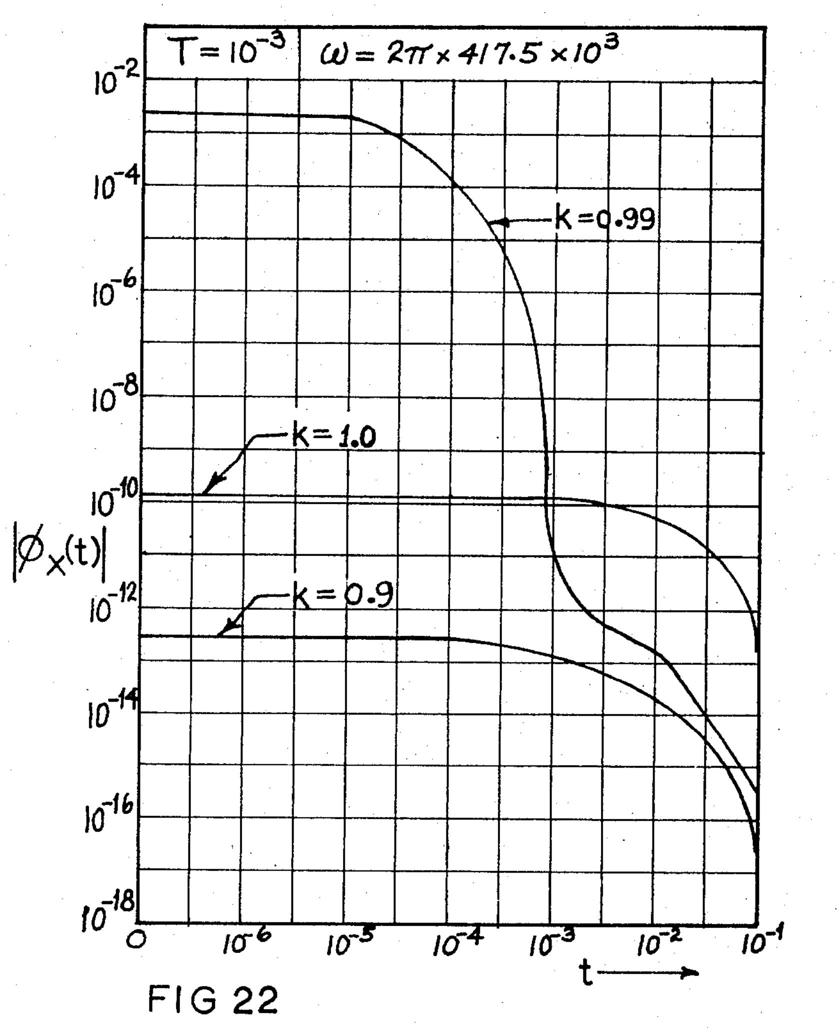
FIG. 22 shows modulation envelope response characteristics of the absolute value of flux of the head of FIG. 19 as a function of time for three values of coefficient of coupling for a pulse width of $10^{-3}$ seconds and for the fundamental component of the carrier frequency.

FIG. 22 shows the plotted results consisting of the fundamental modulation envelope component response as a function of time in seconds for three values of coefficient of coupling and for a pulse width of $10^{116}$ $^{3}$ seconds.

Figure 23:
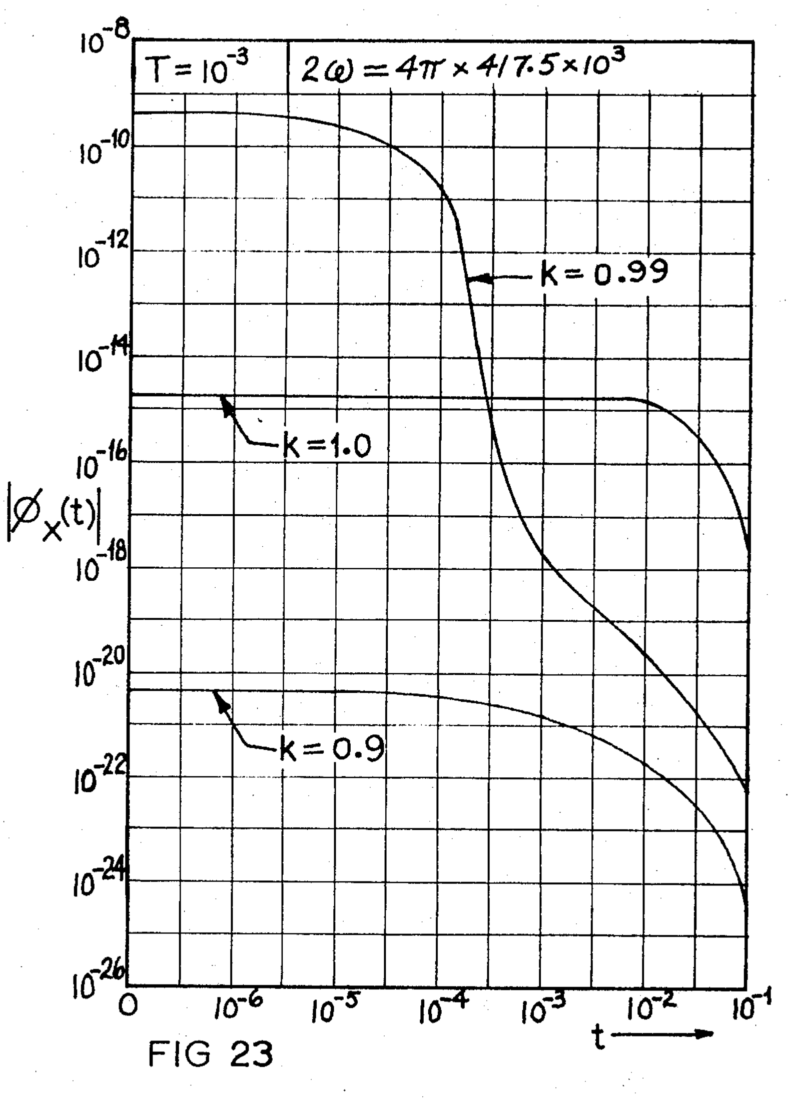
FIG. 23 shows modulation envelope response characteristics of the absolute value of flux of the head of FIG. 19 as a function of time for three values of coefficient of coupling for a pulse width of $10^{-3}$ seconds and for the second harmonic component of the carrier frequency.

FIG. 23 shows the plotted results consisting of the second harmonic modulation envelope component response as a function of time in seconds for three values of coefficient of coupling and for a pulse width of $10^{-3}$ seconds.

Figure 24:
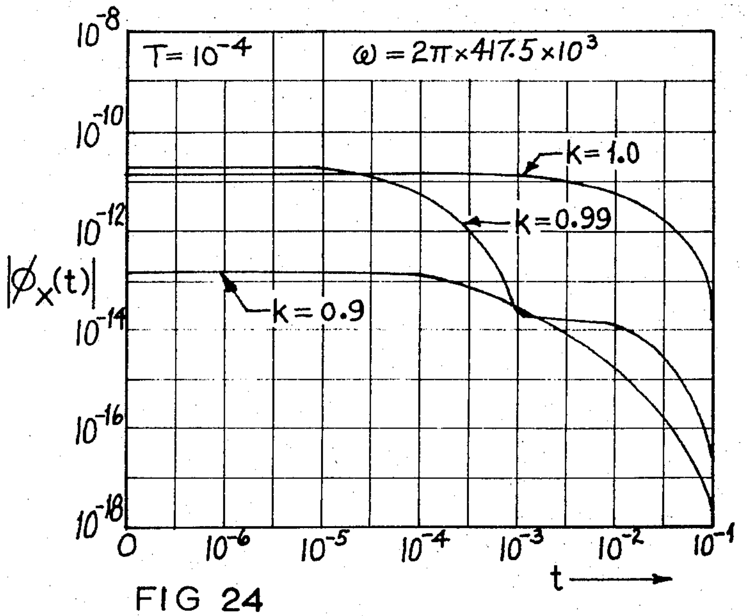
FIG. 24 shows modulation envelope response characteristics of the absolute value of flux of the head of FIG. 19 as a function of time for three values of coefficient of coupling for a pulse width of $10^{-4}$ seconds and for the fundamental component of the carrier frequency.

FIG. 24 shows the plotted results consisting of the fundamental modulation envelope component response as a function of time in seconds for three values of coefficient of coupling and for a pulse width of $10^{-4}$ seconds.

Figure 25:
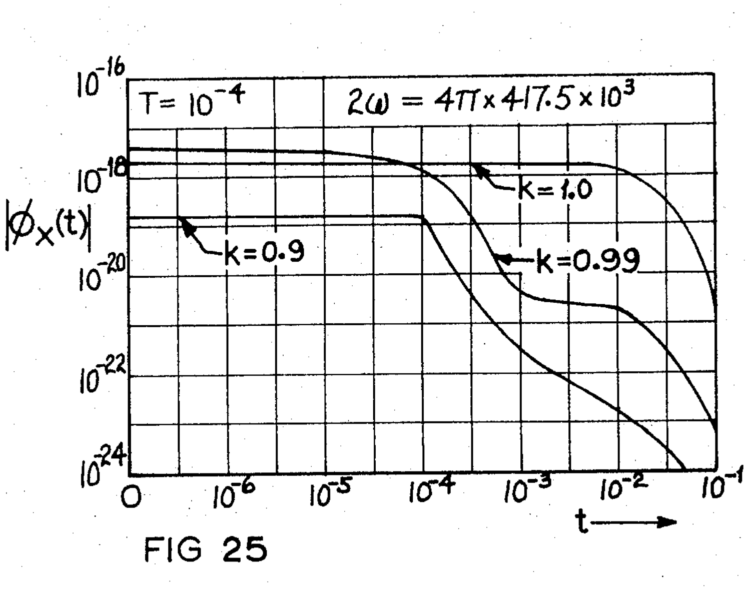
FIG. 25 shows modulation envelope response characteristics of the absolute value of flux of the head of FIG. 19 as a function of time for three values of coefficient of coupling for a pulse width of $10^{-4}$ seconds and for the second harmonic component of the carrier frequency.

FIG. 25 shows the plotted results consisting of the second harmonic modulation envelope component response as a function of time in seconds for three values of coefficient of coupling and for a pulse width of $10^{-4}$ seconds.

Figure 26:
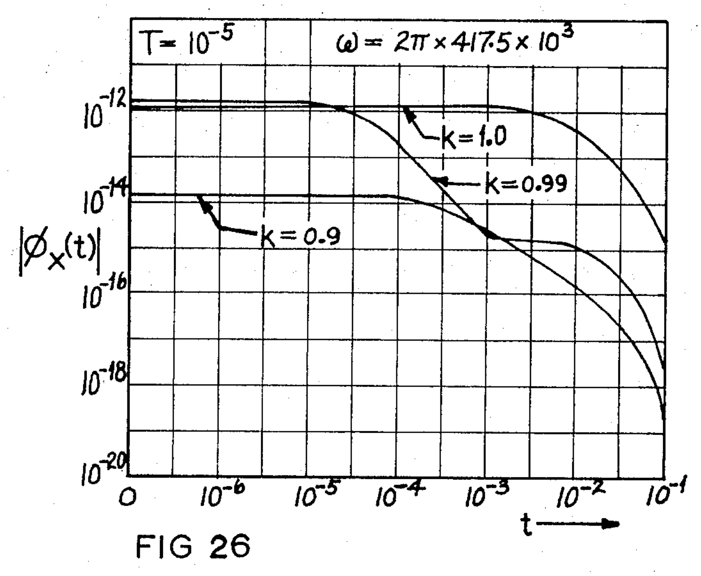
FIG. 26 shows modulation envelope response characteristics of the absolute value of flux of the head of FIG. 19 as a function of time for three values of coefficient of coupling for a pulse width of $10^{-5}$ seconds and for the fundamental component of the carrier frequency.

FIG. 26 shows the plotted results consisting of the fundamental modulation envelope component response as a function of time in seconds for three values of coefficient of coupling and for a pulse width of $10^{-5}$ seconds.

Figure 27:
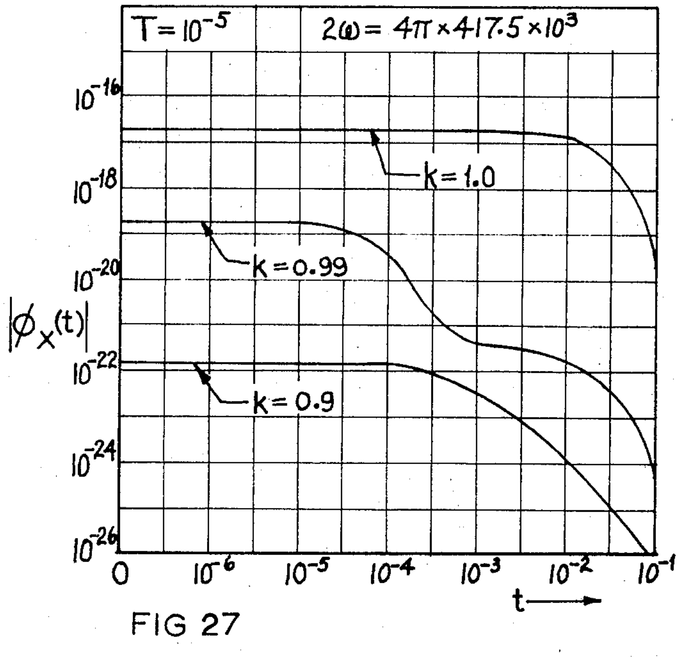
FIG. 27 shows modulation envelope response characteristics of the absolute value of flux of the head of FIG. 19 as a function of time for three values of coefficient of coupling for a pulse width of $10^{-5}$ seconds and for the second harmonic component of the carrier frequency.

FIG. 27 shows the plotted results consisting of the second harmonic modulation envelope component response as a function of time in seconds for three values of coefficient of coupling and for a pulse with of $10^{-5}$ seconds.

Figure 28:
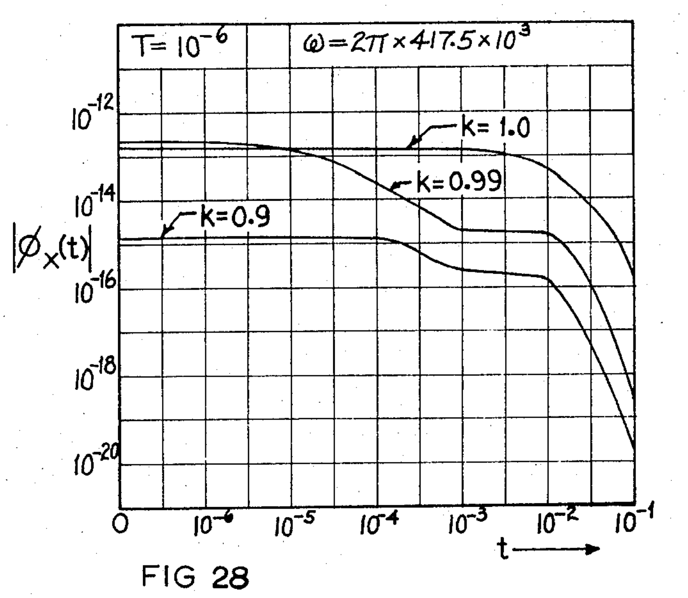
FIG. 28 shows modulation envelope response characteristics of the absolute value of flux of the head of FIG. 19 as a function of time for three values of cofficient of coupling for a pulse width of $10^{-6}$ seconds and for the fundamental component of the carrier frequency.

FIG. 28 shows the plotted results consisting of the fundamental modulation envelope component response as a function of time in seconds for three values of coefficient of coupling and for a pulse width of $10^{-6}$ seconds.

Figure 29:
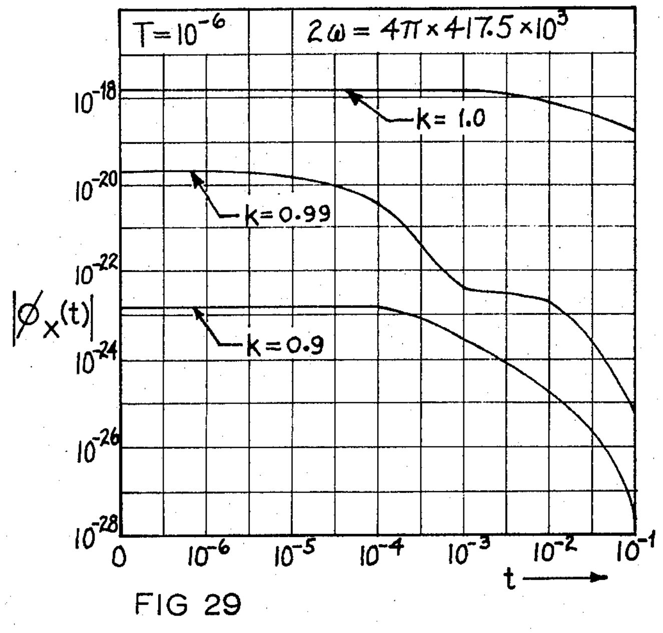
FIG. 29 shows modulation envelope response characteristics of the absolute value of flux of the head of FIG. 19 as a function of time for three values of coefficient of coupling for a pulse width of $10^{-6}$ seconds and for the second harmonic component of the carrier frequency.

FIG. 29 shows the plotted results consisting of the second harmonic modulation envelope component response as a function of time in seconds for three values of coefficient of coupling and for a pulse width of $10^{-6}$ seconds.

Referring to FIGS. 19*a*, 19*b* and 19*c*, it can be seen that magnetizable core 90' or 90'' is similar to magnetizable core 90 of FIG. 19. The FIG. 19*a* or 19*b* or 19*c* structure has similar response characteristics as shown by response curves of FIGS. 21–29, wherein $\theta_x(t)$ is the total flux in the head. However, here coils $L_w$ and $L_z$ are wound about the outer periphery of the elongated cores. To better understand the flux paths involved we shall consider the total flux $\theta_x(t)$ due to currents $i_w$ and $i_z$ respectively flowing in coils $L_w$ and $L_z$. We may define the total flux in terms of components so that:

$$\theta_x(t) = \theta_a + \theta_b$$

where $$\theta_a = \theta_{a1} + \theta_{a2} + \theta_{a3}$$

$$\theta_b = \theta_{b1} + \theta_{b2} + \theta_{b3}$$

Flux components $\theta_{a1}$ and $\theta_{b1}$ are the components of flux being conducted in the core material and tend to cancel each other due to circulation in opposite directions in the elongated core structure. Flux components $\theta_{a3}$ and $\theta_{b3}$ are leakage flux components across the elongated core and are also in opposite directions with respect to each other and therefore cancel each other. Flux components $\theta_{a2}$ and $\theta$hd b2 however are represented as being conductive outward from the core at magnetic discontinuities 13 or 13' and are in the same direction thereby adding to each other and constitute the effective recording flux communicated to a recording surface such as magnetic tape external to the head. Coil $L_w$ which is responsive to a carrier frequency signal may be resonated to the carrier signal by means of effective series capacitance, or shunt capacitance across the coil.

Accordingly, a magnetic head to tranflux signals with attenuation of distortion components comprises a magnetizable core 90' or 90'' having at least one magnetic discontinuity 13 or 13'. This head has a first inductance $L_w$ wound on the core responsive to a predetermined frequency, and a second inductance $L_z$ wound on the core responsive to intelligence signals, the first and second inductances being coupled to each other so as to effect a coefficient of coupling therebetween ranging between 0.9 and less than 1.0.

Figure 30:
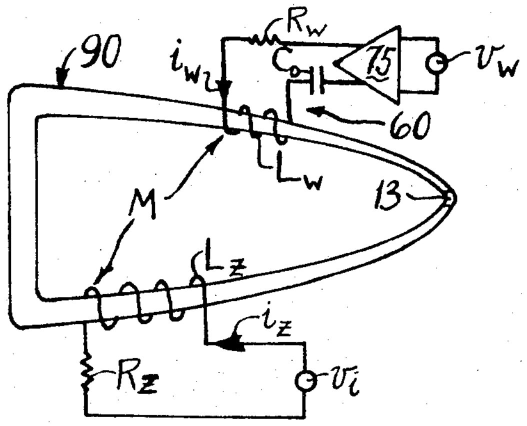
FIG. 30 is a schematic view of a record head wherein the effective reactances of the carrier circuit of the head are at resonance to an applied carrier frequency, and where the magnetizable core structure has one magnetic discontinuity for recording non-sinusoidal intelligence.
Figure 31:
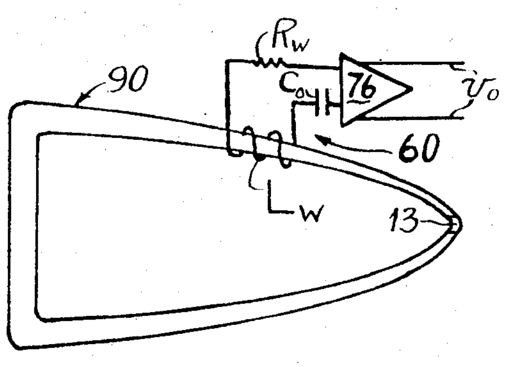
FIG. 31 is a schematic view of a reproduce head when the effective reactances are at resonance to a previously recorded carrier frequency, and may generally by the counterpart reproduce configuration of the record head of FIG. 30, wherein the magnetizable core structure has a magnetic discontinuity therein.

Response to Carrier-Modulated Complex Waveform Intelligence When Carrier Reactance Components are in Resonant Condition Referring to FIG. 30, for the record electromagnetic head and to FIG. 31 for the reproduce electromagnetic head, these figures comprise the basis for describing the head for the resonant condition of the carrier frequency reactances when the coefficient of coupling is less than 1.0. Also referring to FIG. 32, the response characteristics of one-half the modulation envelope of the carrier frequency and each of four different pulse widths, are shown.

In FIG. 30, due to the mutual inductance M between inductances $L_w$ and $L_z$ is taken at a value less than unity, specifically for $k$=0.99. Such coefficient of coupling is obtained by creating a magnetic discontinuity 13 in core 90 either by a very narrow gap, by insertion of a non-magnetic spacer thereat, or by rewelding the narrow gap at 13, the weld itself introducing sufficient non-homogeneity of the core material, or anisotropy thereat, to effectively provide the discontinuity and hence the desired coefficient of coupling.

Otherwise, the head structure is as previously described in connection with FIGS. 19 and 20, above, except that the additional inherent capacitance $C_o$, either being a built into the structural design of coil 60 or externally provided to resonate inductance $L_w$ at the particular carrier frequency desired, is in this instance $\omega = 2\pi \times 417.5 \times 10^3 = 2.62 \times 10^6$ radians per second. At resonance therefore, $\omega L_w = 1/\omega C_o = 0$.

Hence, using the structure of FIG. 30, equational relationships may be established directly in Laplace transform notation. It should be noted that it is optional whether the mutual inductance is selected as being positive or negative, it being a function of the direction of windings $L_w$ and $L_z$ with respect to each other. Whichever is selected, the characteristic of the equation, specifically the denominator of the functional expression in the complex plane, will be identical to each other. The difference between negative or positive mutual inductance only slightly affecting the numerator of such complex functional expression.

Therefore, $$s/s^2 + \omega^2 = (sL_w + R_w + 1/sC_o)I_w - sMI_z$$
$$1 - e^{-Ts}/s = -sMI_z + (sL_z + R_z)I_z \quad (45)$$

Utilizing the values of parameters as stated in expression group (22) and solving for $I_x = I_w + I_z$ in terms of the coefficient coupling $k$, we obtain:

$$I_x = \frac{\begin{aligned}&[(1+k) - 0.5(1+k)e^{-Ts}]s^4 + [150 - 100e^{-Ts}]s^3 \\ &+[(6.86 \times 10^{12} + 3.43 \times 10^{12}k) - (6.86 \times 10^{12} + 3.43 \times 10^{12}k)e^{-Ts}]s^2 \\ &+[(6.86 \times 10^{14} - 6.86 \times 10^{14}e^{-Ts})]s \\ &+[(2.36 \times 10^{25} - 2.36 \times 10^{25}e^{-Ts})]\end{aligned}}{s(s^2+\omega^2)[0.25(1-k^2)s^3 + 75s^2 + 1.72 \times 10^{12}s + 1.72 \times 10^{14}]} \quad (46)$$

Evaluating for $k = 0.99$, finding the roots of the quadratic in the denominator, by synthetically dividing out a real root so that quadratic expression remains, multiplying through by $5 \times 10^{-3}$ for converting $I_x$ into $\theta_x(s)$, by multiplying by $e^{st}$ for the purpose of taking residues, we obtain:

$$\Theta_x(s)e^{st} = \frac{\begin{aligned}&[1.99e^{st} - 0.995 e^{s(t-T)}]s^4 \\ &+[150 e^{st} - 100 e^{s(t-T)}]s^3 \\ &+[1.026 \times 10^{13}e^{st} - 1.026 \times 10^{13}e^{s(t-T)}]s^2 \\ &+[6.86 \times 10^{14}e^{st} - 6.86 \times 10^{14}e^{s(t-T)}]s \\ &+[2.36 \times 10^{25}e^{st} - 2.36 \times 10^{25}e^{s(t-T)}]\end{aligned}}{s(s+j\omega)(s-j\omega)(s+100.4)(s+7.5 \times 10^3 \pm j1.85 \times 10^7)} \quad (47)$$

Evaluating by residues, we obtain;

$$\Theta_x(t) = 1.05 \times 10^{-12}\cos\omega t - 7.74 \times 10^{-9} \sin\omega t + 9.9 \times 10^{-5} e^{-100.4t} - 9.9 \times 10^{-5} e^{-100.4(t-T)} - [1.83 \times 10^{-2} \cos 1.85 \times 10^7 t - 8.96 \times 10^{-2} \sin 1.85 \times 10^7 t]e^{-7500t} + [1.48 \times 10^{-2} \cos 1.85 \times 10^7(t-T) - 4.42 \times 10^{-2} \sin 1.85 \times 10^7(t-T)]\, e^{-7500(t-T)} \quad (48)$$

Figure 32:
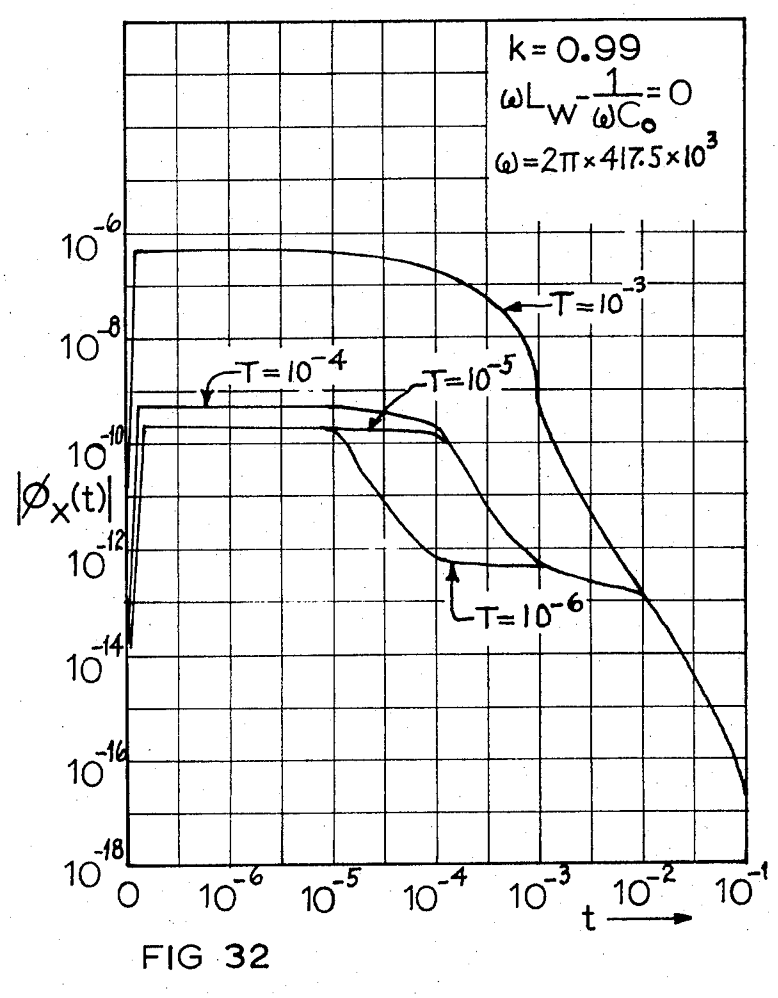
FIG. 32 shows modulation envelope response characteristics of the absolute value of flux of the head of FIG. 30 as a function of time for four different pulse widths that modulate the fundamental component of the carrier frequency, and where the coefficient of coupling, between the several inductances of the head is 0.99.

For the purpose of expansion in terms of expression (23) format, we may neglect those exponentials in (48) which are a function of time only, and not of pulse width. Hence, limiting the expansion to fundamental components of the applied carrier frequency, such expansion after dropping trivial terms, the usable part of the expansion becomes:

Several observations are to be made for the reasons that the curves in FIG. 32 do not have sharp cut off at termination of the intelligence pulses. It is noted that unless one can eliminate reactive effects due to the carrier reactance components of coil 60, spurrious oscillations in addition to the applied carrier frequency normal oscillation, will result. The characteristics of ex- $$\phi_x(t) = -[1.04 \times 10^{-16}\cos\omega t - 7.67 \times 10^{-13} \sin\omega t]e^{-100.4(t-T)} + [5.15 \times 10^{-21}\cos\omega t - 3.80 \times 10^{-17} \sin\omega t]e^{-200.8(t-T)} + [1.55 \times 10^{-14}\cos\omega t \cos 1.85 \times 10^7(t-T) - 4.64 \times 10^{-14} \cos\omega t \sin 1.85 \times 10^7(t-T)]e^{-7500(t-T)} - [1.55 \times 10^{-10}\sin\omega t \cos 1.85 \times 10^7(t-T) - 3.42 \times 10^{-10} \sin\omega t \sin 1.85 \times 10^7(t-T)]e^{-7500(t-T)} - [1.55 \times 10^{-18}\cos\omega t \cos 1.85 \times 10^7(t-T) - 4.60 \times 10^{-18} \cos\omega t \sin 1.85 \times 10^7(t-T)]e^{-7500(t-T)} + [1.19 \times 10^{-14}\sin\omega t \cos 1.85 \times 10^7(t-T) - 3.39 \times 10^{-14} \sin\omega t \sin 1.85 \times 10^7(t-T)]e^{-7500(t-T)} \quad (49)$$

Using the time values, cosine values and sine values established in table (34), equation (49) is evaluated for the several values of pulse widths as a function of time units in seconds, the results of which are shown in table (50) below, and plotted in FIG. 32.

pression (47) tells us that in the particular combination of parameters selected, that such spurrious oscillation will be created at $1.85 \times 10^7$ radians per second. This comes about by the presence of a pair of complex conjugate roots resulting from evaluation of the quadratic

| $t$ | $T = 10^{-3}$ | $T = 10^{-4}$ | $T = 10^{-5}$ | $T = 10^{-6}$ | |
|---|---|---|---|---|---|
| 0 | $2.64 \times 10^{-11}$ | $3.26 \times 10^{-14}$ | $1.68 \times 10^{-14}$ | $1.55 \times 10^{-14}$ | |
| $0.15 \times 10^{-6}$ | $5.82 \times 10^{-7}$ | $7.18 \times 10^{-10}$ | $3.68 \times 10^{-10}$ | $3.42 \times 10^{-10}$ | |
| $0.973 \times 10^{-5}$ | $5.82 \times 10^{-7}$ | $7.18 \times 10^{-10}$ | $3.42 \times 10^{-10}$ | $3.18 \times 10^{-10}$ | |
| $0.983 \times 10^{-4}$ | $2.78 \times 10^{-7}$ | $3.66 \times 10^{-10}$ | $1.78 \times 10^{-10}$ | $7.67 \times 10^{-13}$ | (50) |
| $0.999 \times 10^{-3}$ | $3.42 \times 10^{-10}$ | $7.00 \times 10^{-13}$ | $7.60 \times 10^{-13}$ | $6.90 \times 10^{-13}$ | |
| $0.9997 \times 10^{-2}$ | $3.15 \times 10^{-13}$ | $2.83 \times 10^{-13}$ | $2.84 \times 10^{-13}$ | $2.84 \times 10^{-13}$ | |
| $0.99983 \times 10^{-1}$ | $3.06 \times 10^{-17}$ | $3.06 \times 10^{-17}$ | $3.06 \times 10^{-17}$ | $3.06 \times 10^{-17}$ | |

expression that results when the root of $s = -100.4$ is synthetically extracted, there resulting a negative expression under the radical when the standard formulation for quadratic solution is applied.

These spurious oscillations prevent the modulation envelope from being rectangular or very steep. Such difficulties will be seen to have been overcome with the same electrical parameters, and under the same operating conditions, except that unity coefficient of coupling is used, achieved by using a head with a gapless or homogeneous magnetizable material. Such unity coefficient of coupling permits cancellation of the mutual inductance parameters, at least in the denominator or characteristic expression, and radically modifies the characteristic response of the head, as shown hereinbelow.

Figure 33:
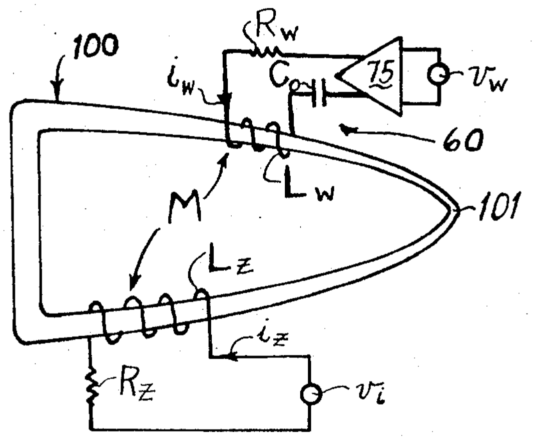
FIG. 33 is a schematic view of a record head wherein the effective reactances of the carrier circuit of the head are at resonance to an applied carrier frequency, and wherein the magnetizable core structure of the head is of homogeneous magnetizable material devoid of magnetic discontinuities.
Figure 34:
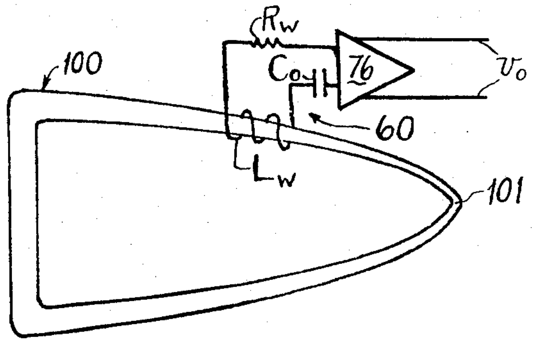
FIG. 34 is a schematic view of a reproduce head wherein the effective reactances of the head are at resonance to a previously recorded carrier frequency and may generally be the counterpart reproduce configuration of the record head of FIG. 33, and wherein the magnetizable core structure of the head is of homogeneous magnetizable material devoid of magnetic discontinuities.
Figure 35:
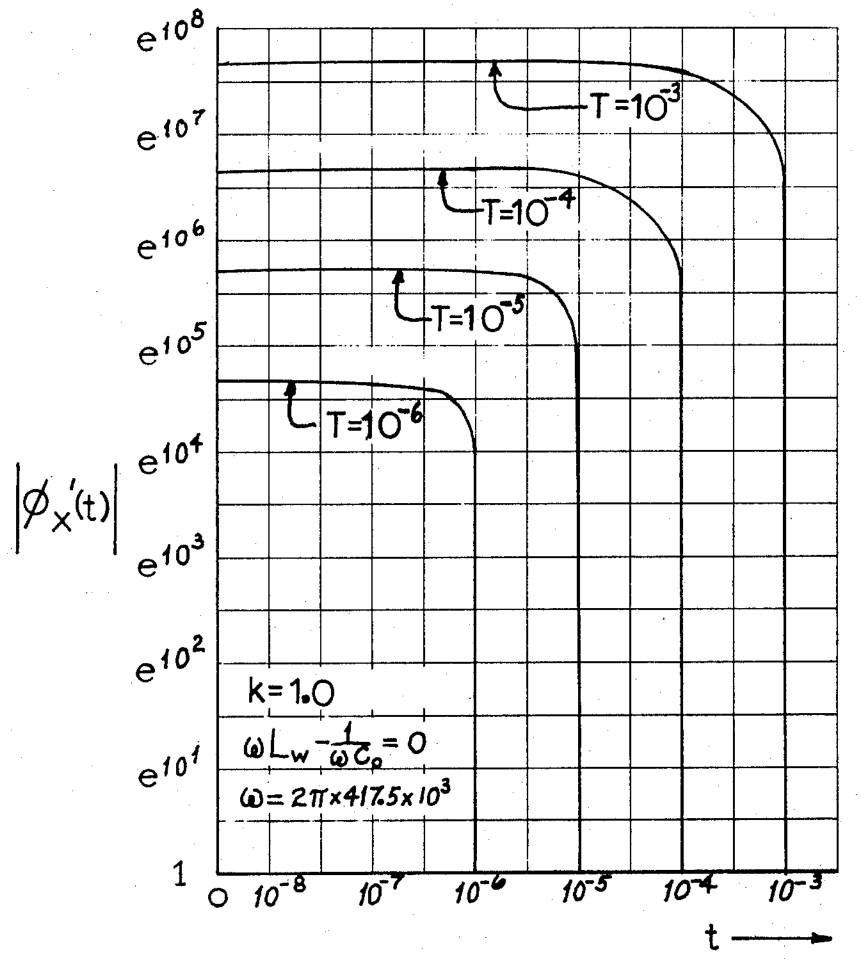
FIG. 35 shows modulation envelope response characteristics of the absolute value of flux of the head of FIG. 33 as a function of time for four different pulse widths that modulate the fundamental component of the carrier frequency, and where the coefficient of coupling between the several inductance of the head is unity.

Referring to FIG. 33 for the record electromagnetic head and to FIG. 34 for the comparable reproduce head, the configurations of FIGS. 33 and 34 are similar to configurations of FIGS. 30 and 31 respectively, except that in FIGS. 33 and 34 no discontinuity at narrowed portion 101 of core 100 is present. In other words there is no conventional air gap or other magnetic discontinuity in the core and core 100 is substantially of a homogeneous magnetizable material throughout. As discussed in summing up Heaviside's treatise, above, the gapless core is justified by the presence of convective flux or field radiating from the electrified core surface during the recording process and thereby magnetizing the external magnetic recording medium contiguous thereto. Also, as discussed above, the narrowed portion of the core at 101 provides greater flux concentration thereat, and consequently greater flux density of the convection flux and field at that point as compared to other portions of the core which are not narrowed in cross-sectional area. FIG. 35 shows the one-half modulation envelope performance characteristics for the same intelligence pulses applied to coil $L_z$. Notably under conditions where the core is magnetically non-discontinuous as in FIGS. 33 and 34, can unity coefficient of coupling be achieved. The difference between the non-discontinuous magnetic core and one with even a slight magnetic discontinuity is startling, performance wise. The wave shape of the intelligence signal recorded is virtually exactly the same as the wave shape of the electrical intelligence signal applied to inductance $L_z$, as seen in FIG. 35, and this would be true for any other signal having a different wave shape.

Such beneficial performance is due to a major extent upon the fact that the mutual inductance, M, cancels completely in the denominator or characteristic expression in the complex plane, since it is equal valued with the product of $\sqrt{L_w L_z}$, whereas in the case of the the magnetically discontinuous core, no matter how small the discontinuity, there is still remaining some mutual inductance characterizing the behavior of the head with attendant spurious oscillations. Also present is an amplification or signal gain in the head with the nondiscontinuous core, that is not present in any other configuration, partly due to resonance of the carrier reactances, but mostly due to the establishment of unity coefficient of coupling by virtue of the magnetically non-discontinuous core.

These phenomena will become apparent in the mathematical treatment, below wherein the values of the parameters are still the same as before, namely as set forth in parameter group expression (22).

It should be noted, however, that the equations do not take into consideration saturability of the materials used in the several core structures, or the limitations upon the total flux in the core controlled by the core material hysterysis loop. This freedom from flux limitation in the core, a theoretically ideal state, will necessarily show high flux magnitudes, similar to the comparison with a resistance-free coil where the magnitude of transient current can build up to infinity, but nonetheless in this instance the treatment serves to show the benefits derivable even if taken on a comparative basis with other cores having magnetic discontinuities therein. Hence, such large flux magnitudes in the practical or real case, will of course be heavily attenuated by the actual size and type of magnetizable core material.

But these large theoretical fluxes obtained, help to establish one very important criteria, which is that with a non-discontinuous magnetic core it is possible to obtain almost instananeous rise and fall time characterizing the intelligence signals, otherwise not obtainable in the prior art, or even in the prior configurations with magnetic discontinuities therein. Hence the total flux developed in connection with FIG. 33 configuration in practical cores will be limited in magnitude but still retaining the rapid rise and fall time of the applied intelligence signals, thereby insuring recording fidelity, enabling closer packing of intelligence signals, and enabling more rapid recording and reproducing of signals, particularly pulses, as well as enabling the recording of significantly narrower pulse widths down to $10^{-10}$ seconds or better.

Therefore, according to the configuration of FIG. 33, the equational relationships written directly in Laplace transform notation, are:

$$s/s^2 + \omega^2 = (sL_w + R_w + 1/s\ C_o)I_w + sMI_z$$
$$1 - e^{-Ts}/s = sMI_w + (sL_z + R_z)\ I_z \tag{51}$$

Solving for $I_w$ and $I_z$ and summing the two solutions, we obtain:

$$I_x = I_w + I_z = \frac{\begin{array}{l}[(L_w+L_z-2M) - (L_w-M)e^{-Ts}]\,s^4 \\ +[(R_w+R_z) - R_w e^{-Ts}]\,s^3 \\ +[(\omega^2 L_w - \omega^2 M + \frac{1}{C_o}) - (\omega^2 L_w - \omega^2 M + \frac{1}{C_o})e^{-Ts}]\,s^2 \\ +[\omega^2 R_w - \omega^2 R_w e^{-Ts}]\,s + [\frac{\omega^2}{C_o} - \frac{\omega^2}{C_o}e^{-Ts}]\end{array}}{s(s^2+\omega^2)[(L_wL_z-M^2)s^3 + (L_zR_w+L_wR_z)s^2 + (\frac{L_z}{C_o} + R_wR_z)s + \frac{R_z}{C_o}]} \tag{52}$$

For $k = 1.0$, and using the values of parameters from (22), we obtain:

$$I_x = \frac{\begin{array}{l}[150 - 100\, e^{-Ts}]\, s^3 \\ +[3.43 \times 10^{12} - 3.43 \times 10^{12}\, e^{-Ts}]\, s^2 \\ +[100\omega^2 - 100\omega^2\, e^{-Ts}]\, s \\ +[3.43 \times 10^{12}\omega^2 - 3.43 \times 10^{12}\omega^2\, e^{-Ts}]\end{array}}{s(s^2+\omega^2)[75s^2 + 1.72 \times 10^{12}s + 1.72 \times 10^{14}]} \qquad (53)$$

Factoring 75 from the denominator of (53), extracting roots and multiplying through by $e^{st}$ for the purpose of taking residues at the poles, we obtain:

$$I_x(s)e^{st} = \frac{\begin{array}{l}1.33 \times 10^{-2} \{[150e^{st} - 100e^{s(t-T)}]\, s^3 \\ \quad +[3.43 \times 10^{12}e^{st} - 3.43 \times 10^{12}e^{s(t-T)}]\, s^2 \\ \quad +[6.86 \times 10^{14}e^{st} - 6.86 \times 10^{14}e^{s(t-T)}]\, s \\ \quad +[2.36 \times 10^{25}e^{st} - 2.36 \times 10^{25}e^{s(t-T)}]\}\end{array}}{s(s+j\omega)(s-j\omega)(s+100)(s + 2.29 \times 10^{10})} \qquad (54)$$

Taking residues at the poles of expression (54), we obtain:

$$\begin{aligned} i_x(t) = & -[2.9 \times 10^{-11} \cos\omega t + 2.2 \times 10^{-15} \sin\omega t\,] \\ & -[2 \times 10^{-2}\, e^{-100t} - 2 \times 10^{-2}\, e^{100(T-t)}] \\ & +[3.81 \times 10^{-19}\, e^{-2.29 \times 10^{10}t} - 2.9 \times 10^{-11}\, e^{2.29 \times 10^{10}(T-t)}] \end{aligned} \qquad (55)$$

Equation (55) may be approximated for the purpose of expansion by disregarding the non dominant terms. It should be noted that the exponential $e^{2.29 \times 10^{10}(T-t)}$ will be extremely large for all values except for values when $(T-t)$ is less than zero, that is negative, so that the term containing this exponential controls, and such terms containing $e^{100(T-t)}$ are trivial for positive values of $(T-t)$ that are encountered herein. If equation (55) is multiplied by $5 \times 10^{-3}$ for converting this equation to a form suitable for obtaining the flux by the usual expansion process, we may approximate the results with good accuracy as:

$$\theta_x(t) \approx -[1.45 \times 10^{-13} \cos\omega t + 1.10 \times 10^{-17} \sin\omega t + 1.45 \times 10^{-13}\, e^{2.29 \times 10^{10}(T-t)}] \qquad (56)$$

Expanding (56) into the form defined by expression (23), we obtain:

$$\begin{aligned} \phi_x(t) = & -[(7.32 \times 10^{-53}\cos\omega t + 5.60 \times 10^{-57}\sin\omega t)\, e^{6.87 \times 10^{10}(T-t)} \\ & +(1.53 \times 10^{-39}\cos\omega t + 1.15 \times 10^{-43}\sin\omega t)\, e^{4.58 \times 10^{10}(T-t)} \\ & +(2.10 \times 10^{-26}\cos\omega t + 1.60 \times 10^{-30}\sin\omega t)\, e^{2.29 \times 10^{10}(T-t)} \\ & +(5.50 \times 10^{-53}\cos 2\omega t + 5.80 \times 10^{-44}\sin 2\omega t)\, e^{4.58 \times 10^{10}(T-t)} \\ & +(7.63 \times 10^{-40}\cos 2\omega t + 1.15 \times 10^{-43}\sin 2\omega t)\, e^{2.29 \times 10^{10}(T-t)} \\ & +(1.83 \times 10^{-53}\cos 3\omega t - 8.00 \times 10^{-76}\sin 3\omega t)\, e^{2.29 \times 10^{10}(T-t)}] \end{aligned} \qquad (57)$$

For the fundamental and second harmonic terms in (57), the larger positive exponentials will swamp out the smaller valued terms, and expression (57) may be accurately approximated as:

$$\phi_x(t) \cong -[(7.32 \times 10^{-53}\cos\omega t + 5.60 \times 10^{-57}\sin\omega t)\, e^{6.87 \times 10^{10}(T-t)}$$
$$+(5.50 \times 10^{-53}\cos 2\omega t + 5.80 \times 10^{-44}\sin 2\omega t)e^{4.58 \times 10^{10}(T-t)}$$
$$+(1.83 \times 10^{-53}\cos 3\omega t - 8.00 \times 10^{-76}\sin 3\omega t)e^{2.29 \times 10^{10}(T-t)}] \quad (58)$$

The higher valued positive exponential of the fundamental component in (58) will in effect swamp out lower valued harmonic terms, only the fundamental component need be considered, and expression (58) may be approximated as:

$$\theta_x(t) \approx -[7.32 \times 10^{-53}\cos\omega t + 5.60 \times 10^{-57}\sin\omega t\,]e^{6.87 \times 10^{10}(T-t)} \quad (59)$$

The behavior of expression (59) is controlled by the exponential term therein, the sinusoidal terms when evaluated using the values stated in table (34) will be a constant. With this in mind, expression (59) may be rationalized to obtain $\theta_x'(t)$ which will be only a function of the exponential. Evaluating $\theta_x'(t)$ is justified as accurately stating the behavior of expression (59) in view of the fact that this expression will evaluate for all significant values when $(T-t)$ is greater than zero, and negative going values of $(T-t)$ are too small compared to other values obtained, to be of interest. Therefore, $$|\theta_x'(t)| = \theta_x(t)/-[\mathbf{7.32} \times \mathbf{10^{-53}}\cos\omega t + \mathbf{5.60} \times \mathbf{10^{-57}}\sin\omega t] = e^{6.87 \times 10^{10}(T-t)} \quad (60)$$

By simple substitution of the several time units for each specific value of pulse width, the response of expression (60) as a function of time may be evaluated in table (61) below, and plotted in FIG. 35. The evaluation of expression (60) uses values of time units in seconds as stated below, rather than the specific time units stated in (34), since here no comparison is being made between fundamental and second harmonic carrier components, and the simpler or rounded off time units will suffice. Hence table (61) evaluates as:

| $t$ | T=$10^{-3}$ | T=$10^{-4}$ | T=$10^{-5}$ | T=$10^{-6}$ | |
|---|---|---|---|---|---|
| 0 | $e^{6.87 \times 10^7}$ | $e^{6.87 \times 10^6}$ | $e^{6.87 \times 10^5}$ | $e^{6.87 \times 10^4}$ | |
| $10^{-8}$ | $e^{6.87 \times 10^7}$ | $e^{6.87 \times 10^6}$ | $e^{6.87 \times 10^5}$ | $e^{6.87 \times 10^4}$ | |
| $10^{-7}$ | $e^{6.87 \times 10^7}$ | $e^{6.87 \times 10^6}$ | $e^{6.87 \times 10^5}$ | $e^{6.18 \times 10^4}$ | |
| $10^{-6}$ | $e^{6.87 \times 10^7}$ | $e^{6.87 \times 10^6}$ | $e^{6.87 \times 10^5}$ | 1 | (61) |
| $10^{-5}$ | $e^{6.87 \times 10^7}$ | $e^{6.18 \times 10^6}$ | 1 | | |
| $10^{-4}$ | $e^{6.87 \times 10^7}$ | 1 | | | |
| $10^{-3}$ | 1 | | | | |

The single pulse square wave intelligence signal modulating a carrier signal is the most severe test for determining wave shape integrity. Therefore, it may be concluded that wherein complex waveform intelligence including direct current steady-state or amplitude-varying signal is concerned, but exclusive of a steady state sinusoidal intelligence signal, the head configuration with the homogeneous magnetizable core is best suitable, particularly under conditions of resonance of the carrier circuit reactances to the applied carrier frequency. Therefore, this type of head will be most advantageous in virtually all applications except the singular steady state sinusoid, for both recording and reproducing purposes.

Response to Carrier-Modulated Complex Waveform Intelligence When Carrrier Reactance Components Are In Off-Resonance Condition Off resonance is the term used herein wherein the electrical parameters of the inductances, inherent or external capacitances, and effective resistances in the carrier circuit are so chosen so as to avoid spurious oscillations, that is oscillations exclusive of the applied carrier frequency. Such oscillations may result by virtue of the characteristics of the mathematical expression in the complex plane that gives rise to at least an additional complex conjugate pair of poles.

In this instance, the effective capacitance $C_o$ was chosen to avoid such additional complex conjugate poles other than those due to the applied carrier frequency, and hence the carrier circuit will be seen to operate on the lower extremities or skirt of the typical universal resonance carrier curve. Hence, this section will refer to FIGS. 33 and 34 for the schematic representations of the record and reproduce configurations respectively, and to FIG. 36 for the half-modulation envelope of the carrier frequency as modulated by the several pulses of different pulse widths, as heretofore utilized in other sections of the specification.

Using the basic equations (51) and their conversion into expression (52) for the same value of coefficient of coupling, namely $k = 1.0$, and setting $C_o = 1.752 \times 10^{-6}$ farads, which provides the condition for off-resonance beyond the point where spurious oscillation would result, expression (52) evaluates to:

$$I_x = \frac{\begin{aligned}&[150 - 100\, e^{-Ts}]\, s^3 \\ &+ [5.7 \times 10^5 - 5.7 \times 10^5\, e^{-Ts}]\, s^2 \\ &+ [6.86 \times 10^{14} - 6.86 \times 10^{14}\, e^{-Ts}]\, s \\ &+ [3.9 \times 10^{18} - 3.9 \times 10^{18}\, e^{-Ts}]\end{aligned}}{s(s^2+\omega^2)[75s^2 + 2.9 \times 10^5 s + 2.9 \times 10^7]} \qquad (62)$$

from which by solving for $\theta_x(t)$ we obtain by first solving for $i_x(t)$ which when multiplied by factor $5 \times 10^{-3}$, obtains:

$$\theta_x(t) = 7.1 \times 10^{-21} \cos\omega t + 1.3 \times 10^{-9} \sin\omega t - 10^{-4} e^{-100t} + 10^{-4} e^{-100(t-T)} + 8.5 \times 10^{-7} e^{-3840t} - 8.5 \times 10^{-7} e^{-3840(t-T)} \qquad (66)$$

For the purpose of expansion of expression (67) into the form given by expression (23), exponential terms not having pulse information may be dropped, simplifying the expression to read:

$$\theta_x(t) = 7.1 \times 10^{-21} \cos\omega t + 1.3 \times 10^{-9} \sin\omega t + 10^{-4} e^{-100(t-T)} - 8.5 \times 10^{-7} e^{-3840(t-T)} \qquad (67)$$

Figure 36:
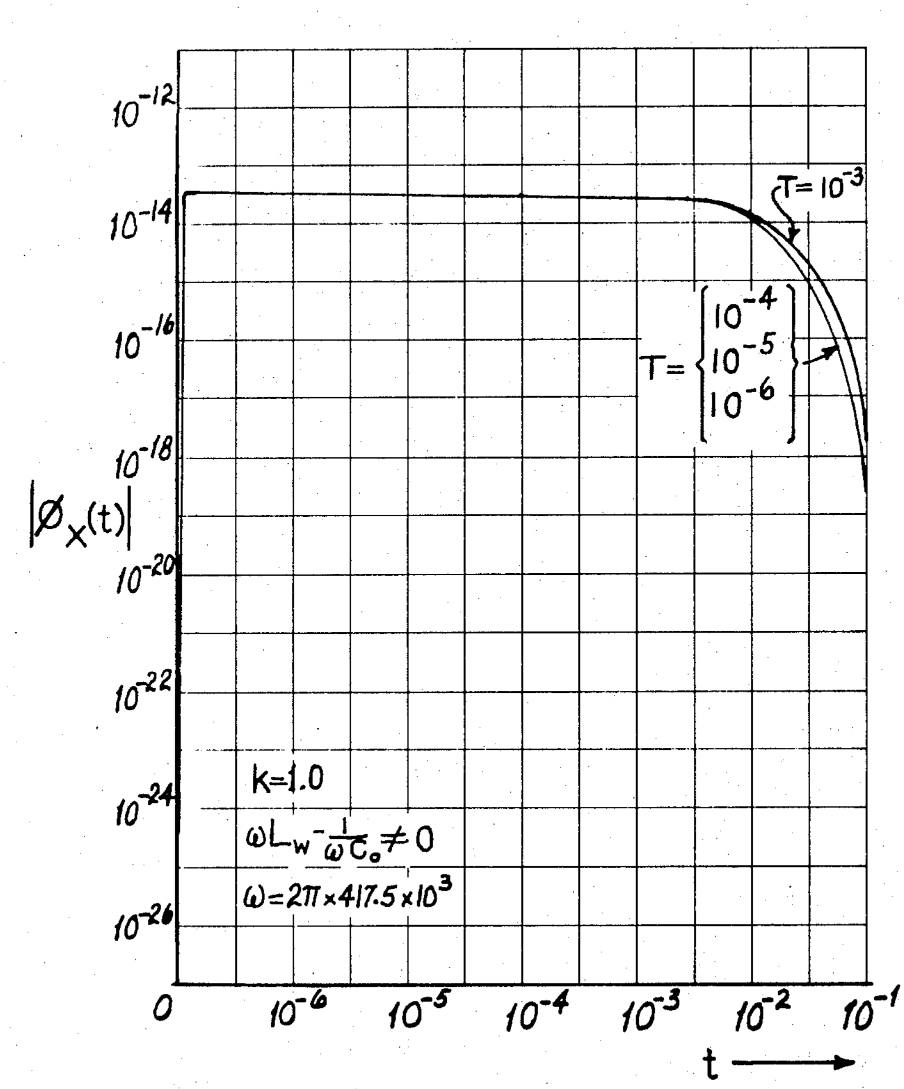
FIG. 36 shows modulation envelope response characteristics of the absolute value of flux of the head of FIG. 33 as a function of time for four different pulse widths that modulate the fundamental component of the carrier frequency, and where the coefficient of coupling between the several inductances of the head is unity. However, here, the effective reactances of the carrier circuit of the head have been selected not to operate at resonance to the carrier frequency but in off-resonance condition on the skirt of a typical universal resonance curve.

Expanding expression (67) into the flux expression by use of formulation (23), $\theta_x(t)$ is obtained which is plotted for values of $T=10^{-3}, 10^{-4}, 10^{-5}$ and $10^{-6}$ for the time units of table (34) results in the curves of FIG. 36.

Analysis of the results plotted in FIG. 36, leads to the conclusion that the additional capacitance used in order to avoid the additional complex conjugate poles other than those created due to the applied carrier frequency, also results in pulse modulation envelopes that are indistinguishable from each other, even under conditions of $k = 1.0$. It may also be concluded that under conditions where capacitive reactance is present in the carrier circuit, that spurious oscillations will occur either at resonance of the carrier reactances when the coefficient of coupling is less than unity, or when the coefficient of coupling is equal to unity when operating in the off-resonance condition on the skirt of the typical universal resonance curve, and further that it is most desirable to operate under resonant condition of the carrier reactances when the coefficient of coupling between the several coils of the head is unity.

Figure 37:
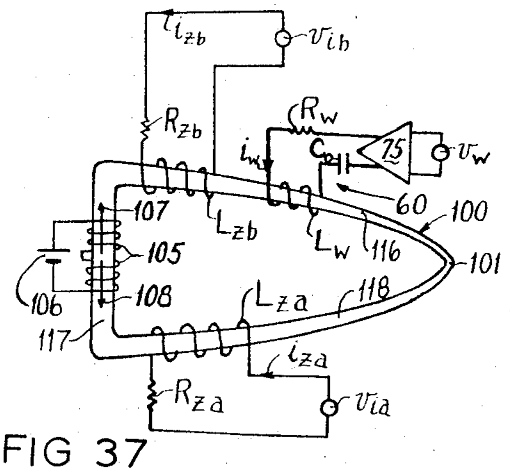
FIG. 37 is a schematic view of a record head similar to that of FIG. 33 but modified to also provide a logical AND element.
Figures 38, 39:
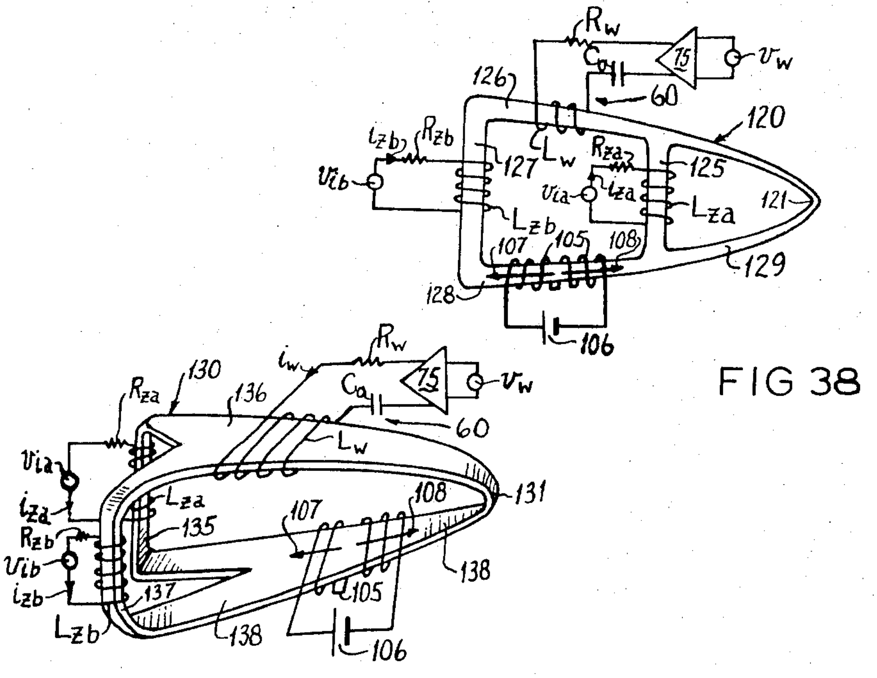
FIG. 38 is a schematic view of a record head wherein the magnetizable core structure of the head of FIG. 33 is modified to also provide a logical OR element.
FIG. 39 is a schematic view of a record head shown partly in perspective, wherein the magnetizable core structure of the head of FIG. 33 is modified to also provide a logical OR element.

Response to Carrier Modulated Pulse Recording and Logic Elements When Carrier Reactance Components Are In Resonant Conditions FIGS. 37, 38 and 39 refer to similar conditions encountered in FIG. 33 configuration where the coefficient of coupling between the several coils is unity, that is, there are no discontinuities in any of the core structures, and the carrier components $L_w$ and $C_o$ are at resonance. However, in these structures a plurality of intelligence-carrying inductances are used, and a direct current bias is used in each core. Depending on the arrangement of the core use, each of these configurations can function as both a logic circuit and as a recording head.

Therefore, referring particularly to FIG. 37, a combination head and AND logic element is provided. Core 100 has tapered portion 101 at which point flux created in the core is, by its convection component, recorded on an external recording medium such as a magnetic tape or drum. Coil 60 is wound on core portion 116. Coil 60 comprises inductance $L_w$ and capacitance $C_o$, inherent in the inductance or externally provided. $R_w$ is the self resistance of coil 60 and is also considered a part of the inherent resistance of the output circuit of amplifier 75 connected to said coil 60. When carrier signal voltage $v_w$ is applied to the input of amplifier 75, inductance $L_w$ and capacitance $C_o$ are at resonance to the carrier frequency $\omega$ of carrier signal $v_w$. Current $i_w$ is produced in coil 60 creating a carrier flux circulating in core 100. Bias winding 105 circuits of two coil portions wound on core portion 117 in opposite directions and of equal number of turns, so that when a direct current is applied by means of source 106 connected to coil 105, flux components 107 and 108 of equal magnitude and opposite direction tend to be set up and in effect cancelling each other when no intelligence pulse is applied to this configuration. Hence no flux will be effective until at least the flux magnitude of either component 107 or 108 is overcome. This means that the core will be locked or held quiescent at the origin of the B–H of θ–H hysterysis-characterizing loop until fluxes are created in the core that overcome either flux 107 or flux 108. It is noted that the carrier flux, being an alternating flux, will not by itself, without the aid of at least two intelligence flux pulses, overcome either flux component 107 or 108. As in prior configurations, coil $L_{za}$ having inherent resistance $R_{za}$, is wound on core portion 118. Pulse signal designated as $v_{ia}$ is applied to coil $L_{za}$ creating a current $i_{za}$ that sets up an intelligence flux pulse in the core in the same direction as bias flux component 107. Similarly coil $L_{zb}$, having inherent resistance $R_{zb}$, is wound on core portion 116. Voltage pulse signal $v_{ib}$ is applied to coil $L_{zb}$ causing current $i_{zb}$ to flow in coil $L_{zb}$ and creating a flux in the core that is in the same direction as flux component 107. Neither flux component produced by coil $L_{za}$ or $L_{az}$, by itself, is sufficient to overcome the effect of bias component 108, but together, the flux components due to $L_{za}$ and $L_{zb}$ additive in magnitude are sufficient to exceed the effect of flux component 108, so that by the presence of both the pulses an intelligence flux will flow in core 100 to modulate the carrier flux and thus enable the recording of this modulated carrier flux, through its convection flux component at narrowed core portion 101, where flux concentration is greatest. The presence of both pulses of $v_{ia}$ and $v_{ib}$ will in effect operate as an AND logic element, which flux can be recorded on an external magnetic medium. It is obvious without further explanation, that if the polarities of $v_{ia}$ and $v_{ib}$ were reversed, the resultant flux created by their joint presence would be in the direction of bias flux component 108. Thus, if desired, the resultant intelligence flux in the same direction as bias flux component 107 may be termed logic state ONE, whereas the flux resulting in direction of component 108 may be termed logic state ZERO, in a binary system. We may also obtain a ternary logic system, by considering the flux in the same direction as bias component 107 to be a logic ONE, the absence of any logic resultant flux as logic state ZERO, and resultant flux in the same direction as bias flux component 108 to be considered as logic state TWO.

With reference to FIG. 38, a combination logic OR element and recording head is provided thereby. Core 120 is configured to have a pair of parallel core portions 125 and 127 that bridge core portions 126 and 128. Recording of flux on external recording means by virtue of convection flux components occur at narrowed portion 121 where flux concentration is greatest. Coil 60 is connected to amplifier 75 and provides carrier frequency signal $v_w$. Carrier circuit components $L_w$ and $C_o$ are at resonance to the applied carrier frequency as described in connection with FIG. 37, above. Coil 105 is the bias coil and is identical to the bias coil described in connection with FIG. 37, providing flux components 107 and 108. Coil $L_{za}$, having inherent resistance $R_{za}$, is wound on core member 125. When a voltage pulse $v_{ia}$ is applied the coil $L_{za}$, a current $i_{za}$ flows in coil $L_{za}$, creating an intelligence flux component in core portion 125 and in a direction describable as flowing into core portion 126, bifurcating at the junction of core portions 125 and 126, so that it tends to flow in the direction towards core portion 127 and in the opposite direction towards narrowed portion 121. Two paths are formed, one comprising flux path defined by core portion 125, tip 121, core portion 129, and returning to core portion 125. The other path also starting at core portion 125, through core portion 126, core portion 127, core portion 128, and returning to core portion 125. The first path described will tend to be opposed by bias component 108, whereas the second path described will tend to be opposed by bias component 107. Since the first path described is the path of interest, it being that path of the flux created due to intelligence pulse voltage $v_{ia}$, the flux produced by $v_{ia}$ signal will have to be sufficiently large in magnitude to overcome the effect of bias component 108. When recorded, the presence of the flux at 121 can be considered as a logic ONE of a binary system. Coil $L_{zb}$, having inherent resistance $R_{zb}$, is wound on core portion 127. When an intelligence voltage pulse $v_{ib}$ is applied to coil $L_{zb}$, a current $i_{zb}$ will flow in coil $L_{zb}$ and create a flux in core portion 120. Two flux direction paths in core 120 will be created. One flux direction starting from core portion 127 and going in the direction of core portion 126, tip 121, core portion 129, core portion 128, and returning to core portion 127. This intelligence flux component will be opposed by flux component 108 so that it will have to be of a magnitude greater than bias flux component 108 to cause intelligence flux circulation in the core, creating a logical ONE. Due to this flux component being available at tip 121, where the flux concentration is greatest, recording on an external magnetizable surface of the logic information modulated by the carrier flux, is possible. The second intelligence flux component path may be defined by starting at core portion 127, flowing through core portion 126 and into core portion 125, through core portion 128, and returning to core portion 127. This second component is not overly important inasmuch as it is not the flux component instrumental in being recorded at 121. Hence, it can be seen that either flux created by intelligence voltage pulse $v_{ia}$ or $v_{ib}$ can be used to modulate the carrier signal, and when overcoming the appropriate bias flux component, is readable as the presence of flux in the core to magnetically simulate an OR element action coupled with recording capability therewith. Similar to the description of FIG. 37, both a binary or ternary logic element is possible.

FIG. 39 is very much similar to FIG. 38 in functional character, in that it too provides a logic OR element with recording capability of the logic signal. FIG. 39 differs only with respect to the core configuration, having core 130 instead of core 120. Recording of modulated carrier OR signal is provided at tip 131, which is also the narrowed portion of core 130. Bias winding 105 is wound on core portion 138, carrier winding 60 is wound on core portion 136 and intelligence-bearing coil $L_{za}$, having inherent resistance $R_{za}$, is wound on core portion 135, while intelligence-bearing coil $L_{zb}$, having inherent resistance $R_{zb}$, is wound on core portion 137. When voltage $v_{ia}$ is applied to coil $L_{za}$, a current $i_{za}$ flows in coil $L_{za}$ to produce a flux in core portion 135. When a voltage $v_{ib}$ is applied to coil $L_{zb}$, a current $i_{zb}$ flows in coil $L_{zb}$ to produce another flux in core portion 137. In this configuration, however, either flux created by coil $L_{za}$ or $L_{zb}$ is in the direction opposing bias flux component 108, so that either flux is in a direction aiding bias flux component 107. The bias flux arrangement locking the core magnetically at the hysterysis loop origin, either the flux due to $v_{ia}$ or $v_{ib}$ will have to overcome the magnitude of bias component 108 to combine with the carrier flux component circulating in the core, thereby producing a modulated flux at tip 131 for recording the convection component of such modulated flux on an external recording medium. Hence, here too, the presence of the carrier modulated flux due to either voltage pulse $v_{ia}$ or $v_{ib}$ can be considered as the presence of a logical ONE, and the configuration of FIG. 39 as a logical binary OR element. Of course, in either FIG. 38 or FIG. 39, the reversal of current direction, that is, of pulse polarities opposite to those indicated, will produce another logical signal in reverse direction which may be considered as another state of logic. If a binary element is contemplated, the reverse pulse direction may be considered a logical ZERO. But if a ternary element is considered, the absence of a pulse may be considered as the logical ZERO state, the forward direction pulse as the logical ONE state, and the reverse pulse direction as the logical TWO state.

Character Memory System Using Magnetic Storage and Retrieval

Figure 40:
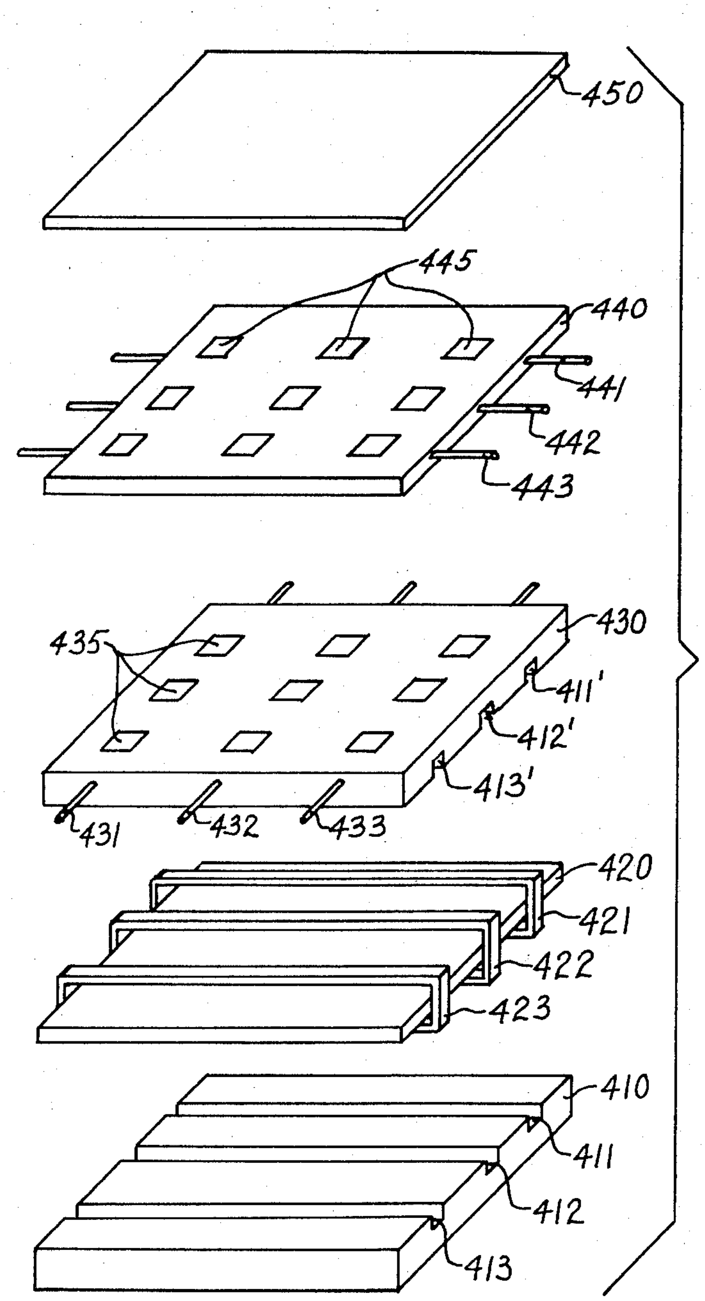
FIG. 40 is a perspective view of several parts comprising a magnetic memory matrix shown in the order of construction of the matrix in accordance with this invention.

Referring to FIG. 40, the structural configuration of a magnetic recording and memory matrix capable of storing character information not limited to binary logic and capable of simultaneous non-destructive reading of the stored characters therefrom, is provided.

It should be observed that the drawing greatly exaggerates the dimensions of the several components of the matrix in order to obtain clarity of understanding. Although in the drawing, the ability to store nine characters are illustrated, in practice 1000 by 1000 matrix may be constructed in an area of some 8 by 8 inches, thereby obtaining storage of one million characters, with great facility. Larger matrices are of course possible as the cross-wires used herein are reduced below 4 mils or less in thickness. It is contemplated that a 4 mil wire diameter with a four mil spacing therebetween, would, with micro circuit and semiconductor tehnology be readily attainable. Base 410 made of electrically insulating material is formed with parallel apertures 411, 412 and 413 therein for admitting an elongated side of cores of magnetizable material 421, 422 and 423, respectively, which cores are circumjacently formed about an electrically insulating support 420. The other elongated sides of cores 421, 422 and 423 are held in place respectively in apertures 411', 412' and 413' of substrate 430. It is pointed out, that the cores 421, 422 and 423 may be formed of magnetizable materials hereinbelow described by known vacuum vapor deposition process utilizing photographically developed image of the magnetic cores in a photoresist material superimposed over a magnetizable material that covers all the surfaces of member 420, and in such process the cores can be made extremely narrow, in the order of four mils thick or less, in which case apertures 411, 411', 412, 412'. 413 and 413' would not be needed. In either case layer 420 would be interposed between and attached to layer surfaces of members 410 and 430 or layers 420, and 430 would be formed by vapor deposition techniques.

Where deposits of substrate material comprising member 430 are obtained by deposition methods, a partial layer of member 430 is first deposited over member 420 which already has cores 421, 422 and 423 formed thereon. Copper wires 431, 432 and 433 of four mil diameter are layed in parallel position on partial layer of substrate 430 by vapor deposition of copper or by laying in actual wires, and the remaining material constituting substrate 430 is deposited over the wires to embed the wires in substrate 430 and to complete the formation of this substrate.

Thin film zones 435, of magnetizable material as hereinbelow described, are deposited by known vapor deposition methods on the last formed and exposed surface of substrate 430 to act as storage areas for recording of character-identifying signals thereon. Formation of these areas may be preferably done under influence of a magnetic field that aligns the molecular structure of films 435 in a direction represented by arrow 436 in FIG. 41, substantially along an axis defined by elongated portions of cores 421, 422 and 423, as hereinbelow described.

Substrate 440 is ultimately formed over substrate 430 and hence covers thin film storage areas 435. As in the case of substrate 430, a portion of substrate 440 is deposited over the upper surface of substrate 430 on which the thin film areas 435 are deposited. Copper wires 441, 442 and 443 are parallel deposited by vapor deposition methods in the same manner as wires 431, 432 and 433 were formed, and the remainder of substrate material comprising substrate 440 is deposited over wires 441, 442 and 443 to form the entire substrate 440.

Character retrieval areas 445, also of thin film magnetizable material are formed on the upper surface of substrate 440, and are coincident with thin film areas 435, below. The materials of thin film areas 445 are also hereinbelow described, but must have a lower magnetic coercivity, $H_c$, than the materials used for thin film 435 in order to enable non-destructive read out of the stored and recorded information without disturbing the storage thereof. Here too it may be preferable to vapor deposit read out areas 445 under influence of a magnetic field that orients the molecular structure magnetically along an axis defined, for example, by arrow 446 in FIG. 41.

Insulating layer 450 is then deposited on the surface of substrate 440, bearing retrieval zones 445, to thereby encase the entire matrix memory.

The longitudinal or shortened portions of cores 421, 422 and 423 will protrude from the assembled structure for winding or further forming coils thereon, as well as the ends of wires 431, 432, 433, 441, 442 and 443 also protruding for making connection to external circuit means.

The layers of magnetic materials for the thin film zones 435 and 445 are about 2000 to 10,000 units thick. Magnetizable areas 435 and 445 are selected, so that the magnetic coercivity $H_c$ as shown by the $\theta - H$ curves, provide a higher coercivity for film 435 compared with film 445 so as to enable non-destructive reading out of the information in film 445 without disturbing the stored information in film 435.

Magnetizable surfaces 435 may typically be a compound consisting of 50 percent nickel and 50 percent iron by weight and having a magnetic coercivity factor of about 0.5 Oersteads for the operating conditions encountered. Magnetizable surfaces 445 may typically be a compound of 2 percent vanadium, 49 percent iron, and 49 percent of cobolt by weight and having a magnetic coercivity factor of about 0.25 Oersteads for the modulated pulse information conditions encountered. The material used for magnetizable members 421, 422 and 423 may be of transformer type material of 98 percent iron and 2 percent silicon by weight, or simply of soft iron, this type of material not being critical, except that it must not be of the permanent type magnetic material.

Another combination of magnetizable materials, usable, would consist of 50 percent nickel, 50 percent iron by weight for film 435, and a standard ferric oxide ($Fe_2O_3$) film, as is commonly used for magnetic recording tape, to comprise film 445.

Still other combinations of magnetizable materials usable would by any other materials stated above in connection with materials used in either films 435 or 445, for use as film 435. But here a lower coercivity factor of the materials of the order of 0.1 Oersteads for use as film 445 would be selected from the groups of compounds consisting of gadolinium iron oxide ($GdFeO_3O$, yttrium iron oxide ($YFeO_3$), yttrium gadolinium iron oxide ($YGdFe_2O_6$), yttrium gadolinium iron garnet ($Y_3Gd_3Fe_{10}O_{24}$), yttrium gallium iron garnet ($Y_6Ga_5Fe_5O_{24}$), and yttrium gallium iron oxide ($Y_2GaFeO_6$). Any of these oxides and garnets may also be selected in combination and in accordance with the criteria that the material for film 435 has about 50 percent greater coercivity factor than film material used for films 445. The same materials may often be used if films 435 are magnetized along a direction 90° displaced from its direction of use, or with respect to arrow 436 in the plane of the film. In that way, the coercivity of the film will be substantially increased having to overcome anisotropic torques.

The materials used for insulation layers 430 or 440 may be any of the electrically insulating plastics such as polyethylene or polystyrene, or may be selected from the group consisting of yttrium aluminum oxide ($YAlO_3$), calcium titanium oxide ($CaT_iO_3$), gadolinium gallium garnet ($Gd_3Ga_5O_{12}$), or aluminum oxide or sapphire ($Al_2O_3$), beryllium oxide (BeO), magnesium oxide (MgO), magnesium aluminum oxide ($MgAl_2O_4$). The use of the oxides or garnets as substrates with the iron oxides and iron garnets as magnetizable films 435 or 445 would lend themselves to easy formation since vapor deposition methods could be used.

Films 435 and 445 are formed by known processes on their substrates 430 and 440, such as vapor deposition in a suitable chamber. But as stated above, it might be desirable to orient the molecular film structure in direction of easy magnetization during deposition of these films. This could be accomplished by subjecting the film, while in process of deposition, to a magnetic field, the flux directions in the film being along the axes described by arrows 436 and 437.

Referring to FIGS. 41–44, the connection to external circuit means is shown therein in schematic fashion. Substrates 430 and 440 as well as cores 421, 422 and 423 are not structurally accurately shown therein, but rather to illustrate the manner in which suitable inductors are provided for these cores and the manner in which connection to the matrix is made.

To complete the matrix structure, it is first necessary to wind, form or thread wires through cores 421, 422 and 423 in the manner shown, to obtain magnetic flux through the cores in the proper directions. These coils may be formed by etching into a copper layer insulated from the cores, by known processes using photoresist material, in such manner as the wires in the substrates were formed. Each of the coils on these cores will have one side grounded at 460 that serves as a common electrical return path. Hence, coils 451 and 461 will be wound or deposited, formed or threaded over a portion of core 421, coils 452 and 462 over a portion of core 422, and coils 453 and 463 over a portion of core 423.

Core 421 passing directly under the first horizontal row of magnetizable areas 435 will have a flux therein that will affect magnetization of the first row of film areas 435 when combined with other magnetic fluxes. Core 442 passing directly under the second horizontal row of magnetizable areas 435 will have a flux therein that will affect magnetization of the second row of film areas 435 when combined with other magnetic fluxes. Core 423 passing directly under the third horizontal row of magnetizable areas 435 will have a flux therein that will affect magnetization of the third row of film areas 435 when combined with other magnetic fluxes.

Figure 42:
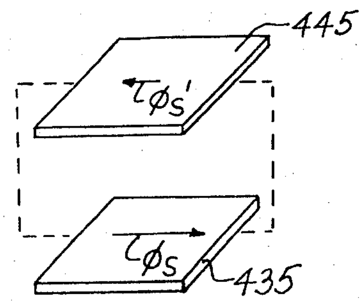
FIG. 42 is a perspective view of a pair of thin film magnetic storage and retrieval areas used in the memory matrix to illustrate the flux storage mode.
Figure 43:
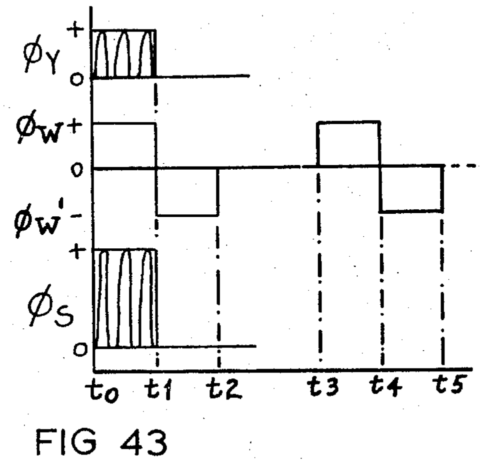
FIG. 43 is a graphical representation of the flux relationships during the flux storage mode in accordance with the system of FIG. 41.
Figure 44:
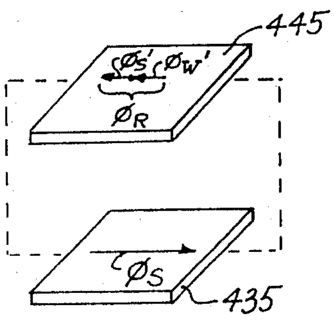
FIG. 44 is a perspective view of the same pair of thin film areas as shown in FIG. 42 but used to illustrate the retrieval mode of the stored flux.

Coil 451 is connected to one side of diode 311, the other side of diode 311 being connected to frequency source 310. This source provides a frequency of $\omega_1$ radians per second that acts as the carrier frequency for a rectangular wave pattern superimposed thereon. Therefore, a current $i\,\omega_1$ will flow in the direction shown by its associated arrow due to the presence of diode 311, and we shall arbitrarily term this direction the positive direction. As a consequence of current $i\,\omega_1$ flowing in coil 451 a flux produced by the coil will constitute a component of flux $\theta_{Y1}$, and in the same direction as flux $\theta_{Y1}$. Similarly, coil 461 is connected to rectangular pulse generator 320 to provide a current $i_{P1}$ in a positive direction indicated by its arrow designating current $i_{P1}$ in coil 461, in order to produce another flux component of flux $\theta_{Y1}$, in the same direction as flux $\theta_{Y1}$, to comprise the entire flux component $\theta_{Y1}$. Therefore, being modulated by the carrier in the positive sense only, the positive half of the modulation envelope will constitute flux $\theta_{Y1}$. Bias means, to establish a magnetic bias in the cores in opposite to or in negative direction considering the magnetic hysterysis loop thereof, with respect to any of the $\theta_Y$ fluxes such as the fluxes $\theta_{Y1}$, $\theta_{Y2}$ or $\theta_{Y3}$ in the cores, comprises three coils, one on each core, in series and powered by battery 471 to create bias fluxes $\theta_B$ in each of the cores, which must be overcome by the combination of one of the $\theta_Y$ fluxes and the flux due to currents in wires 431, 432 or 433, before the modulation envelope represented by flux $\theta_S$ in FIG. 43, is recorded in one of the zones 435 as shown in FIGS. 42 and 44. Such recording will take place when a current due to the positive half of a bipolar pulse from pulse source 330 will be provided to produce current an $i_W$ current, such $i_{W1}$ in wire 431 in the positive direction as shown by the arrow representing said $i_{W1}$ current. The positive half of the bipolar current pulse, and having a rectangular shape, flows in wire 431 and returns through ground return 460 to create a magnetic flux $\theta_{W1}$. The positive direction or upper half wave portion thereof being in the same direction as flux $\theta_{Y1}$ and therefore combining therewith to produce a storage flux pattern $\theta_S$ in thin film 435; in this instance, it is the particular thin film 435 whose location is a projection of the intersection of wire 431 and core 421. Therefore, when control circuit 300 connected by means of wire 301 to frequency generating means 310, connected by means of wire 302 to pulse source 320, and connected by means of wire 303 to bipolar pulse means 330, selects the particular carrier frequency, selects the particular undirectional pulse and bipolar pulse, as well as the particular paths to which these signals are provided to the matrix, a modulation envelope having frequency content $\omega_1$ and modulated by unidirectional pulse, will, together with the positive half of the bipolar pulse $\theta_W$, overcome the negative bias flux $\theta_B$ and produce flux $\theta_S$, having a positive direction between duration $t_o$ and $t_1$ indicated by arrow 436 in the upper and extreme left corner zone 435. Such recorded flux will have the characteristics of a unidirectional pulse, retrievable by selective circuits resonant to carrier frequency $\theta_1$. The negative half of the bipolar pulse during storage of the modulated pulse operation, will be ineffective, since there will be no pulse modulated flux available to add to the negative portion of the bipolar pulse between duration $t_1$ and $t_2$ in the storage mode.

In a similar manner, the flux $\theta_{Y2}$ will be created in core 422 due to current $\omega_2$ supplied by means 310, passing through diode 312 and creating a flux in coil 452, in combination with a flux provided by coil 462 due to pulse current $i_{P2}$ supplied by means 320, in conjunction with currents $i\,\omega_1$, $i\,\omega_2$ or $i\,\omega_3$ flowing in wires 431, 432 or 433, supplied by means 330 to magnetize selected zone areas 435. Also in a similar manner, the flux $\theta_{Y3}$ will be created in core 423 due to current $i\,\omega_3$ supplied by means 310, passing through diode 313 and creating a flux in coil 453, in combination with a flux provided by coil 463 due to a pulse current $i_{P3}$ supplied by means 320 in conjunction with currents $i\,\omega_1$, $i\,\omega_2$ or $\omega_3$ flowing in wires 431, 432, or 433, supplied by means 330 to magnetize selected zones in the third or center row of zone areas 435.

It is pointed out that coils 451, 461, 452, 462, and 453, 463 are preferably formed by chemical process on the cores in that the cores are themselves of selectively small diameter, in the order of 4 to 6 mils cross sectional diameter. Also, as shown in other parts of the specification, it would be advantageous in obtaining good pulse fidelity and sharp pulse response characteristics to include sufficient capacitance components as part of the circuits that are connected to diodes 311, 312 and 313 so that reactances of the circuits are at resonance to the particular carrier frequency used. It is also advantageous to make the cores of homogenous material throughout, and that may be best accomplished by material deposition techniques, well-known in the art.

Hence, considering the flux relationships during the storage mode, the relationships of the flux in any core, neglecting the effect of bias flux $\theta_B$ which opposes the flux in the core and which must be overcome by the resultant flux $\theta_Y$ is shown to be equal to the intermodulation of flux $\theta\,\omega$ due to the carrier frequency, and flux $\theta_P$ due to the undirectional pulse, in accordance with the theory developed in other parts of the specification. Flux $\theta_W$, due to the positive half portion of a bipolar pulse in one of the wires 431, 432 or 433, will combine with flux $\theta_Y$ because the fluxes are in the same direction, to produce resultant storage flux $\theta_S$, illustrated in FIG. 42 wherein the direction of storage flux $\theta_S$ is shown in a storage area 435, as well as the several flux relationships during storage mode, illustrated graphically in FIG. 43.

Considering the non-destructive retrieval mode, it may be seen that control means 300 is connected by means of wires 304, 305 and 306 respectively to utilization circuits 340, 350 and 360. The other sides of these utilization circuits are connected respectively to wires 441, 442 and 443 which represent the wires providing current to the serveral rows of magnetizable retrieval zones 445. Wires 441, 442 and 443 extend through insulating substrate 440 and run parallel to each other and are grounded on the other side of substrate 440 at 460 to provide the return path for the current flowing in the wires.

Figure 45:
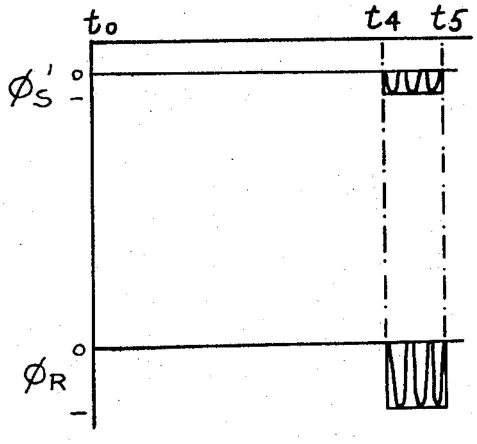
FIG. 45 is a graphical representation of the flux relationship during the flux retrieval mode, illustrating the manner of retrieval of the stored flux without destroying the storage thereof.

However, prior to permitting current to flow in these wires, it should be observed from FIGS. 42 or 44 that storage zones 435 and their respective complementary retrieval zones 445 are directly over each other in the assembled matrix. Hence, when by the method above described, a flux $\theta_S$ results in zone 435, a flux $\theta_S'$, having the same characteristics but smaller in magnitude due to space separation between these zones, is created in zone 445 flowing in the dotted path shown therein for obtaining both character storage during period $t_0$ to $t_1$, and character retrieval during period $t_4$ to $t_5$. Once created, flux $\theta_S$ will reside in films 435, as well as its complementary flux $\theta_S'$ in film 445, shown graphically in FIGS. 43 and 45. It should be noted, that flux $\theta_S'$ will be in a direction 180° disposed in the plane of films 445 with respect to flux $\theta_S$ in the plane of film 435. Flux $\theta_S'$, once established in film 445, will be available for retrieval at any time duration when the bipolar pulse is negative or during periods of $\theta_W'$. Although the first of such periods, between $t_1$ and $t_2$, could have been taken for retrieval, in the illustration of FIG. 43, the time period between $t_4$ and $t_5$ was preferred. With this in mind, if the control circuit 300 operates so that bipolar pulse current direction $i_W'$, in opposite direction to current $i_W$, a retrieval flux $\theta_W'$, in the opposite direction to that of the storage flux $\theta_W$, will flow in the selected wires 431, 432 or 433 to combine with flux $\theta_S'$ and whereby produce resultant retrieval flux $\theta_R$. The direction of flux $\theta_R$ in film 445 will consequently be opposite to the direction of $\theta_S$ in film 435, and will be of a magnitude smaller than flux $\theta_S$. This relationship is necessary in order not to destroy the recorded flux $\theta_S$ in the storage areas, due to retrieval fluxes that flow through zones 445, with leakage of such flux, due to contiguity of the storage and retrieval zones, to zones 435. But the coercive force $H_c$, of the field due to the flux necessary to obtain storage information, is greater than the coercive forces necessary to obtain retrieval. This is achievable merely by selection of different materials for zones 435 and 445 as above described. Such lower coercivity of zone 445 permits a smaller flux to be developed for retrieval of information which is below the threshold recordable level needed for magnetizing storage zone 435. In this system, therefore, almost simultaneous retrieval action can be accomplished while storing information.

To appreciate the magnitude of storage capability of this memory matrix, it should be kept in mind that in accordance with the illustrated figures and descriptions in connection therewith, when information recorded in a given zone 435, there is available for retrieval purposes a particular carrier frequency and a pulse of predetermined width, modulated therewith. If the duration of the carrier frequency is selected to correspond with the duration of the pulse, a recorded modulation envelope of both carrier frequency and pulse will result, similar to that as may have been recorded on magnetic tape. Pulse usage alone in a memory matrix, which only provides a choice of two states of magnetization and hence logic, as exemplified for instance in U.S. Pat. No. 3,447,140, can therefore only store binary logic due to dependence on remnant flux residual in the magnetic material. Unlike such prior art, it a series of carrier frequencies are chosen, say ten different carrier frequencies, that are selected so neither carrier is a harmonic of the other, then a complete decimal logic system is obtainable to modulate a pulse of constant pulse width, to provide the $\theta_Y$ flux component. An alternative approach is of course possible, which is to maintain a constant carrier frequency but vary the pulse width. The alternative approach although simpler from the standpoint of generator 310, will make generator 320 more complex as well as the utilization circuits that would have to be responsive to pulse width variation instead of frequency.

Extending the concept of the decimal logic as a 10-state logic achieved by 10 different carrier frequencies being utilized, if desired, a system of logic can be obtained where enough carrier frequencies are utilized to take care of all arabic digits as well as an alphabet, which would make processing equipment slightly more complex at the point of connection to the memory matrix but would materially simplify the downstream circuitry.

Figure 46:
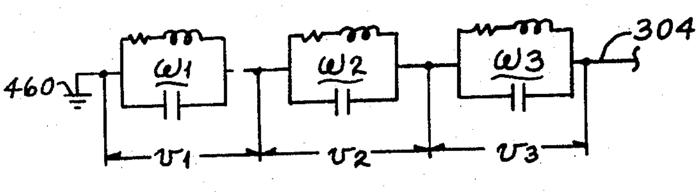
FIG. 46 is a schematic of a representative utilization circuit, as used in the system of FIG. 41, responsive to the retrieval portion of the memory matrix wherein the principle of character identification and determination of the logic states involves the use of pulse amplitude modulation.

Referring to FIG. 46, when the flux $\theta_R$ is caused to flow for any stored information $\theta_S'$ in the film area 445 due to addition of $\theta_W'$ thereto, a current will flow in the affected particular utilization circuit, either circuit 340, 350, or 360. A portion of this circuit is represented by FIG. 46 showing wire 304 connected to the input of one of the utilization circuits with a ground return path 460 provided. A selective means present could comprise a series of resonant circuits, each resonant to a particular carrier frequency $\omega_1$, $\omega_2$ or $\omega_3$ and producing a voltage respectively $v_1$, $v_2$, or $v_3$ from the circuit where the particular frequency is sensed and which current is in resonance condition. A limiting circuit (not shown), could be provided wherein a certain threashold current flowing in wire 304 would have to be present before any of these voltages could be sensed. Since a group of parallel resonant circuits connected in series are present, a high impedance will occur across the particular circuit in which a resonant current to the particular frequency is circulating. That circuit will show a voltage thereacross, while those not at resonance to that particular frequency will present extremely low impedance to such frequency of interest, and act almost as a short circuit for that particular frequency, Hence, frequency selection is easily obtainable as an indication of the stored information for the particular storage zone by use of complementary retrieval zones. A system that uses a concept of storage and retrieval zones for non-destructive read out, but otherwise is limited to conventional binary logic storage, is adequately illustrated in the text, Digital Computer and Control Engineering by R. S. Ledley, pages 728–732, published by McGraw-Hill Book Company, New York, N.Y., 1960. It should be noted that processing circuits for digital or decimal information, such as ordinary calculators, is known, and once the particular circuit providing the voltage output in any one utilization circuit, as a function of sensed frequency, identifies the particular character stored in a particular zone, character processing from that point on to make up an actual word, not to be confused with "word" as used in present computer technology, otherwise stated, an actual set of arabic numbers or a set of alphabetical letters, is significantly simpler.

If instead of the frequency sensitive circuits in FIG. 46, pulse width comparison circuits were used, then the carrier frequency could remain the same but pulse width comparators would have to be used in the utilization circuits for varying pulse widths. The downstream circuitry beyond peripheral character recognition in the utilization circuits, being outside of the scope of this invention is consequently not detailed, but likewise would be materially simpler than with binary processing. The control circuitry is also not detailed, except for specifics with regard to modulation theory found in other portions of this specification, as such control and generating circuitry is recognized as standard in the art as exemplified by U.S. Pat. No. 3,447,140, hereinabove referred to.

Thus the particular storage film 435 location is the projected intersection of a cores 421, 422 or 423 with a wires 431, 432 or 433 by virtue of flux combination between a particular core and wire. The particular retrieval film 445 location the projected intersection of a wire 431, 432 or 433 with a wire 441, 442 or 443 by virtue of flux due to wire 431, 432 or 433, defining columns, and combining with recorded flux transferred to particular retrieval zones 445, whereby wires 441, 442 or 443 define rows of retrieval from zones 445, the flux in any retrieval zone is transferred to utilization circuits for determining the character recorded at that particular location in the matrix by virtue of the carrier frequency recorded, or in pulse width comparison circuits by virtue of the width of the uni-polarity pulse used to modulate the carrier frequency.

Erase of the character in the storage zones 435 may be readily achieved by applying a high frequency signal, of higher frequency and larger amplitude than any of the carrier signals used for obtaining currents $i_W$, to wires 431, 432 and 433 from an external source (not shown) that could be connected to these wires for accomplishing this purpose.

Figure 47:
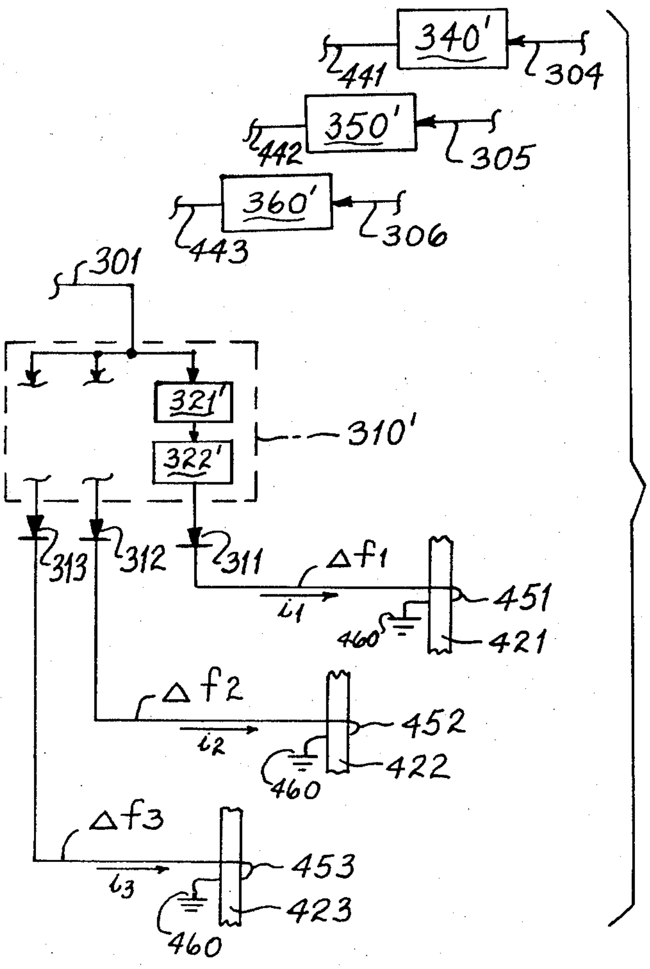
FIG. 47 is a partial schematic that illustrates such differences from that of FIG. 41 as are necessary to show the operation of the memory matrix wherein the principle of character identification and determination of the logic states makes use of a pulse driven frequency modulation system.
Figure 48:
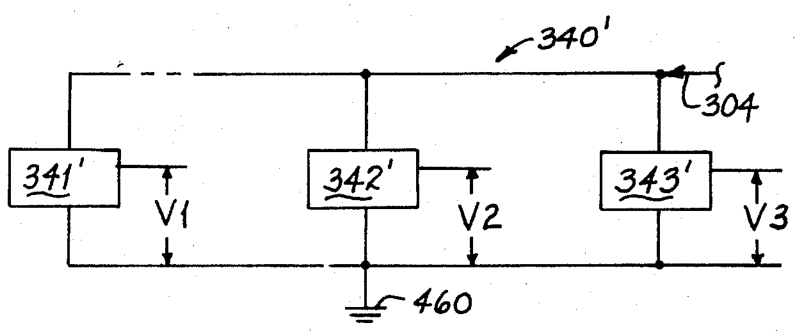
FIG. 48 is a schematic of one of the utilization circuits, as used in the system of FIG. 47, responsive to the retrieval portion of the memory matrix for determining the band pass characteristics or the mean carrier frequency of each band allocated to a particular state of logic, the voltage outputs therefrom being functions of frequency or bands of frequencies, or in the alternative of pulse width.

Referring to FIGS. 47 and 48, a magnetic memory matrix shown therein utilizes frequency modulated pulses that determine the multiple states of logic stored and retrieved. In this connection, only such portions of this system are shown in these figures that differ from the system represented by FIG. 41. All other portions in FIGS. 47 and 48 are identical with FIG. 41, except that pulse generating means 320, and coils 461, 462 and 463 are deleted as not necessary to this system.

Figure 41:
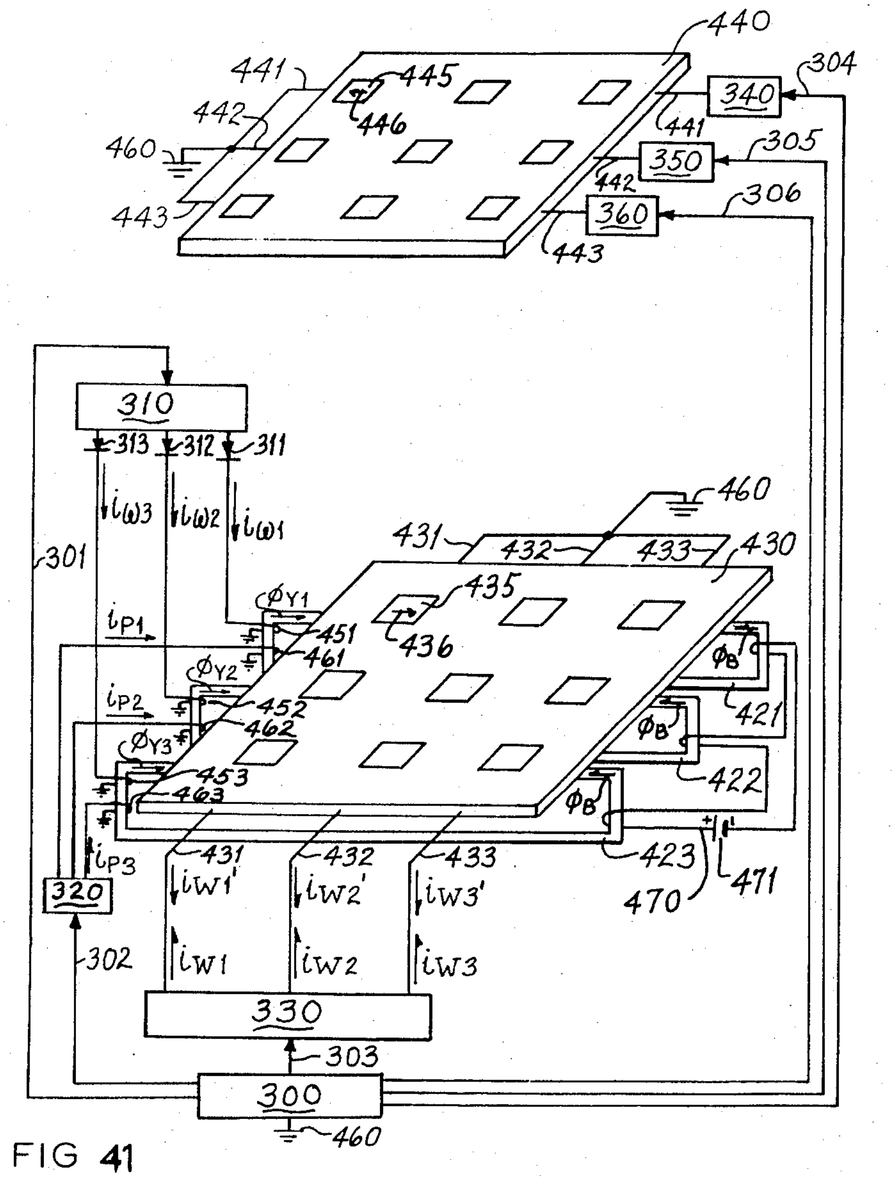
FIG. 41 is a schematic view of the memory matrix connected to peripheral equipment associated therewith in accordance with one method of effecting this invention.

Therefore, frequency generating means 310' is provided herein instead of means 310. Means 310' comprises a plurality of frequency generators driven by pulse sources and exemplified by uni-polar pulse source 321' connected to and driving frequency generating means 322', which provides a frequency modulated current $i_1$ through diode 311 to energize coil 451. A flux in core 421 is created in the same direction as shown in FIG. 41, but this flux has a modulation envelope defined by the rectangular shape of the uni-polar pulse. This flux has the characteristic of the frequency deviation $\Delta f_1$ about a mean carrier frequency, as normally provided by frequency modulation systems, with an upper and lower carrier frequency defining the bandwidth of $\Delta f_1$. The currents $i_W$ or $i_W'$ in the wires orthogonal to cores 421, 422 and 423 are the same as in FIG. 41, meansing that the same bipolar pulse is also used herein. Also, the currents $i_2$ and $i_3$ due to frequency modulation of the other two circuits in means 310', not shown, respectively result in frequency deviations of $\Delta f_2$ and $\Delta f_3$ about their mean carrier frequencies therefore defining the particular bandwidths for the other two circuits in means 310', and hence the other two characters or states of logic generated by this system to provide fluxes in cores 422 and 423 respectively. It is noted that the pulse width used herein for all uni-polar pulses, may be the same, and the bandwidths may also be substantially equal, although the mean frequencies and upper and lower frequencies of the several bands are different. It is noted that the uni-polar pulses in the positive-going directions herein, make the diodes 311, 312 and 313 optional since frequency deviations will be constrained above the zero level by such uni-polar pulse polarity.

Inasmuch as frequency modulation is used to store the character fluxes, the stored flux herein is equivalent to flux $\theta_S$ and $\theta_S'$ except that the modulation envelopes of these stored fluxes are frequency modulated. The utilization circuits, in order to sense the fluxes to retrieved, will necessarily have to be responsive to frequency modulated intelligence. To accomplish this, utilization circuits are provided at 340', 350' and 360' that are bandpass filters capable of sensing each band $\Delta f_1$, $\Delta f_2$, and $\Delta f_3$, these filters having sharp cut-off characteristics at the lower and upper frequency limits representing the particular band to be passed. As a consequence, the particular mean carrier frequency will be available at the output of each bandpass filter so that the voltage output $V_1$, $V_2$ or $V_3$ thereat will be a function of each particular mean carrier frequency. Alternately, if desired, a different width uni-polar pulse may be used, in which case if it is desired for the voltage outputs of the several bandpass filters to be functions of the uni-polar pulse width, then FM discriminators would be connected to the outputs of each bandpass filter, either case being represented by FIG. 48 which details utility circuit 340' as exemplary of the other utility circuits possible. In the latter instance, the bipolar pulse would have to have a pulse width equal to the widest uni-polar pulse, otherwise variable bipolar pulse outputs would be required making the system needlessly complex.

As in the case of the amplitude modulated system of FIG. 41, this frequency modulated system also provides many states of logic such as a decimal or 10-state logic system, or even one with substantially more logic states, in both instances a particular frequency represents a particular logic state, and therefore the processing downstream from the memory would be on a frequency selection basis instead of the binary presence or absence of a voltage, since the voltages herein are functions of frequency instead of DC voltages.

Therefore, a ZERO could be represented by a frequency band $\Delta f$ ranging between 10.1 and 10.2 megahertz or by its mean frequency 10.15 megahertz, a ONE represented by a band ranging between 10.4 and 10.5 megahertz or by its mean frequency of 10.45 megahertz, a TWO by a band ranging between 10.7 and 10.8 megahertz or by its mean frequency of 10.75 megahertz, a THREE by a band ranging between 10.9 and 11.0 megahertz or by its mean frequency of 10.95 megahertz, and so on for higher states of logic in the frequency modulated system. In the amplitude modulated system of FIG. 41, only a single frequency need be considered, such as the several mean frequencies above stated for the several states of logic, allocated to each character. Therefore, in the amplitude modulation system, $v_1$, $v_2$ and $v_3$ shown in FIG. 46 are voltages that are functions respectively of $\omega_1$, $\omega_2$, and $\omega_3$, and in the frequency modulated system shown in FIG. 48, $V_1$, $V_2$, and $V_3$ are voltages that are functions respectively of $\Delta f_1$, $\Delta f_2$, and $\Delta f_3$, or their respective mean frequencies.

It is obvious from the foregoing, that members 420 with cores 421, 422 and 423 in conjunction with member 430 with wires 431, 432 and 433 and films 435 therein are usable as either an OR or an AND gate, and with adaption as a NOR or a NAND gate. Any individual core flux alone could be used for obtaining OR or NOR logic outputs where films 435 are connected to output circuits, or any pair consisting of a core and a wire with connection to an output circuit to that particular film 435, defined by the cross-over location of a particular core and wire, could be used as an AND or a NAND gate. It is also obvious that circuits 340, 350 and 360 may be optionally used instead of circuits 340', 350' and 360' where identification of characters in the frequency modulation system is dependent only upon the mean carrier frequencies.

I claim:

1. A magnetic character memory matrix to transflux logic signals while attenuating distortion, comprising in combination:

a plurality of endless magnetizable cores, said cores being separated from and substantially parallel to each other, each of the cores circumscribing the matrix and having a coil integral therewith, each of the coils being energized by a unique carrier frequency signal in the operational mode of the matrix for creating a different carrier flux in each said core; and a plurality of first electrically conductive wires, separated from the plurality of cores, lying in a plane substantially parallel to the plane of the plurality of cores in direction orthogonal to said plurality cores, said first plurality of wires being fed by pulses in said operational mode, said pulses and unique carrier frequencies interacting so as to provide a plurality of logic states proportional to the number of unique carrier frequencies.

2. The invention as stated in claim 1, wherein said magnetic memory matrix comprises:

means for storing characters, each of the characters being identified by a different state of logic; and means for non-destructive retrieval of the stored characters, said means for storing and retrieval being connected to the matrix.

3. The invention as stated in claim 2, including means for providing said unique carrier frequencies and the pulses, connected to the matrix, said plurality of logic states being characterized by amplitude modulated pulses.

4. The invention as stated in claim 2, including means for providing said unique carrier frequencies and the pulses, connected to the matrix, said plurality of logic states being characterized by frequency modulated pulses.

5. The invention as stated in claim 2, including:

a first group of thin film magnetizable areas in a plane parallel to the plane of the first electrically conductive wires and separated therefrom at locations defined by the intersections of the projection of the cores with the first electrically conductive wires in the plane of said first group of thin film areas for storing said characters in said thin film areas.

6. The invention as stated in claim 5, including:

a plurality of second electrically conductive wires, separated from the plurality of the first electrically conductive wires, lying in a plane parallel to the plane of the first electrically conductive wires; and a second group of thin film magnetizable areas, separated from the plurality of the second electrically conductive wires, lying in a plane parallel to the plane of said second electrically conductive wires at locations defined by the intersections of the projection of the first electrically conductive wires and the second electrically conductive wires in the plane of said second group of thin film areas, each of said second group of thin film areas havng a lower magnetic coercivity than each of the first group of thin film areas for retrieving the stored characters without destroying the storage of said characters in said first group of thin film areas.

7. An improvement in a magnetic head, comprising:

a generally U-shaped magnetizable core; and means consisting of resistive, inductive and capacitive components, the inductive and capacitive components together having substantially zero effective reactance at a predetermined carrier frequency during operative mode of said head, said means being integral with said core.

8. The invention as stated in claim 7, wherein the core is reduced in cross-sectional area at a transducing location thereof.

9. The invention as stated in claim 8, including a magnetic shield enveloping said head except the reduced area.

10. An improvement in a modulation head having a magnetizable core, and means integral with the core energized by a predetermined carrier frequency signal during operative mode of said head, said means comprising:

resistive, inductive and capacitive components, the inductive and capacitive components together having substantially zero effective reactance at said carrier frequency;

an inductor formed on the core for applying intelligence signals thereto; and means within and as an integral portion of the core creating a magnetic discontinuity in said core for critically magnetically coupling said inductor and inductive component so as to provide a coupling factor greater than 0.95 but less than 1.0 therebetween.

11. The invention as stated in claim 10, wherein a portion of the core is reduced in cross-sectional area at a transducing location thereof.

12. The invention as stated in claim 11, including a magnetic shield enveloping said head except the reduced area.

13. An improvement in a modulatin head having an endless magnetizable core, and means integral with the core energized by a predetermined carrier frequency signal during operational mode of said head:

said means comprising resistive, inductance and capacitive components, the inductive and capacitive components together having substantially zero effective reactance at said carrier frequency, said core being devoid of magnetic discontinuities; and wherein the head also acts as a logical AND gate, including a first inductor electrically energized during said operational mode for providing bias to the core, and at least two other inductors each of which is energized by a pulse for overcoming said bias during said opertional mode.

14. The invention as stated in claim 13, wherein a portion of the core is reduced in cross-sectional area at a transducing location thereof.

15. The invention as stated in claim 14, including a magnetic shield enveloping the head except the reduced area.

16. An improvement in a modulation head having an endless magnetizable core, and means integral with the core energized by a predetermined carrier frequency signal during operational mode of said head:

said means comprising resistive, inductive and capacitive components, the inductive and capacitive components together having substantially zero effective reactance at said carrier frequency, said core being devoid of magnetic discontinuities; and wherein the head also acts as a logical OR gate, including a first inductor electrically energized during said operational mode for providing bias to the core, and at least two other inductors any of which when energized by a pulse during said operational mode is sufficient to overcome said bias.

17. The invention as stated in claim 16, wherein a portion of the core is reduced in cross-sectional area at a transducing location thereof.

18. The invention as stated in claim 17, including a magnetic shield enveloping said head except the reduced area.

19. An improvement in a modulation head comprising a magnetizable core, and a pair of coils formed on the core, including:

means within and as an integral portion of the core creating a magnetic discontinuity in said core for magnetically critically coupling said pair of coils so as to provide a coupling factor greater than 0.95 but less than 1.0 between said pair of coils, a portion of the core being reduced in cross-sectional area at a transducing location thereof; and a magnetic shield enveloping the head except the reduced area.

20. An improvement in a modulation head comprising a magnetizable core, and a pair of coils formed on the core, including:

means comprising a non-magnetic spacer within the core so as to provide critical magnetic coupling between the coils of a magnitude wherein the coupling factor between said coils is greater than 0.95 but less than 1.0, a portion of the core being reduced in cross-sectional area at a transducing location thereof; and a magnetic shield enveloping the head except the reduced area.

21. An improvement in a modulation head having a magnetizable core, means integral with the core energized by a predetermined carrier frequency signal during operative mode of said head, and an inductor formed on said core;

said means comprising resistive, inductive and capacitive components, the inductive and capacitive components together having substantially zero effective reactance at said carrier frequency;

means within and an na integral portin of the core creating a magnetic discontinuity in said core for magnetically coupling said inductor and inductive component so as to provide a finite coupling factor greater than zero but less than 0.55 therebetween, a portion of the core being reduced in cross-sectional area at a transducing location thereof; and a magnetic shield enveloping the head except the reduced area.

22. An improvement in a magnetic head, comprising:

a gapless magnetizable core; and means consisting of resistive, inductive and capacitive components integral with the core, the inductive and capacitive components together having substantially zero effective reactance to a predetermined carrier frequency signal during operative mode of said head.

23. The invention as stated in claim 22, wherein the core is reduced in cross-sectional area at a transducing location thereof.

24. The invention as stated in claim 23, including a magnetic shield enveloping said head except the reduced area.

25. An improved method for recording signals by use of a modulation head having a magnetizable core, reactive means and an inductor integral with the core, the steps during operational mode of said head comprising:

resonating said reactive means by applying a predetermined carrier frequency signal thereto for creating a first flux in the core; and applying an intelligence signal to the inductor for creating a second flux in the core, said first and second flux interacting so as to produce flux modulation products in said core.

26. An improved method for recording signals by use of a modulation head having a magnetizable core, first and second inductors formed on the core, the steps during operational mode of said head comprising:

magnetically coupling said inductors so as to provide a coupling factor greater than 0.95 but less than 1.0 therebetween;

applying a carrier frequency signal to the first inductor for creating a first flux in the core; and applying an intelligence signal to the second inductor for creating a second flux in said core, said first and second flux interacting so as to produce flux modulation products in said core.

* * * * *

UNITED STATES PATENT OFFICE
CERTIFICATE OF CORRECTION

Patent No. 3,862,115 Dated January 21, 1975

Inventor(s) Martin E. Gerry Sheet 1 of 13

It is certified that error appears in the above-identified patent and that said Letters Patent are hereby corrected as shown below:

CORRECTION OF CLAIMS

Claim 13, at column 55, the first line of the claim should read:

13. An improvement in a modulation head having an

Claim 21, at column 56, the fifth line of the claim should read:

formed on said core:

Claim 21, at column 56, the tenth line of the claim should read:

means within and as an integral portion of the core

CORRECTION OF TABLES AND EQUATIONS

Column 14, lines 61-67, table(1), should read:

$$A = L_w V_1 / N_w Z_{(\omega)}$$

$$B = L_z V_2 / N_z Z_{(\beta)}$$

$$C = k^2 \beta L_w L_z V_2 / N_w Z_{(\omega)} Z_{(\beta)}$$

$$D = k^2 \omega L_w L_z V_1 / N_z Z_{(\omega)} Z_{(\beta)} \qquad (1)$$

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

Columns 17 and 18, lines 16-51, the Component Expression should read:

| Component Expression | Type of Component | Term Number |
|---|---|---|
| $\phi_x(t) = \left[(AB)\cos\omega t + (BD)\sin\omega t\right]\cos\beta t$ | Fundamental | (10.1) |
| $+\left[(AC)\cos\omega t + (CD)\sin\omega t\right]\sin\beta t$ | Intelligence Phase Distortion of Fundamental | (10.2) |
| $-\left[\left(\frac{AC^2}{4}\right)\cos\omega t - \left(\frac{B^2D}{4} - \frac{C^2D}{4}\right)\sin\omega t\right]\cos 2\beta t$ | Intelligence Frequency Distortion of Fundamental | (10.3) |
| $+\left[\left(\frac{ABC}{2}\right)\cos\omega t + \left(\frac{BCD}{2}\right)\sin\omega t\right]\sin 2\beta t$ | Intelligence Phase and Frequency Distortion of Fundamental | (10.4) |
| $+\left[\left(\frac{A^2B}{4} - \frac{BD^2}{4}\right)\cos 2\omega t + \left(\frac{ABD}{2}\right)\sin 2\omega t\right]\cos\beta t$ | Second Harmonic | (10.5) |
| $+\left[\left(\frac{A^2C}{4} - \frac{CD^2}{4}\right)\cos 2\omega t + \left(\frac{ACD}{2}\right)\sin 2\omega t\right]\sin\beta t$ | Intelligence Phase Distortion of Second Harmonic | (10.6) |
| $+\left[\left(\frac{C^2D^2}{16} - \frac{A^2B^2}{16} - \frac{B^2D^2}{16}\right)\cos 2\omega t + \left(\frac{ABD^2}{8} - \frac{A^2C^2}{16} - \frac{AC^2D}{8}\right)\sin 2\omega t\right]\cos 2\beta t$ | Intelligence Frequency Distortion of Second Harmonic | (10.7) |
| $+\left[\left(\frac{A^2BC}{8} - \frac{BCD^2}{8}\right)\cos 2\omega t + \left(\frac{ABCD}{4}\right)\sin 2\omega t\right]\sin 2\beta t$ | Intelligence Phase and Frequency Distortion of Second Harmonic | (10.8) |

(10)

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

Column 21, lines 1-6, conversion factor table should read:

$$A' = A \frac{Z_{(\omega)}}{R_W} = 1.31 \times 10^4 A$$

$$B' = B \qquad (15)$$

$$C' = C \frac{Z_{(\omega)}}{R_W} = 1.31 \times 10^4 C$$

$$D' = D \frac{Z_{(\omega)}}{R_W} = 1.31 \times 10^4 D$$

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

Column 23, lines 7-49, table (22) should read:

$L = L_w = L_z = 0.5$ henries
$M = k\sqrt{L_w L_z} = kL = 0.5k$ henries
$N = N_w = N_z = 100$ turns of coils $L_w$ or $L_z$
$R_w = 100$ ohms
$R_z = 50$ ohms
$C_o = 0.291 \times 10^{-12}$ farads (when at resonance with $L_w$)

$\omega = 2\pi \times 417.5 \times 10^3$ radians per second, or $2.62 \times 10^6$ radians per second
$v_i$ (intelligence signal voltage input) $= V_z[u(t) - u(t-T)]$
a rectangular pulse starting at $t = 0$ and having a duration of $T$ seconds
The Laplace transform of $v_i = V_z[(1 - e^{-Ts})/s]$
$v_c$(carrier signal voltage input) $= V_w \cos\omega t$
The Laplace transform of $v_c = V_w[s/(s^2 + \omega^2)]$
$V_w = V_z = 1$ $$\theta_x(t) = \theta_w(t) + \theta_z(t) = L/N\,(i_w + i_z) = (L/N)\,i_x(t) = 5 \times 10^{-3}\,i_x(t)$$

Note that $\theta_x(t)$ is the computed transient response to the applied carrier and intelligence signals and that the relationship between $\theta_x(t)$ and current is derived from Faraday's law of induction. $\theta_x(t)$ will have to be expanded in an infinite series to obtain the intermodulation flux products, in accordance with expression (23), below.

The Laplace transform of $\theta_x(t) = \theta_x(s) = \int_0^{\infty} \theta_x(t)\, e^{st}\, dt$ The Inverse Laplace transform of $\theta_x(s) = \theta_x(t) = \frac{1}{2\pi j}\int_{-j\infty}^{+j\infty} \theta_x(s)\, e^{ts}\, ds$ $= \sum$ Residues at the poles of $\theta_x(s)\, e^{ts}$ (22)

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

Column 26, lines 25-29, expression group (24) should read:

$$\frac{s}{s^2+\omega^2} = (sL_W + R_W)I_W - MsI_z$$
$$\frac{1-e^{-Ts}}{s} = -MsI_W + (sL_z + R_z)I_z \qquad (24)$$

Column 26, lines 32-35, mathematical expression thereat should read:

$$I_W = \frac{(L+M - Me^{-Ts})s^3 + R_z s^2 + \omega^2 M(1-e^{-Ts})s}{s(s^2+\omega^2)\left[(L^2-M^2)s^2 + L(R_W+R_z)s + R_W R_z\right]} \qquad (25)$$

Column 27, lines 3-6, expression (29) should read:

$$\theta_x(t) = \mathcal{L}^{-1}\theta_x(s) = \sum \text{Residues at poles of } \theta_x(s)e^{ts} \qquad (29)$$

Column 32, lines 29-31, expression (45) should read:

$$\frac{s}{s^2+\omega^2} = (sL_W + R_W + \frac{1}{sC_o})I_W - sMI_z$$
$$\frac{1-e^{-Ts}}{s} = -sMI_z + (sL_z + R_z)I_z \qquad (45)$$

PO-1050
(5/69)

UNITED STATES PATENT OFFICE
CERTIFICATE OF CORRECTION

Patent No. 3,862,115 Dated January 21, 1975

Inventor(s) Martin E. Gerry Sheet 6 of 13

It is certified that error appears in the above-identified patent and that said Letters Patent are hereby corrected as shown below:

Column 36, lines 50-53, expression (51) should read:

$$\frac{s}{s^2 + \omega^2} = \left(sL_w + R_w + \frac{1}{s\,C_o}\right)I_w + sMI_z$$

$$\frac{1 - e^{-Ts}}{s} = sMI_w + (sL_z + R_z)\,I_z \quad (51)$$

Column 38, lines 42-44, expression (56) should read:

$$\theta_x(t) \cong -[1.45 \times 10^{-13} \cos\omega t + 1.10 \times 10^{-17} \sin\omega t + 1.45 \times 10^{-13} e^{2.29 \times 10^{10}(T-t)}] \quad (56)$$

Column 39, lines 20-21, expression (59) should read:

$$\phi_x(t) \cong -[7.32 \times 10^{-53} \cos\omega t + 5.60 \times 10^{-57} \sin\omega t]\, e^{6.87 \times 10^{10}(T-t)} \quad (59)$$

PO-1050
(5/69)

UNITED STATES PATENT OFFICE
CERTIFICATE OF CORRECTION

Patent No. 3,862,115 Dated January 21, 1975

Inventor(s) Martin E. Gerry Sheet 7 of 13

It is certified that error appears in the above-identified patent and that said Letters Patent are hereby corrected as shown below:

Column 39, lines 36-40, expression (60) should read:

$$\left|\phi_x'(t)\right| = \frac{\phi_x(t)}{-[7.32 \times 10^{-53}\cos\omega t + 5.60 \times 10^{-57}\sin\omega t]} = e^{6.87 \times 10^{10}(T-t)} \quad (60)$$

Column 41, lines 30-32, expression (67) should read:

$$\Theta_x(t) = 7.1 \times 10^{-21}\cos\omega t + 1.3 \times 10^{-9}\sin\omega t + 10^{-4}e^{-100(t-T)} - 8.5 \times 10^{-7}e^{-3840(t-T)} \quad (67)$$

CORRECTION TO DELETE ENTIRE PARAGRAPHS

Delete the following in their entirety:

Column 16, lines 44-51

Column 25, lines 1-4

Column 30, lines 52 to end of column

Column 31, lines 1-26

PO-1050
(5/69)

UNITED STATES PATENT OFFICE
CERTIFICATE OF CORRECTION

Patent No. 3,862,115 Dated January 21, 1975

Inventor(s) Martin E. Gerry Sheet 8 of 13

It is certified that error appears in the above-identified patent and that said Letters Patent are hereby corrected as shown below:

CORRECTIONS TO CHANGE WORDS, TERMS OR SYMBOLS

| Column | Line(s) | Delete | Substitute |
|---|---|---|---|
| 4 | 67 | cicuit | circuit |
| 5 | 12 | loss | less |
| 5 | 35 | and | are |
| 5 | 39 | on | in |
| 5 | 49 | coupliong | coupling |
| 6 | 53-61 | | separate paragraph between: "FIG. 18.......frequency." |
| 8 | 31 | inductance | inductances |
| 13 | 11 | support such | in support of |
| 13 | 58 | magnetic | Magnetic |
| 16 | 24 | in | |
| 16 | 65 | effect | affect |
| 17 | 13 | $\omega t\ \pi/8$ | $\omega t = \pi/8$ |
| 17 | 60 | $\alpha$ | $\beta$ |
| 18 | 63 | $\beta\ 2\pi \times 20{,}000$ | $\beta = 2\pi \times 20{,}000$ |
| 19 | 17 | harmonics | harmonic |
| 19 | 33 | lowe | lower |
| 19 | 47 | on | of |
| 19 | 54 | $l_W$ | $L_W$ |
| 19 | 56 | filler | filter |
| 20 | 12-13 | Inntelligence | Intelligence |

PO-1050
(5/69)

UNITED STATES PATENT OFFICE
CERTIFICATE OF CORRECTION

Patent No. 3,862,115 Dated January 21, 1975

Inventor(s) Martin E. Gerry

Sheet 9 of 13

It is certified that error appears in the above-identified patent and that said Letters Patent are hereby corrected as shown below:

| Column | Line(s) | Delete | Substitute |
|---|---|---|---|
| 20 | 20 | made | mode |
| 20 | 37 | reactance | resistance |
| 20 | 54 | d | D |
| 20 | 63-64 | (4) and (5) | |
| 21 | 11 | $\beta$ 2π x 20,000 | $\beta$ = 2π x 20,000 |
| 22 | 32 | counterpart | counterparts |
| 22 | 39 | visa | vice |
| 25 | 24 | sensitive | resistance |
| 26 | 12 | visa | vice |
| 27 | 54 | simusoidal | sinusoidal |
| 28 | 2 | k. | k, is provided. |
| 28 | 32 | 106 | $10^6$ |
| 30 | 14-15 | $10^{116}$ $^3$ seconds. | $10^{-3}$ seconds. |
| 41 | 34 | $\theta_x(t)$ | $\phi_x(t)$ |
| 42 | 37 | circuits | consists |
| 42 | 65 | $L_{az}$ | $L_{zb}$ |
| 46 | 28 | 10,000 | 10,000 Å |
| 46 | 53 | ($GdFeO_3O$, | ($GdFeO_3$), |
| 46 | 66-67 | ($Y_2$-$GaFeO_6$). | ($Y_2GaFeO_6$). |

PO-1050
(5/69)

UNITED STATES PATENT OFFICE
CERTIFICATE OF CORRECTION

Patent No. 3,862,115 Dated January 21, 1975

Inventor(s) Martin E. Gerry Sheet 10 of 13

It is certified that error appears in the above-identified patent and that said Letters Patent are hereby corrected as shown below:

| Column | Line(s) | Delete | Substitute |
|---|---|---|---|
| 48 | 5 | $\theta_{Y1}$ | $\phi_{Y1}$ |
| 48 | 6 | $\theta_{Y1}$ | $\phi_{Y1}$ |
| 48 | 10 | $\theta_{Y1}$ | $\phi_{Y1}$ |
| 48 | 11 | $\theta_{Y1}$, to comprise the entire flux components $\theta_{Y1}$. | $\phi_{Y1}$, to comprise the entire flux components $\phi_{Y1}$. |
| 48 | 14 | $\theta_{Y1}$ | $\phi_{Y1}$ |
| 48 | 17 | $\theta_{Y}$ | $\phi_{Y}$ |
| 48 | 18 | $\theta_{Y1}$, $\theta_{Y2}$ or $\theta_{Y3}$ | $\phi_{Y1}$, $\phi_{Y2}$ or $\phi_{Y3}$ |
| 48 | 20 | $\theta_{B}$ | $\phi_{B}$ |
| 48 | 21 | $\theta_{Y}$ | $\phi_{Y}$ |
| 48 | 23 | $\theta_{S}$ | $\phi_{S}$ |
| 48 | 33 | $\theta_{W1}$ | $\phi_{W1}$ |
| 48 | 34 | $\theta_{Y1}$ | $\phi_{Y1}$ |

PO-1050
(5/69)

UNITED STATES PATENT OFFICE
CERTIFICATE OF CORRECTION

Patent No. 3,862,115 Dated January 21, 1975

Sheet 11 of 13

Inventor(s) Martin E. Gerry

It is certified that error appears in the above-identified patent and that said Letters Patent are hereby corrected as shown below:

| Column | Line(s) | Delete | Substitute |
|---|---|---|---|
| 48 | 36 | $\theta_S$ | $\phi_S$ |
| 48 | 49 | $\theta_W$ | $\phi_W$ |
| 48 | 49 | $\theta_B$ | $\phi_B$ |
| 48 | 50 | $\theta_S$ | $\phi_S$ |
| 48 | 55 | $\theta_1$ | $\omega_1$ |
| 48 | 61 | $\theta_{Y2}$ | $\phi_{Y2}$ |
| 48 | 62 | $\omega_2$ | $i_{\omega 2}$ |
| 49 | 2 | $\theta_{Y3}$ | $\phi_{Y3}$ |
| 49 | 7 | $\omega_3$ | $i_{\omega 3}$ |
| 49 | 27 | $\theta_B$ | $\phi_B$ |
| 49 | 29 | $\theta_Y$ | $\phi_Y$ |
| 49 | 30 | $\theta\ \omega$ | $\phi_\omega$ |
| 49 | 31 | $\theta_P$ | $\phi_P$ |
| 49 | 33 | $\theta_W$ | $\phi_W$ |
| 49 | 35 | $\theta_Y$ | $\phi_Y$ |
| 49 | 36 | $\theta_S$ | $\phi_S$ |
| 49 | 37 | $\theta_S$ | $\phi_S$ |

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

| Column | Line(s) | Delete | Substitute |
|---|---|---|---|
| 49 | 47 | serveral | several |
| 49 | 58 | $\theta_S$ | $\phi_S$ |
| 49 | 58 | $\theta_S'$ | $\phi_S'$ |
| 49 | 64 | $\theta_S$ | $\phi_S$ |
| 49 | 65 | $\theta_S'$ | $\phi_S'$ |
| 49 | 66 | $\theta_S'$ | $\phi_S'$ |
| 49 | 68 | $\theta_S$ | $\phi_S$ |
| 49 | 68 | $\theta_S'$ | $\phi_S'$ |
| 50 | 3 | $\theta_W'$ | $\phi_W'$ |
| 50 | 9 | $\theta_W'$ | $\phi_W'$ |
| 50 | 10 | $\theta_W$ | $\phi_W$ |
| 50 | 11 | $\theta_S'$ | $\phi_S'$ |
| 50 | 11 | whereby | thereby |
| 50 | 12 | $\theta_R$ | $\phi_R$ |
| 50 | 13 | $\theta_R$ | $\phi_R$ |
| 50 | 14 | $\theta_S$ | $\phi_S$ |

PO-1050
(5/69)

UNITED STATES PATENT OFFICE
CERTIFICATE OF CORRECTION

Patent No. 3,862,115 Dated January 21, 1975

Inventor(s) Martin E. Gerry

It is certified that error appears in the above-identified patent and that said Letters Patent are hereby corrected as shown below:

| Column | Line(s) | Delete | Substitute |
| --- | --- | --- | --- |
| 50 | 15 | $\theta_S$ | $\phi_S$ |
| 50 | 16 | $\theta_S$ | $\phi_S$ |
| 50 | 47 | it | if |
| 50 | 52 | $\theta_Y$ | $\phi_Y$ |
| 51 | 1 | $\theta_R$ | $\phi_R$ |
| 51 | 2 | $\theta_S'$ | $\phi_S'$ |
| 51 | 3 | $\theta_W'$ | $\phi_W'$ |
| 52 | 40 | meansing | meaning |
| 52 | 60 | $\theta_S$ and $\theta_S'$ | $\phi_S$ and $\phi_S'$ |

Signed and sealed this 3rd day of June 1975.

(SEAL)
Attest:

RUTH C. MASON
Attesting Officer

C. MARSHALL DANN
Commissioner of Patents
and Trademarks